US012719662B2

(12) United States Patent
Shpurov et al.

(10) Patent No.: US 12,719,662 B2
(45) **Date of Patent: *Aug. 25, 2026**

(54) SECURE DISTRIBUTION AND MANAGEMENT OF CRYPTOGRAPHIC KEYS WITHIN A COMPUTING ENVIRONMENT USING DISTRIBUTED LEDGERS

(71) Applicant: The Toronto-Dominion Bank, Toronto (CA)

(72) Inventors: Alexey Shpurov, Toronto (CA); Albert Louis Rothenstein, Toronto (CA); Adrian Chung-Hey Ma, Richmond Hill (CA); Buturab Rizvi, Vaughan (CA); Alexandra Tsourkis, Toronto (CA); Francis James Alexander Guttridge, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,052

(22) Filed: Aug. 11, 2023

(65) Prior Publication Data

US 2023/0403139 A1 Dec. 14, 2023

Related U.S. Application Data

(63) Continuation of application No. 16/715,061, filed on Dec. 16, 2019, now Pat. No. 11,784,799.

(51) Int. Cl.

| | |
|---|---|
| ***H04L 9/08*** | (2006.01) |
| ***G06Q 30/0226*** | (2023.01) |

(Continued)

(52) U.S. Cl.

CPC ....... *H04L 9/0825* (2013.01); *G06Q 30/0226* (2013.01); *H04L 9/30* (2013.01);

(Continued)

(58) Field of Classification Search

CPC ......... H04L 9/0825; H04L 9/30; H04L 9/321; H04L 9/3226; H04L 9/3247; H04L 9/3265; H04L 9/50; G06Q 30/0226

See application file for complete search history.

(56) References Cited

U.S. PATENT DOCUMENTS

| | | |
|---|---|---|
| 9,569,771 B2 | 2/2017 | Lesavich et al. |
| 9,866,393 B1 | 1/2018 | Rush et al. |

(Continued)

FOREIGN PATENT DOCUMENTS

| | | |
|---|---|---|
| WO | 2019067798 A1 | 4/2019 |

OTHER PUBLICATIONS

Merriam-Webster. Dictionary [online]. Merriam-Webster, Incorporated, 2014 [retrieved on Jan. 9, 2025]. Retrieved from the Internet: <URL: https://web.archive.org/web/20140108174437/https://www.merriam-webster.com/dictionary/token> (Year: 2014).*

(Continued)

*Primary Examiner* — Carl G Colin
(74) *Attorney, Agent, or Firm* — Nixon Peabody LLP

(57) ABSTRACT

The disclosed exemplary embodiments include computer-implemented systems, devices, and processes that securely distribute and manage cryptographic keys within a computing environment using permissioned distributed ledgers. By way of example, an apparatus may receive a registration request and a first digital signature applied to the registration request from a device. Based on a validation of the first digital signature, the apparatus may approve the registration request and apply a second digital signature to the registration request and the first digital signature. In some examples, (Continued)

the second digital signature may be indicative of the approval of the registration request by the apparatus. The apparatus may also transmit the registration request and the first and second digital signatures to a computing system, which may validate the first and second digital signatures and perform operations that record a public cryptographic key of an application program executed at the device onto a distributed ledger.

22 Claims, 29 Drawing Sheets

(51) Int. Cl.
*H04L 9/00* (2022.01)
*H04L 9/30* (2006.01)
*H04L 9/32* (2006.01)

(52) U.S. Cl.
CPC ............ *H04L 9/321* (2013.01); *H04L 9/3226* (2013.01); *H04L 9/3247* (2013.01); *H04L 9/3265* (2013.01); *H04L 9/50* (2022.05)

(56) References Cited

U.S. PATENT DOCUMENTS 10,103,878 B1 * 10/2018 Sharifi Mehr ........ H04L 9/3226
10,187,486 B1 * 1/2019 Toksoz ................ G06F 11/3438
10,229,396 B2 3/2019 Shtylman
10,250,395 B1 4/2019 Borne-Pons et al.
10,991,061 B2 4/2021 Irwin et al.
11,132,694 B2 9/2021 Mercille
11,456,869 B2 * 9/2022 Shpurov ............... H04L 9/3226
11,777,731 B2 * 10/2023 Shpurov ................... H04L 9/14 713/155
11,784,799 B2 * 10/2023 Shpurov ............... H04L 9/0825 713/155
2004/0054908 A1 3/2004 Circensis et al.
2005/0097060 A1 * 5/2005 Lee .................... G06Q 20/3825 705/65
2008/0201575 A1 8/2008 van der Rijn et al.
2011/0312301 A1 12/2011 Muller et al.
2014/0189360 A1 7/2014 Baghdasaryan et al.
2015/0112870 A1 4/2015 Nagasundaram et al.
2015/0295930 A1 * 10/2015 Dixon ................. H04L 63/0807 713/181
2015/0312331 A1 10/2015 Crocker et al.
2015/0381605 A1 * 12/2015 Ko ...................... H04L 63/0815 726/9
2016/0021076 A1 * 1/2016 Lin ....................... H04L 63/061 713/171
2016/0065593 A1 3/2016 Bengochea et al.
2017/0078760 A1 3/2017 Christoph et al.
2017/0103385 A1 4/2017 Wildon, Jr. et al.
2017/0236102 A1 8/2017 Biton
2017/0270521 A1 9/2017 Good et al.
2017/0272413 A1 9/2017 Adams et al.
2017/0357967 A1 12/2017 Sykora et al.
2018/0096137 A1 4/2018 Trostle et al.
2018/0167208 A1 6/2018 Le Saint et al.
2018/0174231 A1 6/2018 Chenard et al.
2018/0247296 A1 * 8/2018 Win ................... G06Q 30/0207
2018/0288031 A1 * 10/2018 Kumar ................ H04L 63/0807
2018/0332016 A1 * 11/2018 Pandey ............... H04L 63/0428
2019/0019180 A1 1/2019 Coburn
2019/0036708 A1 1/2019 Fregly et al.
2019/0073666 A1 3/2019 Ortiz et al.
2019/0108542 A1 4/2019 Durvasula et al.
2019/0130483 A1 5/2019 DeJong
2019/0140844 A1 5/2019 Brown et al.
2019/0149539 A1 * 5/2019 Scruby .................. H04L 63/083 713/168
2019/0173852 A1 * 6/2019 Chavarria ............. G06Q 20/00
2019/0236560 A1 8/2019 Song et al.
2019/0280875 A1 9/2019 Ragnoni et al.
2019/0311363 A1 * 10/2019 Gleeson ................. G06Q 20/02
2019/0312730 A1 10/2019 Engan et al.
2019/0312737 A1 * 10/2019 Mani .................. G07C 9/00174
2019/0333055 A1 * 10/2019 Mohammed .......... H04L 9/3234
2020/0005290 A1 * 1/2020 Madisetti ............. G06Q 20/065
2020/0137566 A1 * 4/2020 Jin ........................ H04W 12/43
2020/0320220 A1 10/2020 Beno et al.
2020/0322791 A1 10/2020 Hassan et al.
2020/0372495 A1 11/2020 Maheshwari et al.
2020/0374131 A1 11/2020 Davis et al.
2021/0099438 A1 * 4/2021 Kurian .................. H04L 9/3226
2021/0143990 A1 5/2021 Ruane et al.
2021/0182272 A1 6/2021 Shpurov et al.
2022/0158855 A1 * 5/2022 Wentz ................... H04L 9/3247

OTHER PUBLICATIONS

Mearian, "What's a crypto wallet {and how does it manage digital currency)?," https://www.computerworld com/article/3389678/whats-a-crypto-wallet-and-does-it-manage-digital-currency.html, Apr. 17, 2019 (10 pages).

Nyang, "Gruut: A Fully-Decentralized P2P Public Ledger," https://www.gruut.net/resources/assetsdoc/GruutNet_Whitepaper _20180814.pdf, Jun. 29, 2018.

Blanco-Justia et al., "Privacy-preserving Loyalty Programs," arXiv:1411.3961v2, Dec. 1, 2014 (16 pages).

* cited by examiner

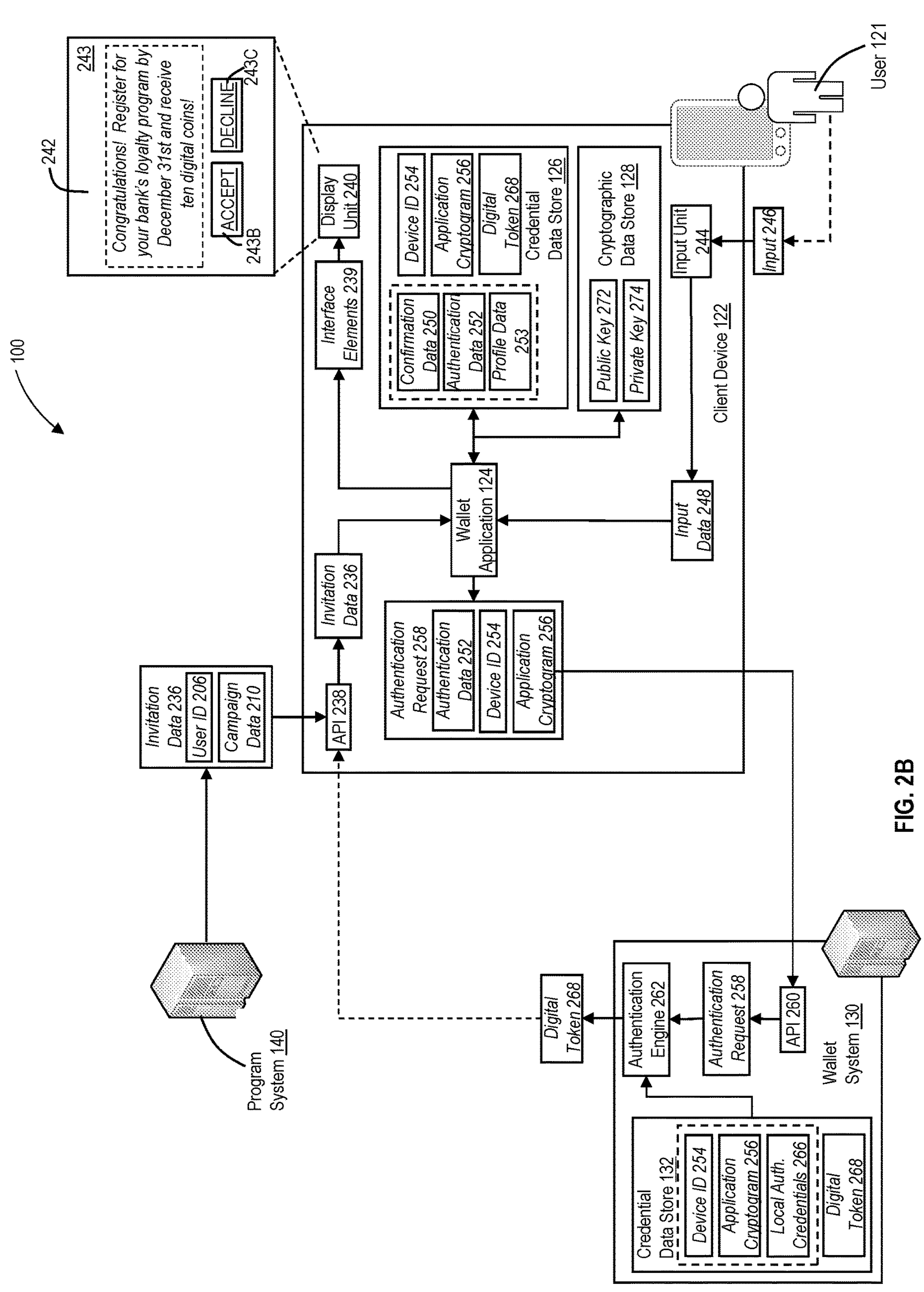
100
242
243
Congratulations! Register for your bank's loyalty program by December 31st and receive ten digital coins!
ACCEPT
DECLINE
243B
243C
User 121
Display Unit 240
Interface Elements 239
Device ID 254
Application Cryptogram 256
Digital Token 268
Confirmation Data 250
Authentication Data 252
Profile Data 253
Credential Data Store 126
Cryptographic Data Store 128
Public Key 272
Private Key 274
Input Unit 244
Input 246
Client Device 122
Wallet Application 124
Input Data 248
Invitation Data 236
Authentication Request 258
Authentication Data 252
Device ID 254
Application Cryptogram 256
API 238
Invitation Data 236
User ID 206
Campaign Data 210
Program System 140
Digital Token 268
Authentication Engine 262
Authentication Request 258
API 260
Wallet System 130
Credential Data Store 132
Device ID 254
Application Cryptogram 256
Local Auth. Credentials 266
Digital Token 268
FIG. 2B

SECURE DISTRIBUTION AND MANAGEMENT OF CRYPTOGRAPHIC KEYS WITHIN A COMPUTING ENVIRONMENT USING DISTRIBUTED LEDGERS

CROSS-REFERENCE TO RELATED APPLICATION

This application is a continuation of, and claims the benefit of priority to, U.S. application Ser. No. 16/715,061, filed Dec. 16, 2019, the disclosure of which is expressly incorporated herein by reference to its entirety.

TECHNICAL FIELD

The disclosed embodiments generally relate to computer-implemented systems and processes that securely generate and distribute of cryptographic keys within a computing environment using permissioned distributed ledgers.

BACKGROUND

Today, many financial institutions, merchants, and other businesses establish and maintain customer loyalty or rewards programs on behalf of certain, and potentially overlapping, groups of customers. By way of example, a business may establish a loyalty program that, when implemented through a computing system of the business, provides a customer with a specified number of "points" in response to a qualifying purchase of a product or service from that business. In other examples, a financial institution may establish a loyalty program that provides a customer with an additional number of points in response to an initiation of a purchase transaction involving a payment instrument or financial-services account issued by the financial institution, or in response to a referral of a previously unserved customer to that loyalty program. Further, in some examples, the loyalty program may also establish rules that, upon implementation by one or more computing systems, enable the customer to exchange accrued points for discounts on various products or services provided by that business.

SUMMARY

In some examples, an apparatus includes a communications interface, a memory storing instructions, and at least one processor coupled to the communications interface and the memory. The at least one processor is configured to execute the instructions to receive, from a device via the communications interface, a registration request and a first digital signature applied to the registration request. The registration request is generated by an application program executed at the device, and the registration request includes a public cryptographic key of the application program. Based on a validation of the first digital signature, the at least one processor is further configured to execute the instructions to approve the registration request and apply a second digital signature to the registration request and the first digital signature. The second digital signature is indicative of the approval of the registration request by the apparatus. The at least one processor is further configured to execute the instructions to transmit, via the communications interface, the registration request, the first digital signature, and the second digital signature to a computing system. The computing system is configured to validate the first digital signature and the second digital signature, and based on the validation of the first and second digital signatures, to perform operations that record the public cryptographic key of the application program within an element of a distributed ledger.

In other examples, a computer-implemented method includes receiving, using at least one processor, and from a device, a registration request and a first digital signature applied to the registration request. The registration request is generated by an application program executed at the device, and the registration request includes a public cryptographic key of the application program. Based on a validation of the first digital signature, and using the at least one processor, the computer-implemented method also includes approving the registration request and applying a second digital signature to the registration request and the first digital signature. The second digital signature is indicative of the approval of the registration request. The computer-implemented method also includes transmitting, using the at least one processor, the registration request, the first digital signature, and the second digital signature to a computing system. The computing system is configured to validate the first digital signature and the second digital signature, and based on the validation of the first and second digital signatures, to perform operations that record the public cryptographic key of the application program within an element of a distributed ledger.

Additionally, in some examples, an apparatus includes a communications interface, a memory storing instructions, and at least one processor coupled to the communications interface and to the memory. The at least one processor being configured to execute the instructions to receive, from a computing system via the communications interface, a registration request, a first digital signature applied to the registration request, and a second digital signature applied to the registration request and to the first digital signature, the registration request being generated by an application program executed at a device. The registration request includes a first public cryptographic key of the application program, and the second digital signature is indicative of an approval of the registration request by the computing system. The at least one processor is further configured to execute the instructions to validate the first digital signature using the first public cryptographic key, and validate the second digital signature using a second public cryptographic key of the computing system. Based on the validation of the first and second digital signatures, the at least one processor is further configured to execute the instructions to transmit, via the communications interface, the first public cryptographic key to one or more peer computing systems. The one or more peer computing systems are configured to perform operations that record the first public cryptographic key within an element of a distributed ledger.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1, 2A-2C, 3A, and 3B are block diagrams illustrating portions of an exemplary computing environment, in accordance with some exemplary embodiments.

DETAILED DESCRIPTION

Figure 1:
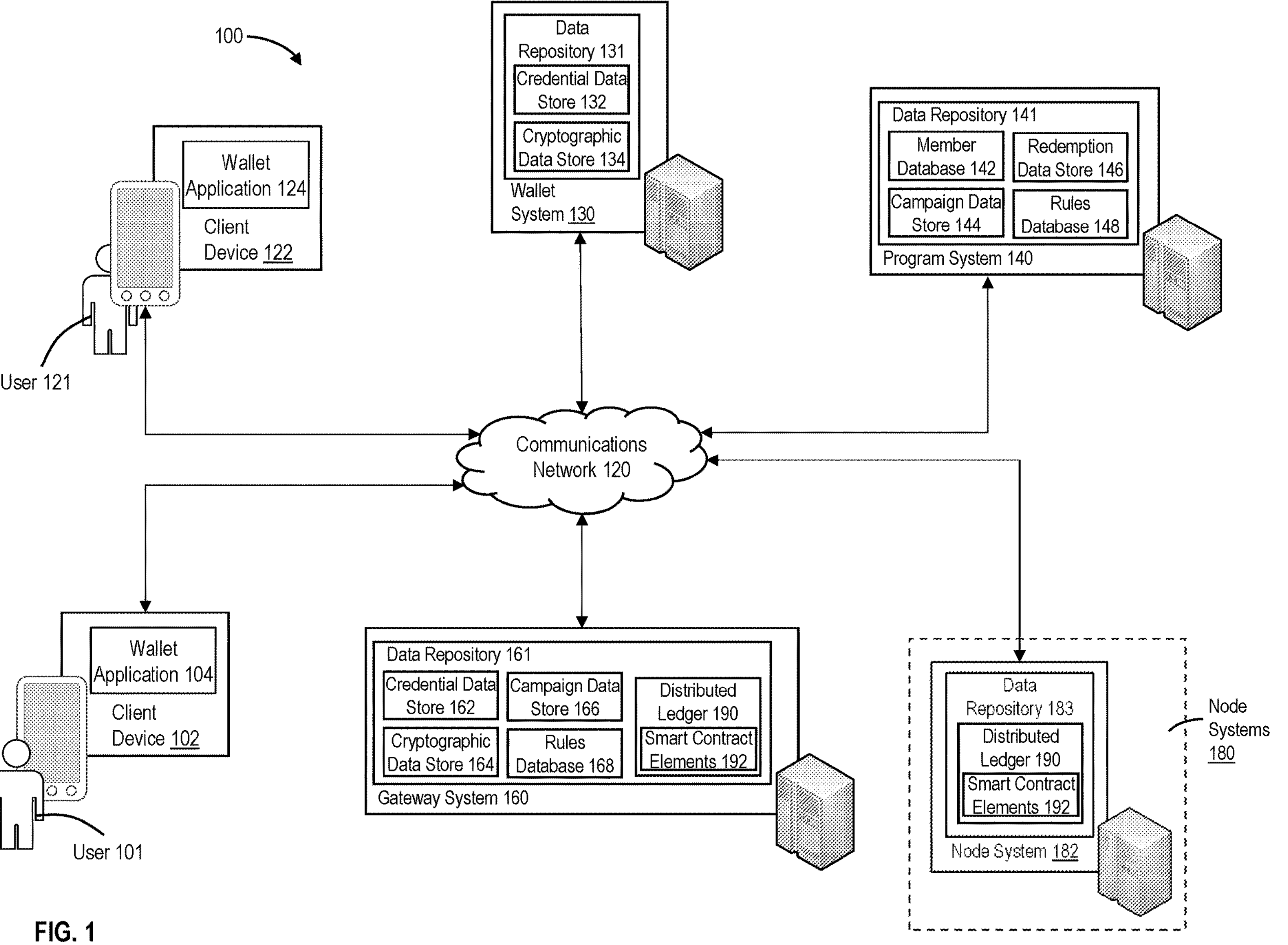

This specification relates to computer-implemented processes that, among other things, manage and track an interaction between a customer of a loyalty or rewards program and one or more computing systems associated with that loyalty or rewards program using permissioned distributed ledgers established and maintained within a program-specific, permissioned distributed-ledger network. By way of example, and as described herein, each customer of the loyalty program may be associated with unique cryptographic identifier, such as a public cryptographic key, that uniquely identifies the customer during interaction with the one or more computing systems, and within elements of data, e.g., interaction-specific, digitally signed data "objects," recorded immutably within the elements of the distributed ledger. For instance, a particular interaction between a customer and the loyalty program may involve data exchanged between multiple computing systems and devices within a distributed environment, and a digital signature applied to an interaction-specific data object by each of these multiple computing systems and devices may indicate an approval or, or a consent to, the particular interaction by the subset of these computing systems and devices associated with a particular one of the loyalty programs and further by computing systems and devices associated with multiple, cooperating loyalty or rewards programs.

In some instances, the loyalty program may be established and maintained by a financial institution or business on behalf of certain customers. By way of example, a business may establish a loyalty program that provides a customer with a specified number of "points" in response to a qualifying purchase of a product or service from that business. In other examples, a financial institution may establish a loyalty program that provides a customer with a specified number of points in response to an initiation of a purchase transaction involving a payment instrument or financial-services account issued by the financial institution. Each of the loyalty or rewards programs may also reward the customer with an additional, or alternate, numbers of points based on a referral of a previously unserved customer to that loyalty program, and may in some instances, may establish and enforce rules that enable the customer to exchange accrued points for discounts on various products or services.

Further, a computing system operated by each the financial institutions or businesses may perform operations that implement corresponding ones of the loyalty programs, e.g., based on program-specific customer identifiers, transactional data, and campaign data maintained within portions of locally or remotely accessible databases or data repositories. These computing systems may also perform operations that provision an executable application, such as a wallet application, to a computing device of each customer (e.g., a smart phone, etc.). When executed by each of the computing devices, the wallet application may enable each customer to interact with the computing systems and accrue or exchange points within a corresponding one of the loyalty programs and in accordance with portions of the campaign data.

While the operations implemented collectively by the executed wallet applications and computing systems may enable a particular customer to accrue loyalty points at a corresponding financial institution or business, and to exchange these accrued loyalty points for products or services offered for sale at one or more merchants having a relationship with the corresponding financial institution or business, these operations are often incapable of allowing a single customer to exchange points from a first loyalty program for corresponding points from a second loyalty program, or of facilitating a peer-to-peer transaction between members of multiple loyalty programs. Indeed, the customer identifiers and corresponding points are specific to each of the loyalty programs and to the corresponding computing systems, and these conventional processes facilitate minimal or no interoperability between the corresponding ones of the loyalty programs, much less between the loyalty programs and unrelated merchants or third parties (e.g., each loyalty program is implemented on a "closed" platform).

Certain of the exemplary processes described herein may establish a loyalty and rewards ecosystem based not on a program-specific point structure, but instead based on digital assets allocated and managed programmatically based on discrete elements of interaction data, e.g., data objects, recorded within elements of a cryptographically secure and permissioned distributed ledger. In some instances, the generation and recordation of these interaction-specific data objects onto the elements of the permissioned distributed ledger in conjunction with unique cryptographic customer identifiers may couple a customer identity to the cryptographic structure of the distributed ledger, which further provides a cryptographic proof of an authenticity of each exchange or transaction and an immutable record that establishes a tamper-evident history of the exchanges or transactions involving digital assets allocated to each of the customers. Further, the immutability and cryptographically secure properties of the permissioned distributed ledger may facilitate interoperability between loyalty programs and established and maintained by unrelated financial institutions and businesses, many of which are characterized by overlapping members.

A. Exemplary Computing Environments

FIG. 1 is a diagram of an exemplary computing environment 100, consistent with certain disclosed embodiments. For example, as illustrated in FIG. 1, environment 100 may include one or more computing devices, such as client device 102 operated by user 101, and client device 102 operated by user 121. Environment 100 may also include one or more computing systems associated application programs executed at client devices 102 and 122, such as wallet system 130, and one or more computing systems associated with a loyalty or rewards program, such as program system 140. Further, and as illustrated in FIG. 1, environment 100 may also include a gateway system 160 and one or more node systems 180, including node system 182, that perform any of the exemplary processes described herein to establish, manage, and update a cryptographically secure, permissioned distributed ledger, e.g., permissioned distributed ledger 190.

In some instances, each of client devices 102 and 122, wallet system 130, program system 140, gateway system 160, and node systems 180, including node system 182, may be interconnected through one or more communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

Each of client devices 102 and 122 may include one or more tangible, non-transitory memories that store data and/or software instructions and one or more processors configured to execute the software instructions. The stored software instructions may, for example, include one or more application programs, one or more application modules, or other elements of code executable by the one or more processors. For example, as illustrated in FIG. 1, client device 102 may store, within the one or more tangible, non-transitory memories, an executable wallet application 104, which may be provisioned to client device 102 and supported by wallet system 130. In some instances, and upon execution by the one or more processes of client device 102, wallet application 104 may establish communications with one or more of the computing systems within environment 100, and may perform any of the exemplary processes described herein to, among other things, request a registration as a member of loyalty program (e.g., based on a recordation of a public cryptographic key and corresponding registration data within the elements of the distributed ledger), or request a recordation of a regenerated public cryptographic key within the permissioned distributed ledger (e.g., in response to a detected occurrence of a regeneration event).

Further, and based on data exchanged with one or more of the computing systems of environment 100, executed wallet application 104 may also perform operations that, among other things, request an allocation of a digital asset in response to a completed and successful referral of an additional, unserved customer to the loyalty program, request a redemption of an allocated digital asset for physical or virtual products offered by the financial institution or business associated with the loyalty program, or transfer an allocated digital asset to an additional member of the loyalty program or to a member of another, unrelated loyalty program. In some examples, executed wallet application 104 may perform operations that apply a digital signature to data characterizing each of these requests, which, as described herein, may be indicative of an approval of, and a consent to, the requested registration, recordation, allocation, redemption, or transfer by user 101.

Client device 102 may also include a display unit coupled to the one or more processors and configured to present interface elements to user 101 and an input unit coupled to the one or more processors and configured to receive input from user 101. By way of example, the display unit may include, but is not limited to, an LCD display, a TFT display, and OLED display, or other appropriate type of display unit, and the input unit may include, but are not limited to, a keypad, keyboard, touchscreen, fingerprint scanner, stylus, or any other appropriate type of input unit. In some instances, the functionalities of the display and input units may be combined into a single device, such as a pressure-sensitive touchscreen display unit that can present interface elements and can detect an input from user 101 via a physical touch. Further, client device 102 may also include a communications unit or interface, such as one or more wireless transceivers, coupled to the one or more processors for accommodating wired or wireless internet communication with the one or more computing devices and systems operating within environment 100.

Further, although not illustrated in FIG. 1, client device 122 may also maintain, within the one or more tangible, non-transitory memories, an executable wallet application 124 provisioned to client device 122 and supported by wallet system 130. In some instances, and upon execution by the one or more processors of client device 122, executed wallet application 124 may cause client device 122 to initiate, and participate, any of the exemplary registration, recordation, allocation, redemption, or transfer processes described herein, e.g., based on interaction with one or more of the computing systems operating within environment 100, such as wallet system 130 or program system 140. Additionally, and as described herein, client device 122 may also include a display unit coupled to the one or more processors and configured to present interface elements to user 121, an input unit coupled to the one or more processors and configured to receive input from user 121, and a communications unit or interface coupled to the one or more processors for accommodating wired or wireless internet communication with the one or more computing devices and systems operating within environment 100.

In some instances, client device 102 may be associated with or operable by user 101, and client device 122 may be associated with or operable by user 101. Examples of client devices 102 and 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform one or more of the exemplary processes described herein.

Referring back to FIG. 1, each of wallet system 130, program system 140, gateway system 160, and node systems 180 (including node system 182) may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. Further, in some examples, each of wallet system 130, program system 140, gateway system 160, and node systems 180 (including node system 182) may include a communications unit or interface coupled to the one or more processors for accommodating wired or wireless communication across network 120 with any of the additional network-connected systems or devices described herein, e.g., a transceiver device.

For example, one or more of wallet system 130, program system 140, gateway system 160, and node systems 180 (including node system 182) may correspond to a discrete computing system, as described herein. In other instances, the functionalities of wallet system 130, program system 140, gateway system 160, and node systems 180 (including node system 182) may be performed by a single, discrete computing system operating within environment 100, or by a combination of discrete computing systems operating within environment 100. Further, in some instances, one or more of wallet system 130, program system 140, gateway system 160, and node systems 180 (including node system 182) may correspond to a distributed system that includes computing components distributed across one or more networks, such as network 120, or other networks, such as those provided or maintained by cloud-service providers (e.g., Google Cloud™, Microsoft Azure™, etc.).

To perform any of the exemplary processes described herein, wallet system 130 may maintain, within the one or more tangible, non-transitory memories, a data repository 131 that includes a credential data store 132 and a cryptographic data store 134. In some instances, credential data store 132 may maintain elements of structured or unstructured data that identify and characterize each executable wallet application provisioned to a corresponding device operating within environment 100 (e.g., executable wallet application 104 provisioned to client device 102), a customer associated with each of the provisioned executable wallet applications (e.g., user 101), and each of the corresponding devices (e.g., client device 102). For example, and for executable wallet application 104 provisioned to client device 102, the elements of credential data store 132 may include, but are not limited to, a unique application identifier of executable wallet application 104 (e.g., an application cryptogram, an alphanumeric identifier, etc.), authentication credentials associated with user 101 (e.g., an alphanumeric login credential, an alphanumeric password, or a biometric credential, such as a facial image or a thumbprint image, etc.), and a device identifier of client device 102 (e.g., an Internet Protocol (IP) address, a Media Access Control (MAC) address, etc.).

Further, credential data store 132 may also associate each of the application identifiers (e.g., the application cryptograms) with a corresponding public cryptographic key, which may serve as an identifier of each of the executable wallet applications. By way of example, credential data store 132 may include data elements that associate the application cryptogram (or other identifier) of executable wallet application 104, the authentication credentials of user 101, and the device identifier of client device 102 with a public cryptographic key of executable wallet application 104, which may be generated, or selectively re-generated by executable wallet application 104 using any of the exemplary processes described herein. In some instances, credential data store 132 may further associate the application identifiers of each of the provisioned executable wallet applications (e.g., the application cryptogram or other identifier or executable wallet application 104) with one or more digital tokens, such as, but not limited to, application-specific, one-time-use (OTU) tokens generated and provisioned to corresponding devices (e.g., client device 102) during any of the exemplary processes described herein.

In some examples, cryptographic data store 134 may include a public cryptographic key of wallet system 130, along with a corresponding private cryptographic key. Wallet system 130 may, for instance, perform operations that generate the public and private cryptographic keys using a Diffie-Hellman key exchange protocol, a Digital Signature Standard (DSS) key generation algorithm, an elliptic-curve key generation algorithm (e.g., an ECDPSA P-256 algorithm based on a random seed), an RSA encryption algorithm, a homomorphic key generation algorithm (e.g., a FTFHE scheme, a SEAL encryption scheme, or a PALISADE encryption scheme, etc.), or any other appropriate key generation algorithm. Cryptographic data store 134 may also maintain a public cryptographic key or a symmetric cryptographic key associated with one of the computing systems that operate within environment 100, such as program system 140 and gateway system 160.

Program system 140 may be associated with, and operated by, financial institution, merchant, or other business entity that establishes, maintains, and supports a corresponding loyalty or rewards program. By way of example, a financial institution may establish a loyalty program that allocates one or more redeemable and transferrable digital assets in response to an initiation of a purchase transaction involving a payment instrument or financial-services account issued by the financial institution (e.g., a "qualifying" transaction), or in response to a referral of a previously unserved customer to that loyalty program. As described herein, the allocated digital asset may correspond to a digital "coin" or other electronic asset, which a member of the loyalty program, such as user 101, may redeem for one or more predetermined physical or digital assets provisioned by the financial institution or a business entity associated with that financial institution (e.g., a stored-value card denominated in a fiat currency, etc.), may transfer to another member of the loyalty program (e.g., via a peer-to-peer transaction involving other physical or digital assets), or may transfer to a member of an additional, unrelated loyalty program (e.g., via a peer-to-peer transaction based on an exchange rate established by mutual agreement).

To perform any of the exemplary processes described herein, program system 140 may maintain, within the one or more tangible, non-transitory memories, a data repository 141 that includes a member database 142, a campaign data store 144, a redemption data store 146, and rules database 148. In some examples, member database 142 may include structured or unstructured data records that identify and characterize each of the members of the corresponding loyalty program, e.g., user of client devices executing corresponding wallet applications that perform any of the exemplary registration processes described herein. By way of example, and for a particular member of the loyalty program, such as user 101, the structured or unstructured records of member database 142 may include, but are not limited to, a unique identifier of user 101 (e.g., a name, a login credential, etc.), an identifier of a device operable by user 101 (e.g., the IP or MAC address of client device 102), contact information associated with user 101 (e.g., an email address of user 101, a telephone number assigned to client device 102, a social-media handle, etc.), and profile data associated with user 101 (e.g., a full name, address, transaction preferences, values of demographic parameters, etc.). In some instances, all or a selected portion of the structured or unstructured data records maintained within member database 142 on behalf of user 101, or on behalf of other members of the loyalty program, may be immutably recorded within the elements of distributed ledger 190, e.g., as registration objects generated through any of the exemplary processes described herein.

Campaign data store 144 may include elements of campaign data identifying one or more prior, pending, or future campaigns associated with the loyalty program operated by the financial institution. By way of example, campaign data store 166 may include elements of campaign data that specify a redeemable and transferrable digital asset (e.g., a digital coin, etc.), or a number of units of that digital asset, for allocation to a member of the loyalty program upon initiation and successful execution of a transaction involving a qualifying product or service, or involving a qualifying payment instrument or financial services account issued by the financial institution (e.g., a "qualifying" transaction).

In other examples, campaign data store 144 may include elements of campaign data that identify and characterize a referral campaign, which enables a member of the loyalty program (e.g., user 101 associated with client device 102) to refer an additional customer of the financial institution for membership in the loyalty program (e.g., user 121 associated with client device 122). Further, and responsive to a registration of the additional customer within the loyalty program using any of the exemplary processes described herein (e.g., a "successful" referral), the referral campaign may allocate a redeemable and transferrable digital asset (e.g., a digital coin, etc.), or a number of units of that digital asset, to the current member as a reward for the now-successful referral and to the additional customer as an incentive for registering for membership in the loyalty program. For instance, the elements of campaign data that characterize the referral campaign may include temporal data that specifies a duration of the campaign, eligibility data that identifies on-boarding and eligibility criteria applicable to the additional customer, and allocation data specifying one or more allocation rules that, when satisfied, trigger an allocation of the redeemable and transferrable digital asset, or the numbers of units of that digital asset, to each of the existing and additional customers in response to the successful referral.

Redemption data store 146 may include elements of redemption data that identify one or more physical or digital products (e.g., a stored-value or "gift" card denominated in a fiat currency, etc.) redeemable by members of the loyalty program in exchange for the digital assets (e.g., the units of the digital coins) allocated through participation in the exemplary qualifying transactions or the referral campaigns described herein, or received through the exemplary peer-to-peer (P2P) transfers described herein. For example, the elements of redemption data may specify each of the physical or digital products, and further identify each of the digital assets, of quantities of the digital assets, redeemable for corresponding ones of these redeemable assets, Further, rules database 148 may include elements of data that facilitate peer-to-peer transactions involving members of differing loyalty or rewards programs and digital assets allocated within the differing loyalty or rewards programs. For example, rules database 148 may include exchange data that specifies a mutually agreeable rate of exchange between a unit of the digital asset allocated by the loyalty program of the financial institution and corresponding units of additional digital assets allocated to members of other loyalty or rewards programs, e.g., as established by other financial institutions, merchants, or businesses. Further, in some instances, the elements of rules database 148 may also identify and specify one or more transaction rules applicable to the peer-to-peer (P2P) transactions involving the members of differing loyalty or rewards programs. By way of example, the transaction rules may establish minimum or maximum values for each of the peer-to-peer transactions (e.g., lower or upper bounds), may establish a maximum transaction velocity for the counterparties involved in the peer-to-peer transactions (e.g., an upper bound on a number of executed peer-to-peer transactions during a predetermined time period), or may establish a minimum balance of digital assets to a current member of the loyalty program involved in the peer-to-peer transaction (e.g., the balance of digital assets available for transfer exceeds a quantity of digital assets involved in a peer-to-per transaction by a predetermined amount). The elements of rules database 148 may also identify and characterize one or more fraud detection and mitigation processes application to the exemplary asset-redemption transactions and P2P transaction described herein.

In some instances, not illustrated in FIG. 1, program system 140 may transmit all, or a selected portion of the elements of campaign data maintained within campaign data store 144, the elements of redemption data maintained within redemption data store 146, and additionally, or alternatively, the data maintained within rules database 148, across network 120 to gateway system 160, e.g., via a secure, programmatic communications channel. Additionally, or alternatively, program system 140 may also transmit all, or a selected portion, of the elements of the campaign data maintained within campaign data store 144 (e.g., the temporal data, the eligibility data, and/or the allocation data) and rules database 148 (e.g., the exchange data and the transaction rules), to one or more of node systems 180, which may perform any of the exemplary processes described herein to record the transmitted elements of campaign data within one or more elements of distributed ledger 190, which may be accessible to gateway system 160.

Referring back to FIG. 1, gateway system 160 may perform operations that validate one or more of the exemplary requests for registration, key-regeneration, allocation, redemption, or transfer processes described herein, which may be generated by a wallet application executed at a corresponding one of the devices operating within environment 100 (e.g., by wallet application 104 executed at client device 102), and which may be processed and approved by wallet system 130. By way of example, a corresponding one of the exemplary requests may include at least at first digital signature applied by the executed wallet application (e.g., that indicates and approval of and consent to the corresponding request by a user associated with the executed wallet application), and a second digital signature applied by wallet system 130 (e.g., that indicates the approval or and consent to the corresponding request by wallet system 130), and gateway system 160 may perform any of the exemplary processes described herein to validate the corresponding request based on, among other things, a verification of the first and second digital signatures and a determination that the corresponding requests is consistent with one or more fraud detection and mitigation processes, or one or more transaction rules, associated with the corresponding request. Based on the determined validity of the corresponding request, gateway system 160 may perform additional processes that broadcast elements of request- and customer-specific data, e.g., data "objects," to one or more of node systems 180 for recordation one or more elements of distributed ledger 190.

To perform any of the exemplary processes described herein, gateway system 160 may maintain, within the one or more tangible, non-transitory memories, a data repository 161 that includes a credential data store 162, cryptographic data store 164, a campaign data store 166, and a rules database 168. In some instances, credential data store 162 may maintain elements of structured or unstructured data that identify and characterize one or more executable wallet application provisioned to corresponding devices operating within environment 100 (e.g., executable wallet application 104 provisioned to client device 102), and each of the corresponding devices (e.g., client device 102). For example, and for executable wallet application 104 provisioned to client device 102, the elements of credential data store 162 may include, but are not limited to, a unique application identifier of executable wallet application 104 (e.g., an application cryptogram, an alphanumeric identifier, etc.), a device identifier of client device 102 (e.g., an Internet Protocol (IP) address, a Media Access Control (MAC) address, etc.), and challenge data that includes an application-specific code challenge having a predetermined format or composition (e.g., a hash value of a plaintext cipher maintained at gateway system 160).

In some examples, cryptographic data store 164 may include a public cryptographic key of gateway system 160, along with a corresponding private cryptographic key. Gateway system 160 may, for instance, perform operations that generate the public and private cryptographic keys using a Diffie-Hellman key exchange protocol, a Digital Signature Standard (DSS) key generation algorithm, an elliptic-curve key generation algorithm (e.g., an ECDPSA P-256 algorithm based on a random seed), an RSA encryption algorithm, a homomorphic key generation algorithm (e.g., a FTFHE scheme, a SEAL encryption scheme, or a PALISADE encryption scheme, etc.), or any other appropriate key generation algorithm. Cryptographic data store 164 may also maintain a public cryptographic key or a symmetric cryptographic key associated with one of the computing systems that operate within environment 100, such as wallet system 130, program system 140, and node system 180 (including node system 182).

Campaign data store 166 may include any of the exemplary elements of campaign data described herein (e.g., in reference to campaign data store 144 of program system 140), and rules database 168 may include any of the exemplary elements of transaction-specific rules and fraud detection and mitigation processes described herein (e.g., in reference to rules database 148 of program system 140). Gateway system 160 may also maintain, within data repository 161, a local version of distributed ledger 190. In some instances, and as described herein, distributed ledger 190 may include elements that maintain a cryptographically secure and immutable record of each of customer registered within the loyalty program established and maintained by the financial institution, and further, a time evolving record of the public cryptographic keys that identify each of the registered customers, e.g., a customer-specific certificate chain. The elements of distributed ledger 190 may also establish and maintain a cryptographically secure, immutable, and time-evolving record of not only the digital assets allocated to and redeemed by each of the members of the loyalty program, but also of the digital assets transferred to, and received from, counterparties through peer-to-peer transactions.

In some examples, as the members of the loyalty program are identified within the elements of distributed ledger 190 by corresponding public cryptographic keys, the elements of permissioned distributed ledger 190 (and each additional or alternate one of the exemplary permissioned distributed ledger described herein) may be queried, e.g., via a distributed smart contract, to identify a current balance of digital assets available for redemption or transfer. For instance, as illustrated in FIG. 1, permissioned distributed ledger 190 may include one or more elements, such as smart contract elements 192, that record code or software instructions that, when executed by one or more of node systems 180 (including node system 182), query additional elements of permissioned distributed ledger 190 to compute a balance of digital assets associated with a particular public cryptographic key (e.g., that identifies executed wallet application 104 of client device 102) and available for redemption or transfer. In other examples, not illustrated in FIG. 1, all or a selected portion of campaign data store 166 and rules database 168 may be recorded within the elements of distributed ledger 190.

In some examples, gateway system 160 and each of node systems 180, including node system 182, may collectively form a portion of a permissioned, distributed-ledger network, and each of gateway system 160 and node systems 180, including node system 182, may maintain a local version of permissioned distributed ledger 190 within a corresponding tangible, non-transitory memory (e.g., within data repository 161 of gateway system 160, and within data repository 183 of node system 182). As described herein, one or more of node systems 180, including node system 182, may establish, maintain, or update permissioned distributed ledger 190 using, among other things, one or more consensus-based processes, and may broadcast updated versions of distributed ledger 190 across network 120 to the other components of the permissioned, distributed-ledger network. In other instances, a selected one of node systems 180, such as node system 182, may perform operations that establish, maintain, or update distributed ledger 190 directly and without consensus-based processing, and may broadcast the updated version of distributed ledger 190 across network 120 to other ones of node systems 180 and to gateway system 160.

B. Secure Generation and Distribution of Cryptographic Keys within a Computing Environment Using Permissioned Distributed Ledgers In some examples, and as described herein, program system 140 may perform operations that generate one or more elements of campaign data (e.g., as maintained within campaign data store 144) that identify, specify, and characterize a referral campaign operative within a loyalty program established and maintained by the financial institution. For instance, the referral campaign may enable a current member of the loyalty program, e.g., user 101, to refer an additional customer of the financial institution for membership in the loyalty program, and responsive to a successful registration of the additional customer as a member of the loyalty program, the referral campaign may designate a redeemable or transferrable digital asset (e.g., a digital "coin"), or units of that digital asset, for allocation to the current member as a reward for the now-successful referral and to the additional customer as an incentive to register for membership in the loyalty program.

Figure 2A:
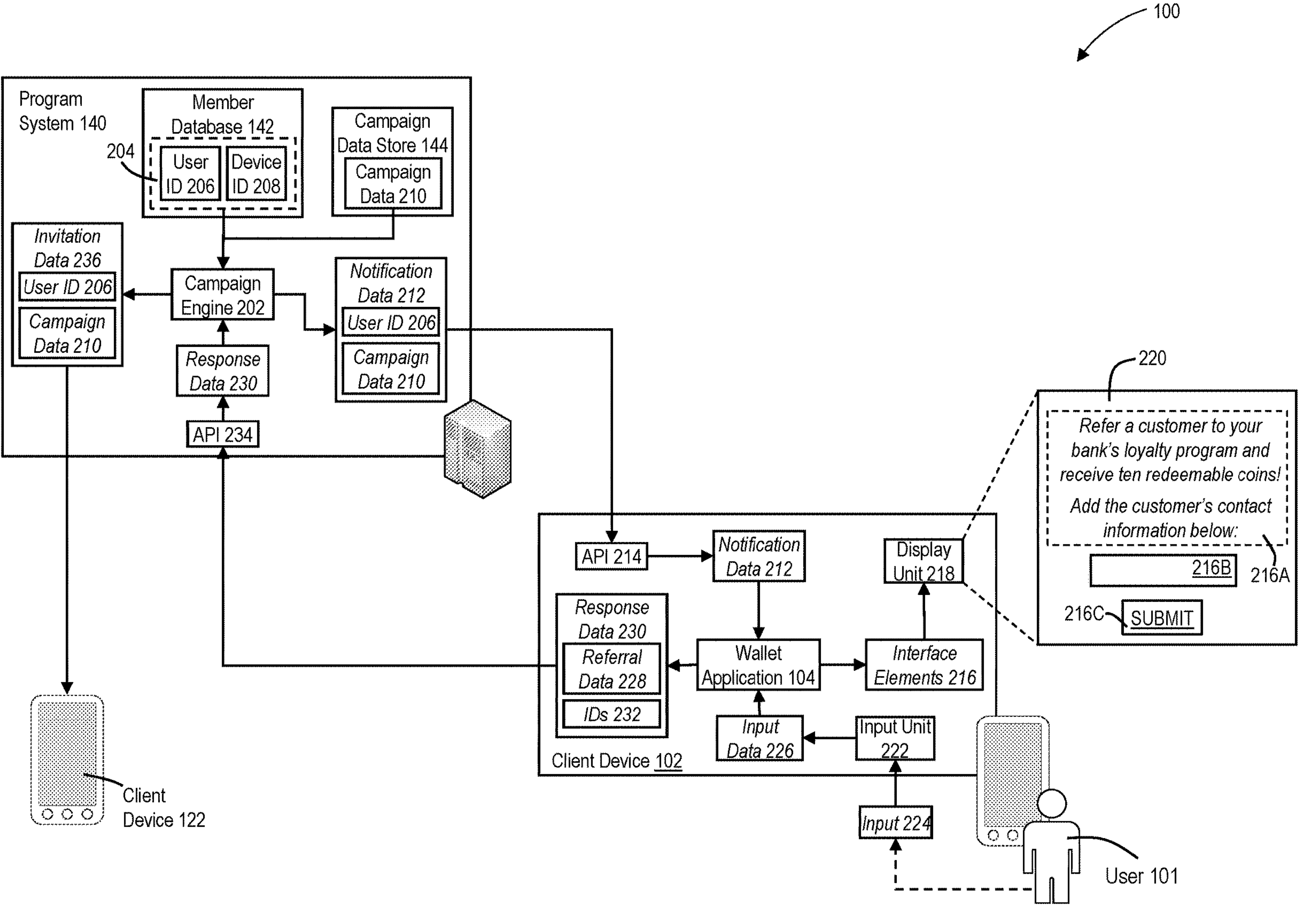

Referring to FIG. 2A, a campaign engine 202 executed by the one or more processors of program system 140 may access member database 142, and may further access one or more structured or unstructured data records 204, which identify and characterize a current member of the loyalty program, such as user 101. As described herein, data records 204 may include information that identifies user 101, the device associated with user 101 (e.g., the IP or MAC address of client device 102), along with additional elements of contact information and profile data that identify and characterize user 101. In some instances, executed campaign engine 202 may extract, from data records 204, a user identifier 206 of user 101 (e.g., the name of user 101, such as "John Stone") and a device identifier 208 of client device 102 (e.g., the IP address).

Further, executed campaign engine 202 may also perform operations that access campaign data store 144, and obtain one or more elements 210 of the campaign data that identify and characterize the referral campaign. For example, and as described herein, campaign data elements 210 may include temporal data that specifies a duration of the referral campaign, eligibility data that identifies on-boarding and eligibility criteria applicable to the additional customer, and allocation data specifying one or more allocation rules that, when satisfied, trigger an allocation of the redeemable and transferrable digital asset, or the numbers of units of that digital asset, to the current member of the loyalty program in response to a successful referral. Executed campaign engine 202 may package user identifier 206 and all, or a selected portion, of campaign data elements 210, into corresponding portions of notification data 212, which program system 140 may transmit across network 120 to client device 102, e.g., using the IP address specified within device identifier 208.

A programmatic interface associated with wallet application 104, such as application programming interface (API) 214, may receive notification data 212 from program system 140. In some instances, API 214 may perform operations that trigger an execution of wallet application 104 by the one or more processors of client device 102, and may provide notification data 212 as an input to executed wallet application 104. Executed wallet application 104 may receive notification data 212, and may process notification data 212 and generate interface elements 216 that, when rendered for presentation by display unit 218, collectively establish one or more display screens of a referral interface 220.

For example, as illustrated in FIG. 2A, referral interface 220 may include interface elements 216A, which request that user 101 provide additional input referring a customer of the financial institution to the loyalty program in exchange for one or more redeemable and transferrable digital assets (e.g., "Refer a customer to your bank's loyalty program and receive ten redeemable coins!," etc.). Referral interface 220 may also include an interactive interface element, e.g., fillable text box 216B, which receives and displays input from user 101 identifying the referred customer, and a selectable interface element, e.g., "SUBMIT" icon 216C, which upon selection by user 101, causes client device 102 generate and transmit a response to notification data 212 that includes referral information identifying the referred customer to program system 140.

For example, and upon viewing referral interface 220, user 101 may elect to refer an additional customer of the financial institution to the loyalty program and obtain the specified units of the digital asset (e.g., the ten units of the digital coin) in exchange for the referral. To refer the additional customer, user 101 may provide, via an input unit 222 of client device 102, input 224 that specifies a mobile telephone number of a device operated by the additional customer (e.g., "555-123-4567") within fillable text box 216B, and that selects "SUBMIT" icon 216C. In other instances, user 101 may provide additional or alternate input to fillable text box 216B, such as, but not limited to, an email address of the additional customer, an identifier of the additional customer within one or more social-media networks, a full name of the additional customer, or any additional or alternate information that facilitates an identification of the additional customer or the mobile device associated with the customer by program system 140.

Referring back to FIG. 2A, input unit 222 may receive input 224 (e.g., that specifies the mobile phone number "555-123-4567" within fillable text box 216B and selects "SUBMIT" icon 216C) and may route input data 226 representative of the received input to executed wallet application 104. In some instances, executed wallet application 104 may parse input data 226 and extract referral information 228 that identifies the additional customer referred to the loyalty program by user 101, e.g., the mobile telephone number "555-123-4567" of the mobile device associated with the additional customer. Further, executed wallet application 104 may perform operations that package referral information 228 into a corresponding portion of a response to notification data 212 (e.g., within response data 230), along with one or more identifiers 232 of user 101 (e.g., a login credential of user 101 for executed wallet application 104, etc.), client device 102 (e.g., the IP address, etc.), or executed wallet application 104 (e.g., an application cryptogram, etc.). Executed wallet application 104 may perform further operations that cause client device 102 to transmit response data 230 across network 120 to program system 140.

A programmatic interface associated with executed campaign engine 202, such as application programming interface (API) 234, may receive and route response data 230 to executed campaign engine 202, which may parse response data 230 to extract referral information 228 and the one or more of identifiers 232. In some instances, and based on the one or more identifiers 232 (e.g., that identify user 101, client device 102, or wallet application 104) and on accessed data record 204 of membership database 142 (which, among other things, identifies user 101 as a current member of the loyalty program and associates client device 102 with user 101), executed campaign engine 202 may confirm that response data 230 represents a valid response to notification data 212 generated by a device associated with the current member of the loyalty program. Further, and based on referral information 228 (e.g., the mobile telephone number "555-123-4567"), executed campaign engine 202 may perform operations that parse member database 142 to determine whether any data records include, or reference, any portion of referral information 228 and as such, to confirm whether the additional customer associated with referral information 228 does not represent a current member of the loyalty program.

For example, if executed campaign engine 202 were to determine that response data 230 does not represent a valid response generated by the current member, or if executed campaign engine 202 were to identify one or more of the data records of member database 142 that include or reference referral information 228 (e.g., that the additional customer represents a current member of the loyalty program), executed campaign engine 202 may discard response data 230 and generate and transmit an error message indicative of a failed referral across network 120 to client device 102, e.g., for presentation within a display screen of referral interface 220 (not illustrated in FIG. 2A).

In other examples, if executed campaign engine 202 were to determine that response data 230 represent a valid response, and that the additional customer does not represent a current member of the loyalty program (e.g., that the data records of member database 142 neither include nor reference referral information 228), executed campaign engine 202 may establish that the additional customer represents a valid referral to the loyalty program. Based on the determination that the additional customer represents the valid referral, executed campaign engine 202 may perform operations that generate invitation data 236 that invites the additional customer to register for membership in the loyalty program in exchange for a redeemable and transferrable digital asset, or a predetermined number of units of that digital asset.

For example, executed campaign engine 202 may perform any of the exemplary processes described herein to access campaign data elements 210 within campaign data store 144, which identify and characterize the referral campaign. As described herein, campaign data elements 210 may include temporal data that specifies a duration of the referral campaign, eligibility data that identifies on-boarding and eligibility criteria applicable to the additional customer, and allocation data specifying one or more allocation rules that, when satisfied, trigger an allocation of the redeemable and transferrable digital asset, or the numbers of units of that digital asset, to the current member of the loyalty program in response to a successful referral. Executed campaign engine 202 may package all, or a selected portion, of campaign data elements 210 into corresponding portions of invitation data 236.

Additionally, in some instances, executed campaign engine 202 may also package, into a portion of invitation data 236, information that identifies the current member that referred the additional customer to the loyalty program, such as user identifier 206 that identifies user 101. Executed campaign engine 202 may also perform operations that identify a mode of communication associated with, and consistent with, referral information 228, and that cause program system 140 to establish a channel of communications with the device operated by the additional customer in accordance with the identified communications module and with referral information 228, e.g., directly or through one or more intermediate systems (not illustrated in FIG. 2A).

By way of example, the additional customer referred by user 101 may correspond to user 121, and the mobile phone number specified by referral information 228 (e.g., "555-123-4567") may be associated with client device 122. In some instances, executed campaign engine 202 may perform operations that cause program system 140 to transmit invitation data 236 across network 120 to the mobile phone number of client device 122, e.g., as a message using multimedia messaging service (MMS) protocols, using short message service (SMS) protocols, or using additional or alternate messaging protocols that facilitate a transmission of invitation data 236 to the mobile phone number of client device 122. The disclosed embodiments are, however, not limited to processes that transmit invitation data 236 to the device of the additional customer through MMS or SMS messaging, and in other examples, referral information 228 may identify data indicative of one or more additional, or alternate, modes of communications for transmitting invitation data 236 to client device 102.

For instance, referral information 228 may specify an email address associated with user 121 (e.g., the additional customer), and executed campaign engine 202 may perform operations that cause program system 140 to transmit invitation data 236 as an attachment to, or an integrated portion of, an email message forwarded to the specified email address of user 121. In other instances, referral information 228 may specify a handle or identifier of user 121 within a social-media network, or within one or more messaging applications, and executed campaign engine 202 may perform operations that cause program system 140 to transmit invitation data 236 as an attachment to, or an integrated portion of, a message directed to the social-media handle or the messaging handle of user 101. Further, in other instances, referral information 228 may include an identifier of user 121 or client device 122 within any additional or alternate messaging or communications platform available to program system 140 and to campaign engine 202.

In some examples, client device 122 may receive invitation data 236 as a message associated with a corresponding messaging or communications platform (e.g., as a portion of an MMS text message, a SMS text message, and email message, etc.), and the one or more processors of client device 122 may execute a messaging application associated with the messaging or communications platform (e.g., a text-messaging application, and email client, etc.), which may present the received message within a corresponding messaging interface (not illustrated in FIG. 2A). For example, the presented message may include a deep link to one or more additional application programs executed by client device 122, and based on input provided to the input unit of client device 102 that selects the deep link, the executed messaging application may perform operations that programmatically trigger an execution of wallet application 124, and that provide invitation data 236 as an input to executed wallet application 124 through a corresponding programmatic interface (neither of which are illustrated in FIG. 2A). In some examples, and as described herein, executed wallet application 124 may present all or a selected portion of invitation data 236 within a corresponding digital interface, and based on additional input received via the corresponding input unit, perform additional operations that initiate a cryptographically secure process that facilitates a registration of user 121 into the loyalty program and a recordation of a cryptographically secure registration object that uniquely identifies and characterizes user 121, and interaction between user 121 and the loyalty program, within an element of a distributed ledger, e.g., permissioned distributed ledger 190 of FIG. 1.

Referring to FIG. 2B, executed wallet application 124 may receive invitation data 236 via the secure, programmatic interface described herein, e.g., via an application programming interface (API) 238. In some examples, executed wallet application 124 may process invitation data 236 and generate interface elements 239 that, when rendered for presentation by the corresponding display unit (e.g., display unit 240), collectively establish one or more display screens of an invitation interface 242. For example, as illustrated in FIG. 2B, a display screen 243 of invitation interface 242 may include interface elements 243A, which request that user 101 provide additional input that accepts an invitation to register as a member of the loyalty program within a specified temporal period in exchange for one or more redeemable and transferrable digital assets (e.g., "Congratulations! Register for your bank's loyalty program by December 31$^{st}$ and receive ten digital coins!"). Referral interface 220 may also include a first selectable interface element, e.g., "ACCEPT" icon 243B, which upon selection by user 121, causes executed wallet application 124 to perform operations that, in conjunction with wallet system 130 and gateway system 160, initiate and implement one or more of the exemplary, distributed-ledger-based registration processes described herein. Further, referral interface 220 may include a second selectable interface element, e.g., "DECLINE" icon 243C, which upon selection by user 121, indicates an intention by user 121 to decline the invitation for membership in the loyalty program and the proffered digital assets.

For example, user 121 may elect to accept the invitation from program system 140 and to register as a member of the loyalty program exchange for the proffered units of the redeemable and transferrable digital assets. To accept the invitation and initiate a performance of the exemplary, distributed-ledger-based registration processes described herein, user 121 may provide, via an input unit 244 of client device 122, input that selects "ACCEPT" icon 243B of invitation interface 242. Further, although not illustrated in FIG. 2B, the selection of "ACCEPT" icon 243B may cause display unit 240 to present interface elements that establish one or more additional screens of invitation interface 242 that prompt user 121 to provide further input specifying one or more authentication credentials, such as, but not limited to, a login credential, an alphanumeric password, or a biometric credential (e.g., a thumbprint image, a facial image, etc.).

Further, in some examples (and also not illustrated in FIG. 2B), the one or more additional display screens of invitation interface may also prompt user 121 to provide further input specifying one or more elements of profile data, or modifying one or more elements of previously specified profile data, that identify and characterize user 121. For instance, the elements of profile data may include, but are not limited to, a full name of user 121, a street address of user 121, contact information associated with user 121 (e.g., an email address of telephone number), demographic data characterizing user 121 (e.g., an age, gender, educational level, etc., of user 121), or one or more transactional preferences of user 121. Additionally, in some instances, display unit 240 may perform operations that present the one or more additional display screens prompting user 101 to specify the element of profile data subsequent to the presentation of display screen 243, and prior to the presentation of the one or more additional display screens that prompt user 121 to specify the authentication credentials.

Referring back to FIG. 2B, input unit 244 may receive input 246 (e.g., that specifies the selection of "ACCEPT" icon 243B, the one or more authentication credentials of user 121, and in some instances, the elements of profile data), and may route input data 248 representative of the received input to executed wallet application 124. By way of example, executed wallet application 124 may parse input data 248 and extract confirmation data 250, which confirm the selection of "ACCEPT" icon 243B by user 121 and an intention of user 121 to accept the invitation to register for membership within the loyalty program (and further, to accept the proffered units of the redeemable and transferable digital assets). Executed wallet application 124 may also parse input data 248 to extract authentication data 252, which correspond to the authentication credentials provided to input unit 244 in response to the additional screens of invitation interface 242 (e.g., presented subsequent to the selection of "ACCEPT" icon 243B). Further, in some instances, executed wallet application 124 may parse input data 248 customer profile data 253, which includes the elements of the profile data specified or modified by user 121.

Executed wallet application 124 may store authentication data 252 and in some instances, confirmation data 250 and customer profile data 253, within a portion of the one or more tangible, non-transitory memories of client device 122, e.g., within a credential data store 126. As illustrated in FIG. 2B, credential data store 126 may also include a device identifier 254 of client device 102 (e.g., a network address, such as an IP address or MAC address) and an identifier of executed wallet application, such as, but not limited to, application cryptogram 256. In some examples, wallet system 130 may generate and provide application cryptogram 256 to client device 122 during an initial onboarding process that provisions wallet application 124 to client device 122.

In some examples, and responsive to a detection of confirmation data 250 indicative of the acceptance of the invitation, executed wallet application 124 may perform operations that package authentication data 252 (e.g., the authentication credentials provisioned by user 121), application cryptogram 256 (e.g., that identifies executed wallet application 124), and additionally, or alternatively, device identifier 254 (e.g., that identifies client device 122) into corresponding portion of an authentication request 258, which client device 102 may transmit across network 120 to wallet system 130. As illustrated in FIG. 2B, a programmatic interface established and maintained by wallet system 130, such as application programming interface (API) 260 may receive authentication request 258, and may programmatic trigger an execution of an authentication engine 262 by the one or more processors of wallet system 130 (e.g., based on a generation of one or more electronic commands). Upon execution by the one or more processors of wallet system 130, authentication engine 262 may receive authentication request 258, and may perform operation that parse authentication request 258 to extract authentication data 252, which includes the authentication credentials supplied by user 121, application cryptogram 256, and in some instances, device identifier 254.

Executed authentication engine 262 may also access credential data store 132 (e.g., as maintained within data repository 131 within the one or more tangible, non-transitory memories of wallet system 130), and may identify one or more data records, such as data record 264, that include or reference device identifier 254 or application cryptogram 256 and as such, are associated with executed wallet application 124. In some instances, executed authentication engine 262 may parse data record 264, extract local authentication credentials 266 associated with executed wallet application 124 and user 121, and authenticate an identity of user 121 based on a comparison of authentication data 252 and local authentication credentials 266.

For example, if executed authentication engine 262 were to detect an inconsistency between authentication data 252 and local authentication credentials 266, executed authentication engine 262 may decline to authenticate the identity of user 121 (not illustrated in FIG. 2B). In some instances, executed authentication engine 262 may generate an error message indicative of the failed authentication, and may perform operations that cause wallet system 130 to transmit the generated error message across network 120 to client device 122, e.g., for display within a portion of invitation interface 242 by executed wallet application 124 (also not illustrated in FIG. 2B).

Alternatively, if executed authentication engine 262 were to establish a consistency between authentication data 252 and local authentication credentials 266, executed authentication engine 262 may authenticate the identity of user 121, and may perform operations that generate a digital token 268 indicative of the authenticated identity user 121, which executed authentication engine 262 may store within a portion of credential data store 132 associated with executed wallet application 124, e.g., within or in association with data record 264. In some examples, digital token 268 may correspond to a one-time-use (OTU) token valid to authenticate the identity of user 121 during a single registration, key-regeneration, or digital-asset-allocation, -redemption, or -transfer process, and may be characterized by a predetermined composition, length, or format. The disclosed embodiments are, however, not limited to OTU tokens, and in other examples, digital token 268 may be valid to authenticate an identity of user 121 during a predetermined temporal period, or for processes initiated within a predetermined geographic region. Executed authentication engine 262 may perform further processes that cause wallet system 130 to transmit digital token 268 across network 120 to client device 122, e.g., as a response to authentication request 258.

A programmatic interface established and maintained by client device 122, such, such as API 238 of executed wallet application 124, may receive and route digital token 268 to executed wallet application 124 (not illustrated in FIG. 2B). In some instances, executed wallet application 124 may store digital token 268 within a corresponding portion of credential data store 126, e.g., in association with authentication data 252, device identifier 254, and application cryptogram 256. As described herein, digital token 268 may be indicative of a successful authentication of the identity of user 121 by wallet system 130, and based on that successful authentication, executed wallet application 124 may perform operations that generate a public cryptographic key 272 and corresponding private cryptographic key 274 using one or more appropriate key generation algorithms, such as, but not limited to a Diffie-Hellman key exchange protocol, a Digital Signature Standard (DSS) key generation algorithm, or an elliptic-curve algorithm (e.g., ECDPSA P-256 algorithm based on a random entropic seed), an RSA encryption algorithm, or a homomorphic key generation algorithm (e.g., a FTFHE scheme, a SEAL encryption scheme, or a PALISADE encryption scheme).

Executed wallet application 124 may store public cryptographic key 272 and private cryptographic key 274 within a secure portion of the one or more tangible, non-transitory memories of client device 122, e.g., within cryptographic data store 128. In some instances, cryptographic data store 128 may correspond to a secure enclave or a key store within the one or more tangible, non-transitory memories, although in other instances, cryptographic data store 128 may represent a hardware security module (HSM) integrated onto or coupled to client device 122. As described herein, public cryptographic key 272 may be distributed to one or more additional computing systems operating within environment 100, such as wallet system 130, gateway system 160, and node systems 180, and may represent a unique identifier of both user 121 and executed wallet application 124 within the elements of permissioned distributed ledger 190.

Figure 2C:
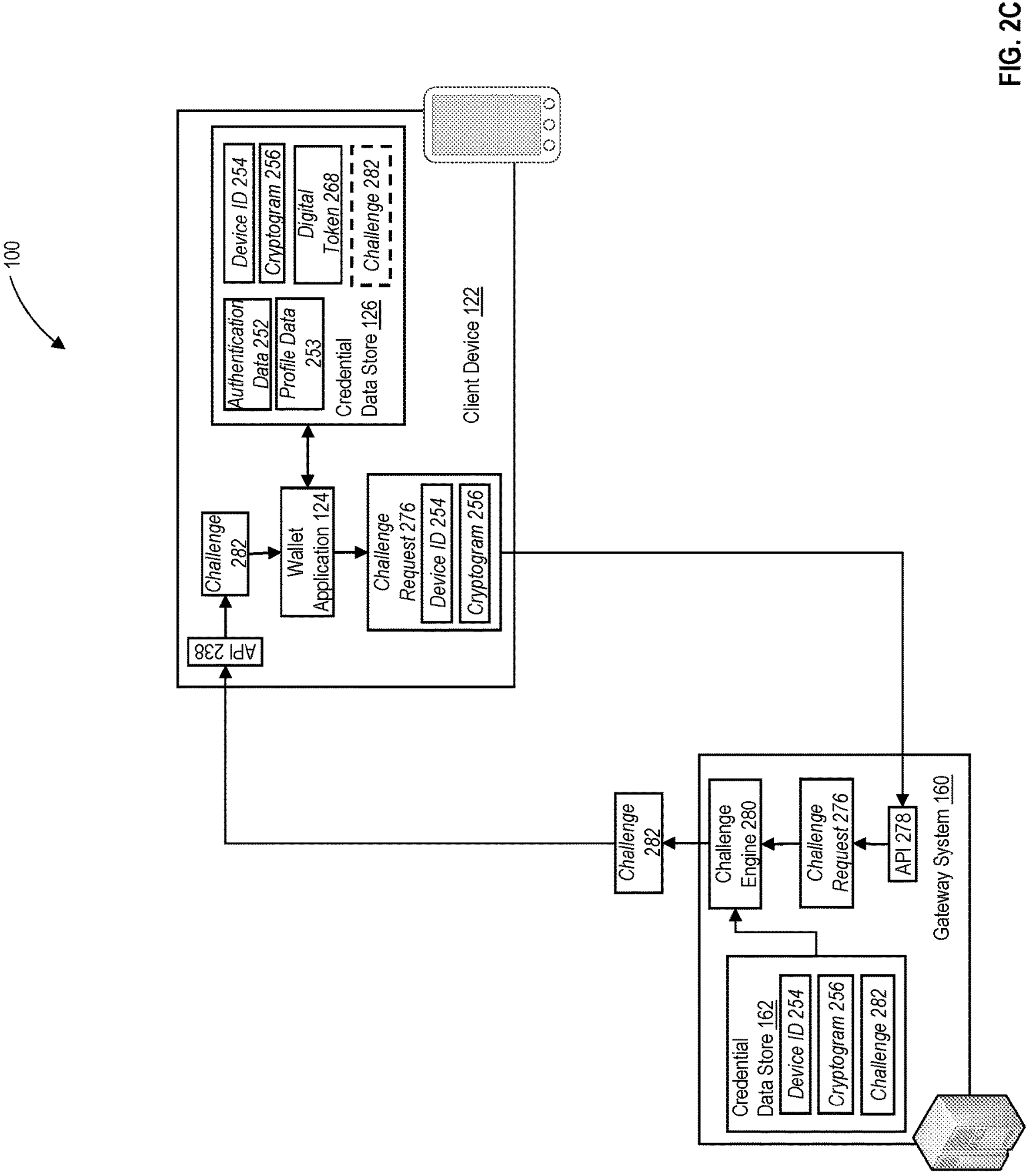

Further, and referring to FIG. 2C, executed wallet application 124 may also perform operations to that package device identifier 254 (e.g., that identifies client device 122) and additionally, or alternatively, application cryptogram 256 (e.g., that identifies executed wallet application 124), into corresponding portion of a challenge request 276, which client device 122 may transmit across network 120 to gateway system 160. As illustrated in FIG. 2B, a programmatic interface established and maintained by gateway system 160, such as application programming interface (API) 278 may receive challenge request 276, and may programmatically trigger an execution of a challenge engine 280 by the one or more processors of gateway system 160. Upon execution by the one or more processors of gateway system 160, challenge engine 280 may receive challenge request 276 and generate a code challenge 282, which executed challenge engine 280 may store in a corresponding portion of credential data store 162 in conjunction with device identifier 254 and/or application cryptogram 256. In some instances, code challenge 282 may correspond to a hash value representative of a portion of the information included within challenge request 276 (e.g., a hash value representative of all or a selected portion of device identifier 254 and/or application cryptogram 256), or may correspond to a hash value representative of a plaintext cipher maintained at gateway system 160.

Executed challenge engine 280 may also perform operations that cause gateway system 160 to transmit code challenge 282 across network 120 to client device 122. As illustrated in FIG. 2B, a programmatic interface established and maintained by client device 122, such, such as API 238 of executed wallet application 124, may receive and route code challenge 282 to executed wallet application 124, which may store code challenge 282 within a corresponding portion of credential data store 126, e.g., in association with authentication data 252, device identifier 254, application cryptogram 256, and digital token 268. In some instances, and based on the successful authentication of the identity of user 121 by wallet system 130 (e.g., as indicated by digital token 268), and upon a receipt of code challenge 282 from gateway system 160, executed wallet application 124 may perform operations that generate a registration request that, upon successive validation by wallet system 130 and gateway system 160 using any of the exemplary processes described herein, facilitates a registration of user 121 as a member of the loyalty program and a recordation, within an element of a cryptographically secure distributed ledger (e.g., permissioned distributed ledger 190), of a cryptographic registration object that uniquely identifies user 101 and executed wallet application 124, as described below in reference to FIGS. 3A-3C.

Figure 3A:
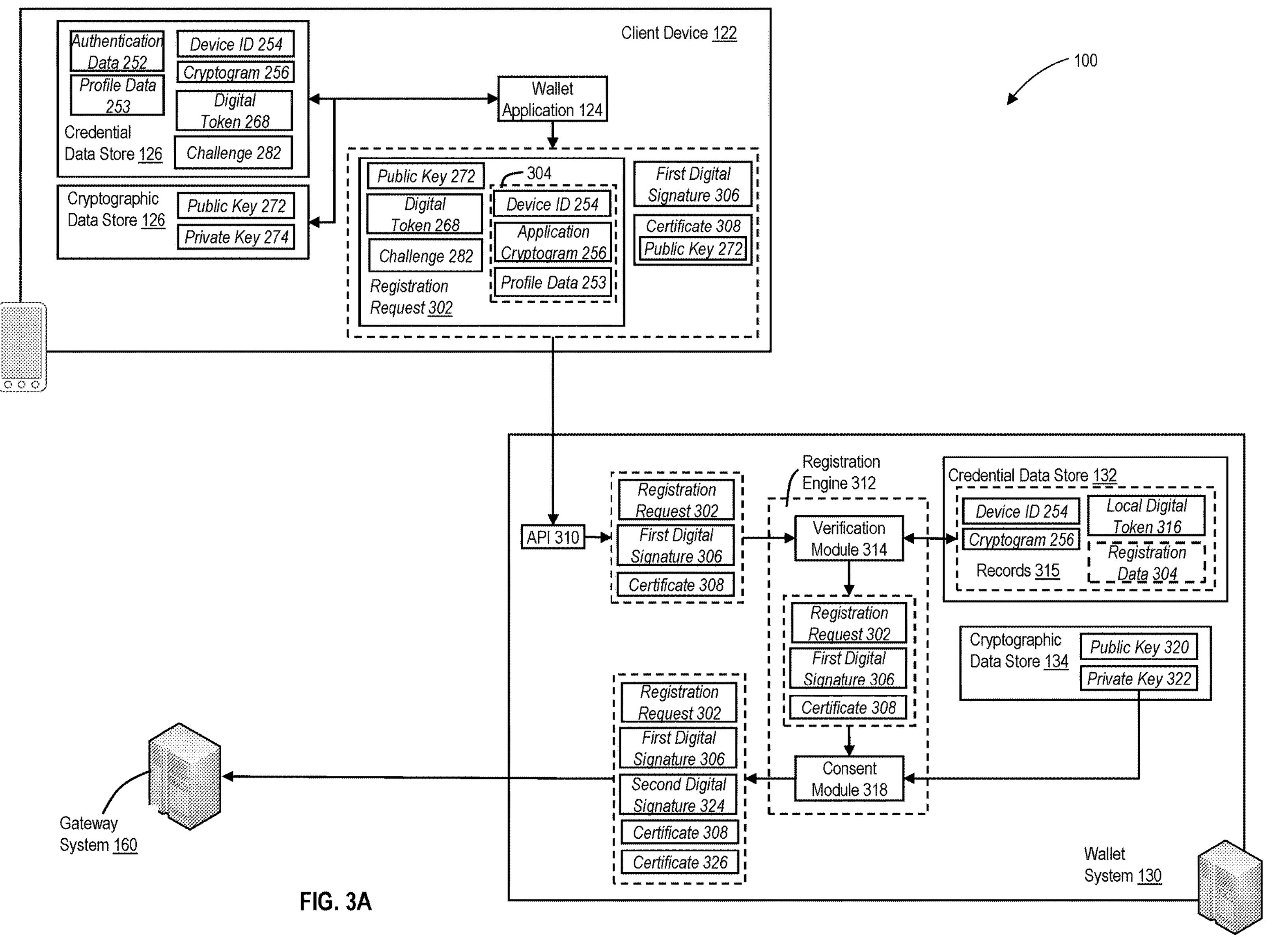

Referring to FIG. 3A, executed wallet application 124 may access credential data store 126, and may obtain digital token 268 (e.g., the OTU token described herein), code challenge 282, device identifier 254 of client device 122, and an identifier of executed wallet application 124, such as application cryptogram 256. Additionally, executed wallet application 124 may obtain public cryptographic key 272 from cryptographic data store 128, and may perform operations that package public cryptographic key 272, digital token 268, and code challenge 282 into corresponding portions of a registration request 302. In some instances, not illustrated in FIG. 3A, executed wallet application 124 may also apply a digital signature to code challenge 282 prior to packaging code challenge 282 into registration request 302.

Further, executed wallet application 124 may also generate one or more elements of registration data 304, which may be packaged into a corresponding portions of registration request 302, e.g., in conjunction with public cryptographic key 272, digital token 268, and code challenge 282. In some instances, registration data 304 may include application cryptogram 256, which uniquely identifies executed wallet application 124, and further, device identifier 254, which uniquely identifies client device 122. In other instances, registration data 304 may also include all, or a selected portion of customer profile data 253, e.g., as maintained within credential data store 126. As described herein, exemplary elements of customer profile data 253 may include, but are not limited to, a full name of user 121, a street address of user 121, contact information associated with user 121, demographic data characterizing user 121, or one or more transactional preferences of user 121. In some instances, and as described herein, the elements of customer profile data 253 may include profile data newly specified by user 121, or alternatively, elements profiled data modified by user 121, based on input provided by user 121 in response to the one or more additional display screens of invitation interface 242.

Executed wallet application 124 may also perform operations that apply a first digital signature 306 to registration request 302 (e.g., to public cryptographic key 272, digital token 268, code challenge 282, and registration data 304) using private cryptographic key 274 of executed wallet application 124, as maintained securely within cryptographic data store 128. In some examples, the application of first digital signature 306 to registration request 302 may be indicative of an approval of, and a consent to, the requested registration of user 121 as a member of the loyalty program by both user 101 and executed wallet application 124. Further, certain of the exemplary process described herein, which couple the application of first digital signature 306 to registration request 302 to a level or type of consent granted by user 121 to wallet system 130 and/or gateway system 160 to access or manipulate elements of confidential data, may be implemented in addition to, or as an alternate to, existing token-based authorization and consent protocols (e.g., an OAuth protocol, etc.) during the registration processes implemented collectively by client device 122, wallet system 130, and gateway system 160.

Executed wallet application 124 may also perform operations that cause client device 122 to transmit registration request 302, first digital signature 306, and in some instances, a public key certificate 308 of client device 122 (which includes public cryptographic key 272) across network 120 to wallet system 130. As illustrated in FIG. 3A, a secure, programmatic interface established and maintained by wallet system 130, such as application programming interface (API) 310, may receive registration request 302, first digital signature 306, and in some instances, a public key certificate 308, and may programmatically trigger an execution of a registration engine 312 by the one or more processors of wallet system 130.

For example, a verification module 314 of executed registration engine 312 may receive registration request 302 (e.g., that includes public cryptographic key 272, digital token 268, code challenge 282, and registration data 304), first digital signature 306, and public key certificate 308 from API 310. In some instances, verification module 314 may parse public key certificate 308 and obtain a public cryptographic key associated client device 122 (e.g., public cryptographic key 272 of executed wallet application 124), and perform operations that verify first digital signature 306 based on the obtained public cryptographic key. If, for example, verification module 314 were unable to verify first digital signature 306, verification module 314 may establish that registration request 302 was either corrupted during transmission of altered one or more third parties without permission, and executed registration engine 312 may decline to further process registration request 302. In some instances (not illustrated in FIG. 3A), executed registration engine 312 may generate an error message, and wallet system 130 may transmit the generated error message across network 120 to client device 122, e.g., for presentation within a display screen of invitation interface 242.

Alternatively, if verification module 314 were to verify first digital signature 306, verification module 314 may perform operations that obtain, from registration request 302, digital token 268 and all or a selected portion of registration data 304, which includes device identifier 254 and application cryptogram 256. In some instances, verification module 314 may access credential data store 132, and identify one or more data records 315 that include or reference device identifier 254 or application cryptogram 256, and as such, as associated with client device 122 or executed wallet application 124. As illustrated in FIG. 3A, verification module 314 may obtain, from data records 315, a local digital token 316 indicative of a currently valid authentication of the identity of user 121, and perform operations that determine whether digital token 268 (e.g., as received from client device 122) is consistent with, and corresponds to, local digital token 316. If, for example, verification module 314 were to detect an inconsistency between digital token 268 and local digital token 316, executed registration engine 312 may decline to further process registration request 302 and may generate an error message, which wallet system 130 may transmit across network 120 to client device 122, e.g., for presentation within a display screen of invitation interface 242 (not illustrated in FIG. 3A).

In other examples, based on the verification of first digital signature 306, and based on the determined consistency between digital token 268 and local digital token 316, verification module 314 may verify registration request 302 for further processing, and may provide registration request 302, first digital signature 306, and in some instances, a public key certificate 308 and as input to a consent module 318 of executed registration engine 312. Verification module 314 may also perform operations that store all or a selected portion of registration data 304, such as the one or more elements of customer profile data 253, within a corresponding portion of credential data store 132, e.g., within, or in association with, the one or more data records 315.

Consent module 318 may receive registration request 302, first digital signature 306, and public key certificate 308, and may obtain a public cryptographic key 320 and a corresponding private cryptographic key 322 of wallet system 130 from cryptographic data store 134. Public and private cryptographic keys 320 and 322 may establish an asymmetric key pair or wallet system 130, which may be generated using one or more of the key generation algorithms described herein, and public cryptographic key 320 may be distributed to one or more additional or alternate computing systems and devices operating within environment 100, such as, but not limited to, program system 140 or gateway system 160.

In some instances, consent module 318 may perform operations that apply a second digital signature 324 to registration request 302 (e.g., that includes public cryptographic key 272, digital token 268, code challenge 282, and registration data 304) and to first digital signature 306 using private cryptographic key 322 of wallet system 130. As described herein, the application of second digital signature 324 to registration request 302 and to first digital signature 306 may indicative of an approval of, and a consent to, the requested registration of user 121 as a member of the loyalty program by executed registration engine 312 and as such, by wallet system 130, and executed registration engine 312 may perform operations that cause wallet system 130 to transmit registration request 302, first digital signature 306, second digital signature 324, public key certificate 308 of client device 122 (e.g., that includes public cryptographic key 272) and a public key certificate 326 (e.g., that includes public cryptographic key 320) across network 120 to gateway system 160.

Figure 3B:
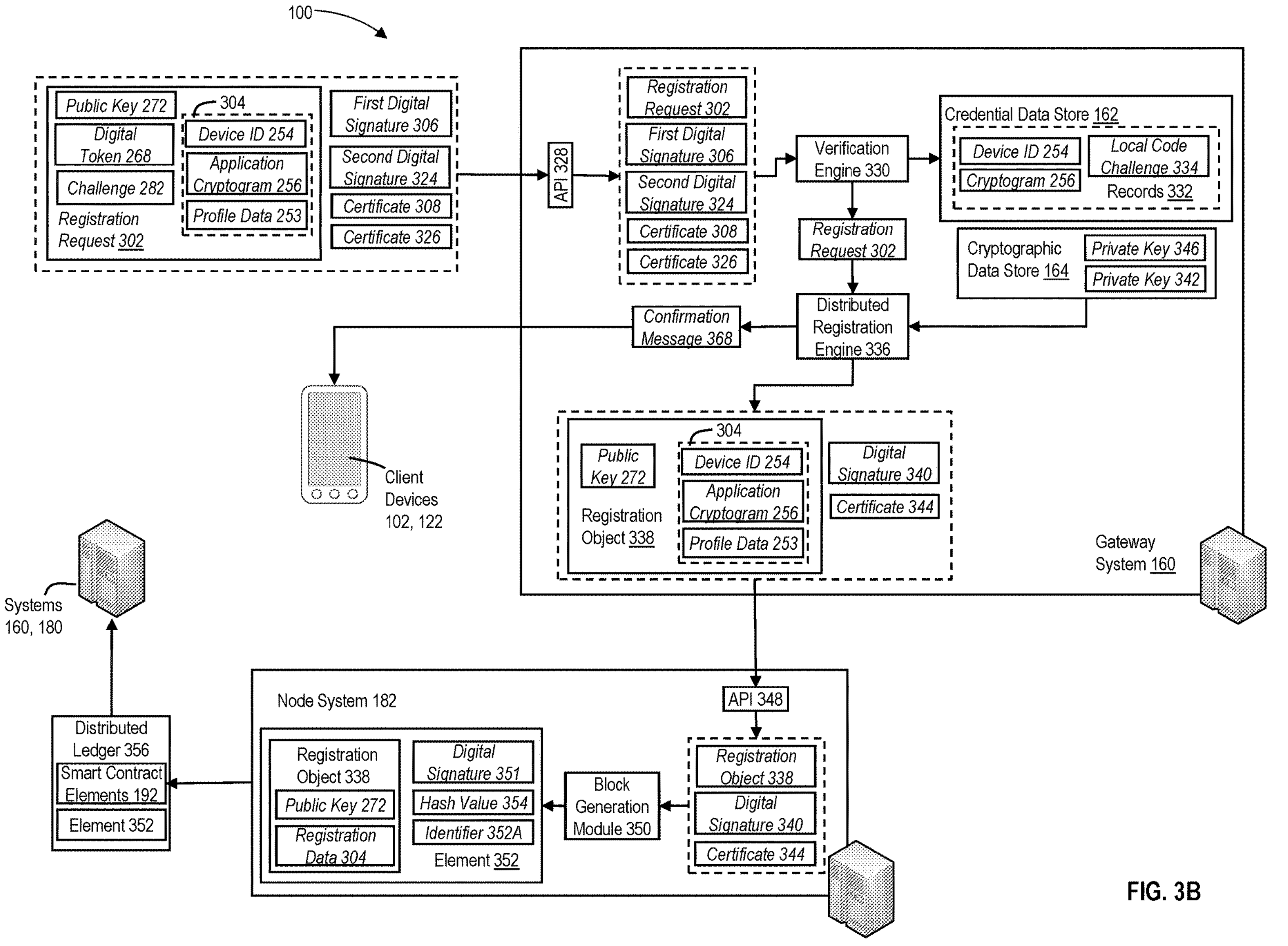

Referring to FIG. 3B, a programmatic interface establish and maintained by gateway system 160, such as application programming interface (API) 328, may receive registration request 302, first digital signature 306, second digital signature 324, and public key certificate 308 and 326, and may perform operations that trigger an execution of a verification engine 330 by the one or more processors of gateway system 160. In some instances, executed verification engine 330 may parse public key certificate 308 to extract public cryptographic key 272 of executed wallet application 124, and may parse public key certificate 326 to extract public cryptographic key 320 of wallet system 130. Executed verification engine 330 may perform operations that validate second digital signature 324 (e.g., as applied to registration request 302 and first digital signature 306) using public cryptographic key 320 of wallet system 130 and further, that validate first digital signature 306 (e.g., as applied to registration request 302) using public cryptographic key 272 of executed wallet application 124.

If, for example, executed verification engine 330 were unable to verify first digital signature 306, and additionally, or alternatively, second digital signature 324, executed verification engine 330 may decline the requested registration of user 121 as a member of the loyalty program, and may discard registration request 302. In some instances (not illustrated in FIG. 3B), executed verification engine 330 may generate an error message, and gateway system 160 may transmit the generated error message across network 120 to client device 122, e.g., for presentation within a display screen of invitation interface 242 (not illustrated in FIG. 3B)

Alternatively, if executed verification engine 330 were to verify first digital signature 306 and second digital signature 324, executed verification engine 330 may perform operations that obtain, from registration request 302, code challenge 282 and all or a selected portion of registration data 304, which includes device identifier 254 and application cryptogram 256. In some examples, executed verification engine 330 may access credential data store 162, and identify one or more data records 332 that include or reference device identifier 254 or application cryptogram 256, and as such, as associated with client device 122 or executed wallet application 124. As illustrated in FIG. 3B, executed verification engine 330 may obtain, from data records 332, a local code challenge 334 (e.g., generated using any of the exemplary processes described herein), and perform operations that determine whether code challenge 282 (e.g., as received from client device 122) is consistent with, and corresponds to, local code challenge 334.

As described herein, code challenge 282 may also be associated with an additional digital signature applied to code challenge 282 by executed wallet application 124 using private cryptographic key 274. In some instances, not illustrated in FIG. 3B, executed verification engine 330 may perform any of the exemplary processes described herein to validate the additional digital signature applied to code challenge 282 prior to determining the consistency and correspondence between code challenge 282 and local code challenge 334.

If, for example, executed verification engine 330 were to detect an inconsistency between code challenge 282 and local code challenge 334 (and in some instances, were unable to validate the additional digital signature applied to code challenge 282), executed verification engine 330 may decline the requested registration of user 121 as a member of the loyalty program, and may discard registration request 302. In some instances (not illustrated in FIG. 3B), executed verification engine 330 may perform any of the exemplary processes described herein to generate and transmit an error message across network 120 to client device 122, e.g., for presentation within a display screen of invitation interface 242. Alternatively, based on the validation of first digital signature 306 and second digital signature 324 (and in some instances, the validation of the additional digital signature applied to code challenge 282), and based on the determined consistency between code challenge 282 and local code challenge 334, executed verification engine 330 may approve the requested registration of user 121 as a member of the loyalty program, e.g., based on the prior approval of, and consent to, the requested registration by user 121 and wallet system 130, as indicated by respective ones of now-validated first and second digital signatures 306 and 324.

As illustrated in FIG. 3B, executed verification engine 330 may provide approved registration request 302 as an input to a distributed registration engine 336 executed by the one or more processors of gateway system 160. In some examples, executed distributed registration engine 336 may perform operations that parse registration request 302 to extract public cryptographic key 272 of executed wallet application 124, and further to extract registration data 304, which includes device identifier 254, application cryptogram 256, and the one or more elements of customer profile data 253. Further, executed distributed registration engine 336 may perform operations that package public cryptographic key 272 and all, or a selected portion, of registration data 304, into corresponding portions of a registration object 338 associated with user 121 and executed wallet application 124, and that apply a digital signature 340 to registration object 338 using a private cryptographic key 342 of gateway system 160, e.g., as maintained within cryptographic data store 164.

In some instances, gateway system 160 to broadcast registration object 338, digital signature 340, and public key certificate 344 of gateway system 160 (that includes a public cryptographic key 346 of gateway system 160 across network 120 to one or more of node systems 180, such as node system 182, which may perform any of the exemplary processes described herein to record registration object 338 within one or more elements of a distributed ledger, such as an updated version of permissioned distributed ledger 190. As described herein, upon recordation of registration object 338 within the one or more elements of the distributed ledger, user 121 may be registered as a member of the loyalty program, and public cryptographic key 272 may function as a unique identifier of user 121 during exchanges of data associated with the loyalty program and involving executed wallet application 124, wallet system 130, program system 140, and gateway system 160.

For example, and as illustrated in FIG. 3B, a programmatic interface established and maintained by each of node systems 180, such as application programming interface (API) 348 of node system 182, may receive registration object 338, digital signature 340, and public key certificate 344 from gateway system 160, and may route registration object 338, digital signature 340, and public key certificate 344 to a corresponding block generation engine, such as block generation engine 350 of node system 182. When executed by the one or more processors of node system 182 (and each additional or alternate one of node systems 180), block generation engine 350 may perform operations that verify digital signature 340 using public cryptographic key 346 (e.g., as obtained from public key certificate 344), that generate an additional element 352 of permissioned distributed ledger 190 that, among other things, includes registration object 338, e.g., public cryptographic key 272 of executed wallet application 124 and all, or the selected portion of, registration data 304.

In some instances, executed block generation engine 350 (and the block generation engine executed by additional ones of node systems 180) may perform operations that generate and apply a digital signature 351 to registration object 338 (e.g., using a corresponding private cryptographic key of node system 182), and that generate a hash value 354 based on an application of one or more appropriate hash algorithms to registration object 338 and digital signature 351 (and in some instances, to other elements of distributed ledger 190). Executed block generation engine 350 may package digital signature 351 and hash value 354 into corresponding portions of additional element 352, e.g., in conjunction with registration object 338.

Further, node system 182 (and each additional or alternate one of node systems 180) may perform operations that append additional element 352 to a prior version of the permissioned distributed ledger (e.g., permissioned distributed ledger 190) to generate a latest, longest version of the permissioned distributed ledger, e.g., an updated distributed ledger 356. In some instances, node system 182 (and each additional or alternate one of node systems 180), may also generate and assign an identifier 352A to the additional element, such as a positional identifier (e.g., a "block number") that specifies a sequential position of additional element 352 relate to the existing, prior elements of the distributed ledger. These additional operations may, for example, be established through a distributed consensus among additional ones of node systems 180, and may include, but are not limited to, the calculation of an appropriate proof-of-work or proof-of-stake by a distributed consensus module 358 prior to the other peer systems. In certain aspects, node system 182 may broadcast evidence of the calculated proof-of-work or proof-of-stake to additional ones of node systems 180 across network 120 (not illustrated in FIG. 3B).

Node system 182 may also broadcast distributed ledger 356, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. In some instances, not illustrated in FIG. 3B, executed distributed registration engine 336 of gateway system 160 may store distributed ledger 356 within a portion of the one or more tangible, non-transitory memories, such as data repository 161 (e.g., to replace permissioned distributed ledger 190), and may generate a confirmation message 362 that includes all or a selected portion of registration object 338, such as, but not limited to, public cryptographic key 272 of executed wallet application 124 or element identifier 352A. Executed distributed registration engine 336 may perform operations that cause gateway system 160 to transmit, via wallet system 130, confirmation message 362 across network 120 to client device 102, which generated response data 230 referring user 121 to the loyalty program, and to client device 122, which generated registration request 302 accepting the referred invitation and requesting registration within the loyalty program.

Although not illustrated in FIGS. 3A and 3B, executed wallet application 104 (e.g., at client device 102) may perform operations that present interface elements representative of all or a portion of confirmation message 362 within a corresponding portion of referral interface 220, and further, executed wallet application 104 (e.g., at client device 102) may perform operations that present interface elements representative of all or a portion of confirmation message 362 within a corresponding portion of referral interface 220. As described herein, user 101 may elect to refer user 121 to the loyalty program, and user 121 may accept an invitation to register as a member of the loyalty program, in exchange for a redeemable or transferable digital asset, or predetermined number of units of that digital asset, proffered by program system 140 as part of an ongoing referral campaign of the loyalty program. In some examples, and based on the receipt of confirmation message 362, executed wallet application 104 and additionally, or alternatively, executed wallet application 124, may perform any of the exemplary processes described herein to request, in conjunction with wallet system 130 and gateway system 160, an allocation of the proffered digital asset and a recordation of a corresponding allocation object with one or more elements of distributed ledger 356, e.g., in conjunction with the public cryptographic key of a respective one of executed wallet application.

Figure 4A:
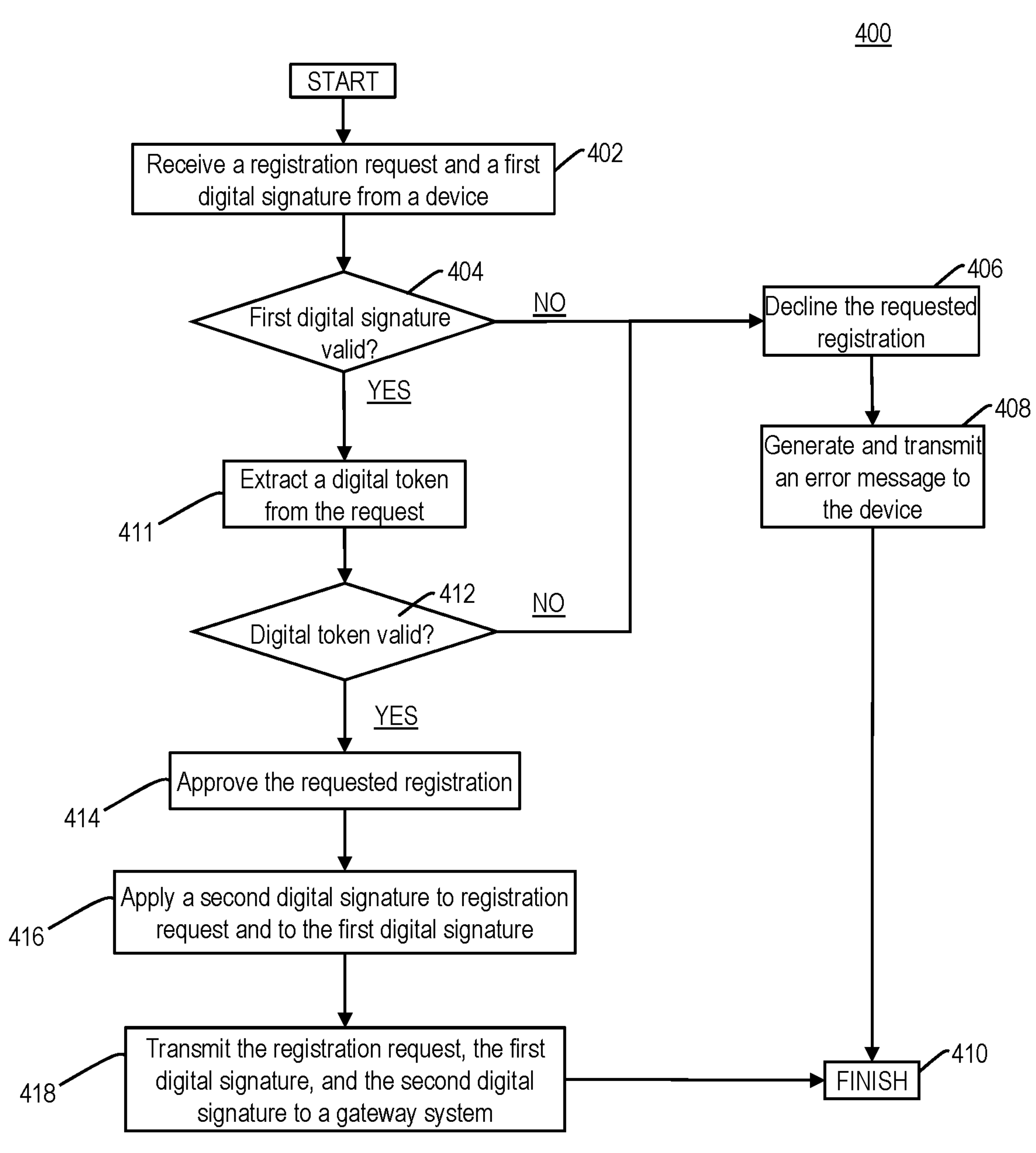
FIGS. 4A and 4B are flowcharts of exemplary processes for securely distributing, and managing the distribution of, cryptographic keys within a computing environment using permissioned distributed ledgers, in accordance with some exemplary embodiments.
Figure 4B:
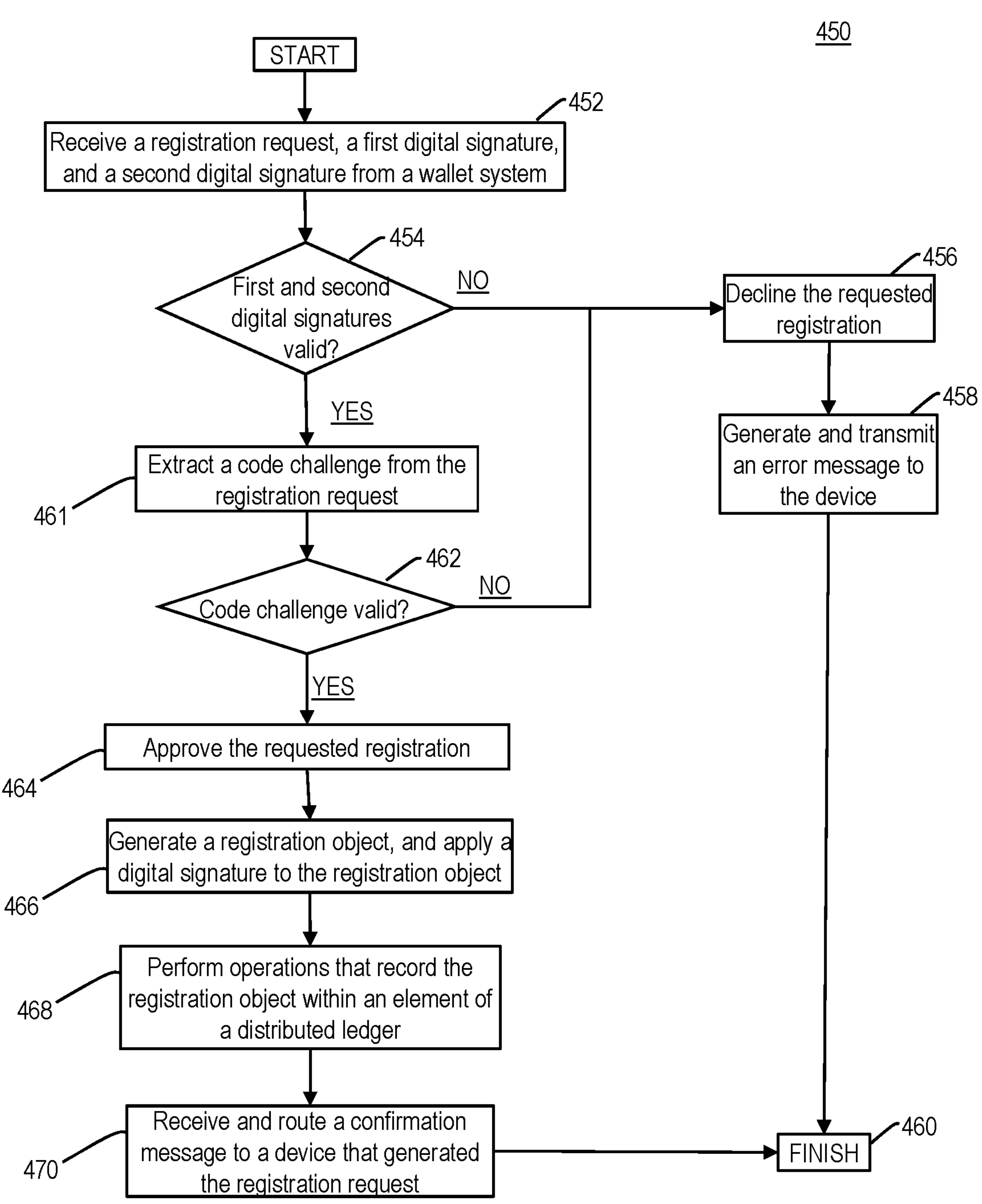

FIGS. 4A and 4B are flowcharts of exemplary processes for securely distributing, and managing the distribution of, cryptographic keys within a computing environment using permissioned distributed ledgers, in accordance with the disclosed embodiments. In some examples, a computing system capable of provisioning and supporting wallet applications executed by computing devices within the computing environment, such as wallet system 130, may perform one or more of the exemplary steps of process 400, as described below in reference to FIG. 4A. Further, a computing system associated with permissioned, distributed-ledger network operating within the environment, such as gateway system 160, may perform one or more of the exemplary steps of process 450, as described below in reference to FIG. 4B.

Referring to FIG. 4A, wallet system 130 may receive, from a client device (e.g., client device 102 or client device 122 of FIG. 1) across network 120, a request for a registration of a user of the client device (e.g. user 101 or user 121 of FIG. 1) and a first digital signature (e.g., in step 402). As described herein, the registration request may be generated by a wallet application executed by the client device (e.g., executed wallet application 104 or executed wallet application 124), and the registration request may include, among other things, a public cryptographic key that uniquely identifies the executed wallet application, a digital token generated by wallet system 130 in response to a successful authentication of an identity of the user (e.g., a one-time-user (OTU) token), and a code challenge generated by gateway system 160. Further, as also described herein, the registration request may also include registration data that includes, but is not limited to, a device identifier of the client device (e.g., a network address, such as an IP address), an identifier of the executed wallet application (e.g., an application cryptogram), and one or more elements of profile data characterizing the user.

Further, as also described herein, the wallet application executed by the client device may apply the first digital signature to the registration request, e.g., using a corresponding private cryptographic key of the executed wallet application. In some instances, the application of the first digital signature to the registration request by the executed wallet application may be indicative of an approval of and consent to the requested registration by the user of the client device.

Wallet system 130 may perform any of the exemplary processes described herein to validate the applied first digital signature (e.g., in step 404). If wallet system 130 were unable to verify the first digital signature, (e.g., step 404; NO), wallet system 130 may decline the requested registration (e.g., in step 406). Wallet system 130 may perform any of the exemplary processes described herein to generate an error message, and may transmit the generated error message to the client device (e.g., in step 408). Exemplary process 400 is then complete in step 410.

Alternatively, if wallet system 130 were to verify the first digital signature (e.g., step 404; YES), wallet system 130 may parse the registration request to extract the digital token (e.g., the OTU token) from the registration request (e.g., in step 411), and may perform any of the exemplary processes described herein to verify the extracted digital token is consistent with, and corresponds to, a locally maintained copy of the digital token provisioned to the client device (e.g., in step 412). If, for example, wallet system 130 were to detect an inconsistency between the extracted digital token and the local copy of the digital token (e.g., step 412; NO), exemplary process 400 may pass back to step 406, and wallet system 130 may decline the requested registration of the user as a member of the loyalty program.

Alternatively, if wallet system 130 were to establish a consistency, and a correspondence, between the extracted digital token and the locally maintained copy of the digital token (e.g., step 412; YES), wallet system 130 may approve, and consent to, the requested registration of the user as a member of the loyalty program (e.g., in step 414). Further, wallet system 130 may perform any of the exemplary processes described herein to apply a second digital signature to the registration request and to the first digital signature (e.g., in step 416). As described herein, the application of the second digital signature to the registration request and to the first digital signature may indicative of an approval of, and a consent to, the requested registration of the user as a member of the loyalty program by wallet system 130.

In some instances, wallet system 130 may transmit the registration request, the first digital signature, and the second digital signature across network 120 to a computing system associated with, and that participates in, the permissioned, distributed-ledger network described herein, such as gateway system 160 (e.g., in step 418). Exemplary process 400 is then complete in step 410.

Referring to FIG. 4B, gateway system 160 may receive the registration request, the first digital signature, and the second digital signature from wallet system 130 (e.g., in step 452). In some instances, in step 454, gateway system 160 may perform any of the exemplary processes described herein to validate the first and second digital signatures. If gateway system 160 were unable to validate the first digital signature or the second digital signature, (e.g., step 454; NO), gateway system 160 may decline the requested registration (e.g., in step 456). Gateway system 160 may perform any of the exemplary processes described herein to generate an error message indicative of the failed verification of the first digital signature and the declined request, and may transmit the generated error message to the client device via wallet system 130 (e.g., in step 458). Exemplary process 450 is then complete in step 460.

Alternatively, if gateway system 160 were to verify both the first and second digital signatures (e.g., step 454; YES), gateway system 160 may parse the registration request to extract the code challenge from the registration request (e.g., in step 461), and may perform any of the exemplary processes described herein to verify the extracted code challenge is consistent with, and corresponds to, a locally maintained copy of the code challenge provisioned to the client device (e.g., in step 462). If, for example, gateway system 160 were to detect an inconsistency between the extracted code challenge and the local copy of the code challenge (e.g., step 462; NO), exemplary process 450 may pass back to step 456, and gateway system 160 may decline the requested registration.

Alternatively, if gateway system 160 were to establish a consistency, and a correspondence, between the extracted code challenge and the locally maintained copy of the code challenge (e.g., step 462; YES), gateway system 160 may approve, and consent to, the requested registration of the user as a member of the loyalty program (e.g., in step 464). Gateway system 160 may also perform any of the exemplary processes described herein to generate a registration object associated with the now-approved registration request, and to apply any additional digital signature to the registration object (e.g., in step 466).

Further, gateway system 160 may also perform any of the exemplary processes described herein, in conjunction with one or more node systems operating within the computing environment, to record immutably the registration object within an element of a cryptographically secure, permissioned distributed ledger, such as within element 352 of updated distributed ledger 356 of FIG. 3B (e.g., in step 468). In some instances, and as described herein, gateway system 160 may receive a confirmation message indicative of the recordation of the registration object within the element of the distributed ledger, and may route the confirmation message back to the client device via wallet system 130 (e.g., in step 470). Exemplary process 450 is then complete in step 460.

C. Secure Distribution of Digital Assets within a Computing Environment Using Permissioned Distributed Ledgers Through an implementation of certain of the exemplary processes described herein, a wallet application executed at a first client device (e.g., wallet application 104 executed at client device 102) may perform operations that enable a current member of a loyalty program associated with a financial institution (e.g., user 101) to refer an additional customer of that financial institution (e.g., user 121) for membership in exchange for a proffered allocation of a redeemable and transferrable digital asset, or a predetermined quantity of that digital asset, within an referral campaign administered by program system 140 of the loyalty program. Further, and based on invitation data generated by a program system 140, a wallet application executed at a second client device operable by user 121 (e.g., wallet application 124 executed at client device 122) may enable user 121 to accept an invitation for membership in exchange for a further allocation of the digital asset, or a predetermined quantity of that digital asset, within the referral campaign, and may perform operations that generate a request for registration in the loyalty program, which executed wallet application 124 may transmit to a computing system that provisions and supports not only executed wallet application 124, but also executed wallet application 104, e.g., wallet system 130 of FIG. 1.

As described herein, the registration request may include an element of cryptographic data, e.g., public cryptographic key 272, that uniquely identifies not only user 121, but also executed wallet application 124, in exchanges of data between computing devices and systems of environment 100 that involve, or are associated with, the loyalty program, and executed wallet application 124 may also apply a first digital signature to the registration request, which indicates an approval of, and a consent to, the requested registration by user 101. Upon validation of the applied first digital signature, wallet system 130 may perform any of the exemplary processes described herein to approve and consent to the registration requested by user 121, to apply a second digital signature to the registration request and to the first digital signature, which confirms the approval of and consent to the requested registration of user 121 into the loyalty program by wallet system 130. Further, and as described herein, wallet system 130 may transmit the registration request, the first digital signature (e.g., that confirms the approval of and the consent to the requested registration by user 121), and the second digital signature (e.g., that confirms the approval of and the consent to the requested registration by wallet system 130) to one or more gateway systems of a permissioned, distributed-ledger network associated with the loyalty program, such as gateway system 160 of FIG. 1.

In some instances, gateway system 160 may perform any of the exemplary processes described herein to validate the first and second digital signature, and as such, to confirm the prior grant of approval of, and consent to, the requested registration by user 101 and wallet system 130. Based on the confirmation of each of the prior grants of approval and consent, gateway system 160 may generate a registration object (e.g., registration object 338 of FIG. 3B) that includes public cryptographic key 272 of executed wallet application 124 and additional elements of registration data that identify and characterize user 121, client device 122, or executed wallet application 124. As described herein, gateway system 160 may broadcast the generated registration request to one or more node systems that are associated with, and operated within, the permissioned distributed-ledger network described herein (e.g., node systems 180, including node system 182, of FIG. 1), and the one or more node systems may implement any of the exemplary processes described herein to record the registration object within an element of cryptographically secure distributed ledger, e.g., element 352 of updated distributed ledger 356, which the one or more node systems may broadcast to each computing system operating within the permissioned distributed-ledger network, such as gateway system 160 and additional ones of node systems 180.

As described herein, the recordation of registration object 338 within element 352 of updated distributed ledger 356 may be indicative of the successful registration of user 121 as a member of the loyalty program. Further, the elements of updated distributed ledger 356 (and of the additional or alternate exemplary distributed ledgers described herein), when queried using public cryptographic key 272 of executed wallet application 124, establishes an immutable and time evolving record of all interactions between user 121 and the loyalty program (e.g., through requests for key regeneration, asset allocation, or asset redemption) and between user 121 and other members of the loyalty program and of other unrelated loyalty programs (e.g., through requests for peer-to-peer transactions). Certain of these exemplary processes, which establish an immutable, auditable, and cryptographically secure record of customer interaction with one or more loyalty programs based on a recordation of a cryptographic, customer-specific identifier onto a permissioned distributed ledger, may be implemented in addition to, or as an alternate to, existing loyalty programs that track customer interactions using accrued, program-specific points using potentially insecure program-specific relational databases.

Responsive to the successful recordation of registration object 338 within element 352 of updated distributed ledger 356, gateway system 160 may perform any of the exemplary processes described herein to generate and transmit a confirmation message (e.g. confirmation message 362 of FIG. 3B) across network 120 to not only client device 122 (e.g., as operated by newly registered user 121), but also to client device 102 (e.g., as operated by user 101, which referred user 121 to the loyalty program). As described below in reference to FIGS. 5A and 5B, each of client devices 102 and 122 may receive confirmation message 362, and respective ones of executed wallet applications 104 and 124 may perform operations that generate and present interface elements representative of confirmation message 362 within a corresponding portion of a digital interface, such as a respective one of referral interface 220 or invitation interface 242.

Further, and as described herein, user 101 may elect to refer user 121 to the loyalty program, and user 121 may accept an invitation to register as a member of the loyalty program, in exchange for a redeemable or transferable digital asset, or predetermined number of units of that digital asset, proffered by program system 140 as part of an ongoing referral campaign of the loyalty program. In some examples, described below in reference to FIGS. 5A and 5B, executed wallet application 104 and additionally, or alternatively, executed wallet application 124, may perform any of the exemplary processes described herein to request, in conjunction with wallet system 130 and gateway system 160, an allocation of the proffered digital asset and a recordation of a corresponding allocation object with one or more elements of distributed ledger 356, e.g., in conjunction with the public cryptographic key of a respective one of executed wallet application. Additionally, one or more of the exemplary allocation processes, as described herein, may be initiated and implemented by executed wallet application 104 and by executed wallet application 124 automatically upon receipt of confirmation message 362 and without intervention or input from a respective one of user 101 or 121.

Figure 5A:
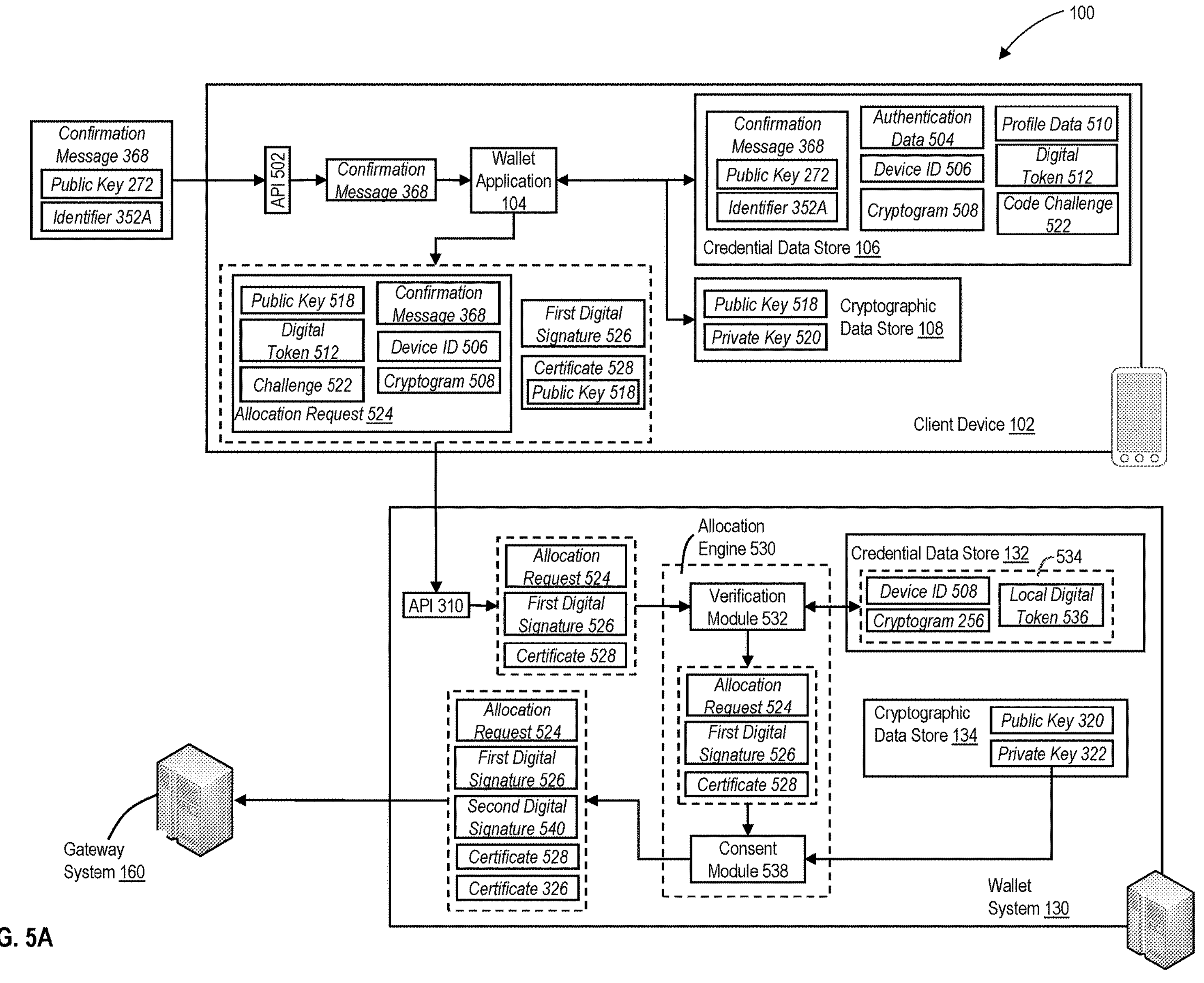
FIGS. 5A, 5B, 6A, 6B, and 7A-7C are block diagrams illustrating portions of an exemplary computing environment, in accordance with some exemplary embodiments.

Referring to FIG. 5A, a secure, programmatic interface established and maintained by client device 102, such as application programming interface (API) 502 of executed wallet application 104, may receive and route confirmation message 362 to executed wallet application 104. In some examples, executed wallet application 104 may perform operations that store confirmation message 362 within a corresponding portion of the one or more tangible, non-transitory memories of client device 102, such as, but not limited to, a portion of credential data store 106. As illustrated in FIG. 5A, client device 102 may also maintain, within credential data store 106, authentication data 504 (e.g., that specifies one or more authentication credentials that enable user 101 to access executed wallet application 104), a device identifier 506 of client device 102 (e.g., a network address, such as an IP address or a MAC address), and a unique identifier of executed wallet application 104, such as an application cryptogram 508.

For example, the one or more authentication credentials may include, but are not limited to, a login credential of user 101, an alphanumeric password of user 101, and one or more biometric credentials, such as a facial image or a thumbprint image, the user 101 may provision the one or more authentication credentials to client device 102 (e.g., via a corresponding input unit) during a prior authentication of user 101's identity involving executed wallet application 104 and/or wallet system 130, e.g., using any of the exemplary processes described herein. Further, wallet system 130 may generate and provide application cryptogram 508 to client device 102 during an initial onboarding process that provisions wallet application 104 to client device 102.

Additionally, and as illustrated in FIG. 5A, client device 102 may also maintain, within credential data store 106, one or more elements of customer profile data 510. The one or more elements of customer profile data 510 may include, but are not limited to, a full name of user 101, a street address of user 101, contact information associated with user 101 (e.g., a preferred email address of telephone number), demographic data characterizing user 101 (e.g., an age, gender, educational level, etc., of user 101), or one or more transactional preferences of user 101. In some instances, executed wallet application 104 may obtain the one or more elements of customer profile data 510, and may store the one or more elements of customer profile data 510 within credential data store 106, using any of the exemplary processes described herein, such as, but not limited, based on input received from one or more additional display screens of referral interface 220 or through an initial authentication of user 101 with executed wallet application 104 or with wallet system 130.

Executed wallet application 104 may also perform any of the exemplary authentication processes described herein to request, and obtain, a digital token 512 from wallet system 130, e.g., in response to a successful authentication process between executed wallet application 104 and one or more application programs, engines, or modules executed by the one or more processors of wallet system 130. Executed wallet application 104 may also perform operations that store digital token 512 within a portion of the one or more tangible, non-transitory memories of client device 102, e.g., within a portion of credential data store 126 associated with authentication data 504, device identifier 506, and application cryptogram 508. For example, digital token 512 may correspond to a one-time-use (OTU) token valid to authenticate the identity of user 101 during a single registration, key-regeneration, or digital-asset-allocation, -redemption, or -transfer process, and may be characterized by a predetermined composition, length, or format. The disclosed embodiments are, however, not limited to OTU tokens, and in other examples, digital token 512 may be valid to authenticate an identity of user 101 during a predetermined temporal period, or for processes initiated within a predetermined geographic region.

Further, and based on that successful authentication, executed wallet application 124 may perform any of the exemplary processes described herein to perform operations that generate a public cryptographic key 518 and a corresponding private cryptographic key 520 for executed wallet application 104 using one or more appropriate key generation algorithms. Examples of these key generation algorithms include, but are not limited to, a Diffie-Hellman key exchange protocol, a Digital Signature Standard (DSS) key generation algorithm, or an elliptic-curve algorithm (e.g., ECDPSA P-256 algorithm based on a random seed, such as entropy), or an RSA encryption algorithm, or a homomorphic key generation algorithm (e.g., a FTFHE scheme, a SEAL encryption scheme, or a PALISADE encryption scheme). Executed wallet application 104 may store public cryptographic key 518 and private cryptographic key 520 within a secure portion of the one or more tangible, non-transitory memories of client device 122, e.g., within cryptographic data store 108.

In some instances, cryptographic data store 108 may correspond to a secure enclave or a key store within the one or more tangible, non-transitory memories, although in other instances, cryptographic data store 128 may represent a hardware security module (HSM) integrated onto or coupled to client device 102. As described herein, public cryptographic key 518 may be distributed to one or more additional computing systems operating within environment 100, such as wallet system 130, gateway system 160, and node systems 180, and may represent a unique identifier of both user 101 and executed wallet application 104 within the elements of distributed ledger 190 or updated distributed ledger 356.

Further, executable wallet application 104 may also perform any of the exemplary processes described herein to request and receive a code challenge 522 from gateway system 160, which executed wallet application 104 may store within a portion of credential data store 106 associated with authentication data 504, device identifier 506, application cryptogram 508, and digital token 512. In some instances, code challenge 522 may be generated by gateway system 160 using any of the exemplary processes described herein, and correspond to a hash value representative of all or a selected portion of device identifier 506 and/or application cryptogram 508, or may correspond to a hash value representative of a plaintext cipher maintained confidentially by gateway system 160.

In some examples, and responsive to the receipt of confirmation message 362, which confirms the successful referral of user 121 for membership in the loyalty program and the recordation of registration object 338 within element 352 of updated distributed ledger 356, executed wallet application 104 may perform operations that generate a request 524 for an allocation of the proffered digital asset, of the proffered quantity of that digital asset, to user 101 in response to the successful referral of user 121 for membership in the loyalty program. By way of example, executed wallet application 104 may package, into corresponding portions of allocation request 524, one of more of: (i) public cryptographic key 518, which uniquely identifies user 101 and executed wallet application 104); (ii) all or a selected portion of confirmation message 368, such as element identifier 352A and now-recorded public cryptographic key 272 of referred user 121 and wallet application 124; (iii) digital token 512 (e.g., the OTU token described herein); (iv) code challenge 522, e.g., as received from gateway system 160; and (v) one or more of device identifier 506 (e.g., the IP address of client device 102) or application cryptogram 508. In some instances, not illustrated in FIG. 5A, executed wallet application 104 may also apply a digital signature to code challenge 522 prior to packaging code challenge 522 into a corresponding portion of allocation request 524.

Executed wallet application 104 may also perform operations that apply a first digital signature 526 to allocation request 524 using private cryptographic key 520 of executed wallet application 104, as maintained securely within cryptographic data store 108. In some examples, the application of first digital signature 526 to allocation request 524 may be indicative of an approval of, and a consent to, the requested allocation of the digital asset, or the quantity of digital assets, to user 101 in response to the successful referral of user 121 for membership in the loyalty program. Further, certain of the exemplary process described herein, which couple the application of first digital signature 526 to allocation request 524 to a level or type of consent granted by user 101 to wallet system 130 and/or gateway system 160 to access, manipulate, or store confidential registration or allocation data, may be implemented in addition to, or as an alternate to, existing token-based authorization and consent protocols (e.g., an OAuth protocol, etc.) during the asset-allocation processes implemented collectively by client device 102, wallet system 130, and gateway system 160.

Executed wallet application 104 may also perform operations that cause client device 102 to transmit allocation request 524, first digital signature 526, and in some instances, a public key certificate 528 of client device 102 (which includes public cryptographic key 518) across network 120 to wallet system 130. As illustrated in FIG. 5A, a programmatic interface established and maintained by wallet system 130, such as API 310, may receive allocation request 524, first digital signature 526, and in some instances, public key certificate 528, and may programmatically trigger an execution of an allocation engine 530 by the one or more processors of wallet system 130.

For example, a verification module 532 of executed allocation engine 530 may receive allocation request 524, first digital signature 526, and public key certificate 528 from API 310. In some instances, verification module 532 may parse public key certificate 528 and obtain a public cryptographic key associated client device 102 (e.g., public cryptographic key 518 of executed wallet application 104), and perform operations that verify first digital signature 526 based on the obtained public cryptographic key. If, for example, verification module 532 were unable to verify first digital signature 526, verification module 532 may establish that allocation request 524 was either corrupted during transmission of altered one or more third parties without permission, and executed allocation engine 530 may decline the requested allocation. In some instances (not illustrated in FIG. 5A), executed allocation engine 530 may generate and transmit an error message across network 120 to client device 102, e.g., for presentation within a corresponding digital interface, such as referral interface 220.

Alternatively, if verification module 532 were to verify first digital signature 526, verification module 532 may perform operations that obtain device identifier 506, application cryptogram 508, and digital token 512 from allocation request 524, and may identify one or more data records 534 within credential data store 132 that include or reference device identifier 506 or application cryptogram 508, and as such, are associated with client device 102 or executed wallet application 104. As illustrated in FIG. 5A, verification module 532 may obtain, from data records 534, a local digital token 536, which is indicative of a currently valid authentication of the identity of user 101, and perform operations that determine whether digital token 512 (e.g., as received from client device 102) is consistent with, and corresponds to, local digital token 536. If, for example, verification module 532 were to detect an inconsistency between digital token 512 and local digital token 536, executed allocation engine 530 may decline the requested allocation and may generate an error message, which wallet system 130 may transmit across network 120 to client device 102, e.g., for presentation within a display screen of referral interface 220.

Alternatively, based on the verification of first digital signature 526, and based on the determined consistency between digital token 512 and local digital token 536, verification module 532 may approve the requested allocation and verify allocation request 524 for further processing, e.g., by gateway system 160. In some instances, verification module 532 may provide allocation request 524, first digital signature 526, and in some instances, public key certificate 528 and as input to a consent module 538 of executed allocation engine 530. As illustrated in FIG. 5A, consent module 538 may receive allocation request 524, first digital signature 526, and public key certificate 528, and may obtain public cryptographic key 320 and corresponding private cryptographic key 322 of wallet system 130 from cryptographic data store 134.

In some instances, consent module 538 may perform operations that apply a second digital signature 540 to allocation request 524 (e.g., that includes public cryptographic key 518, all or the selected portion of confirmation message 362, digital token 512, code challenge 522, device identifier 506 and/or application cryptogram 508) and to first digital signature 526. As described herein, the application of second digital signature 540 to allocation request 524 and to first digital signature 526 may indicative of an approval of, and a consent to, the requested allocation by wallet system 130, and executed allocation engine 530 may perform operations that cause wallet system 130 to transmit allocation request 524, first digital signature 526, second digital signature 540, public key certificate 528 of client device 102 (e.g., that includes public cryptographic key 518) and public key certificate 326 (e.g., that includes public cryptographic key 320) across network 120 to gateway system 160.

Figure 5B:
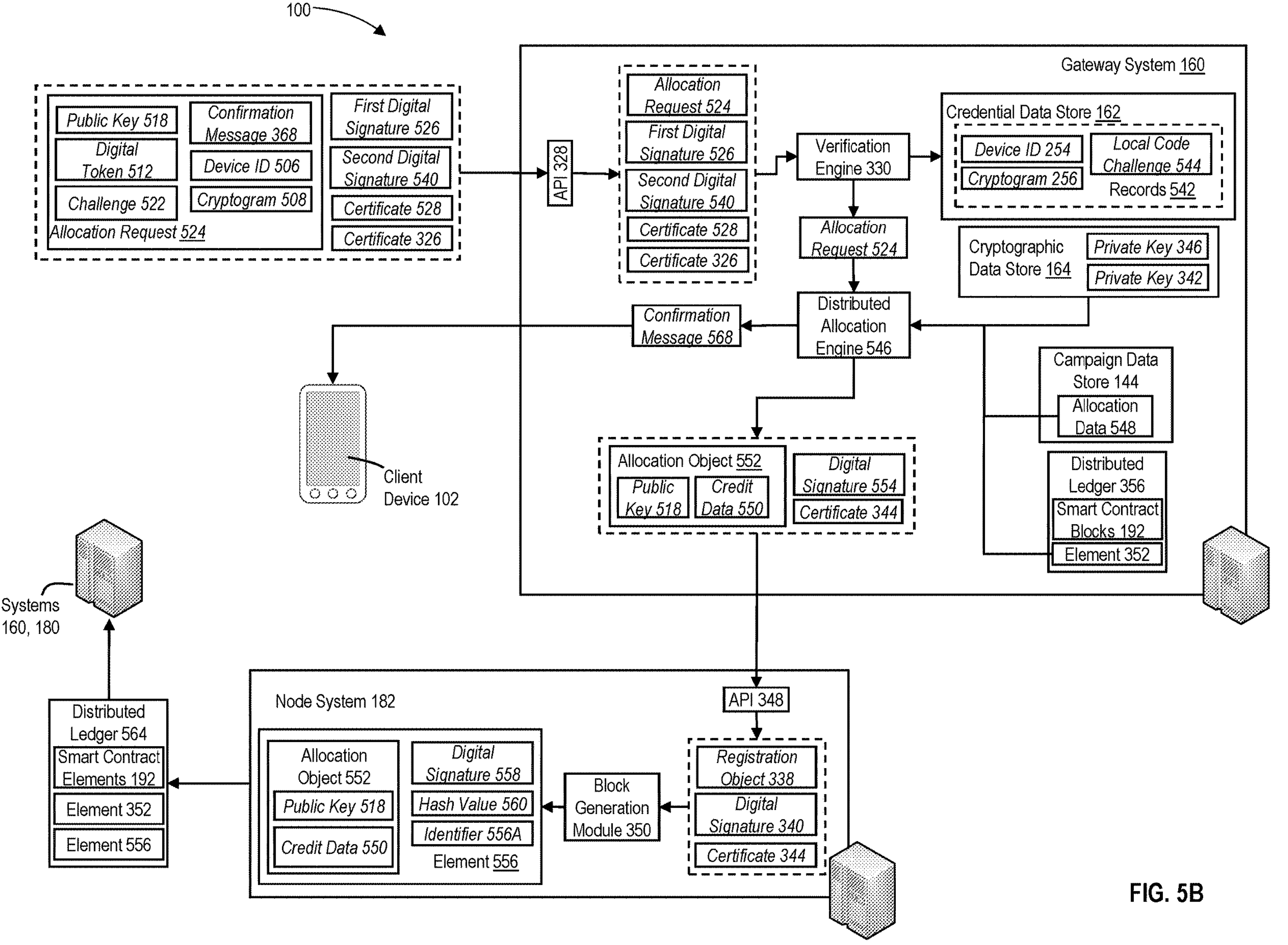

Referring to FIG. 5B, a programmatic interface establish and maintained by gateway system 160, such as API 328, may receive allocation request 524, first digital signature 526, second digital signature 540, and public key certificates 326 and 528, and may perform operations that trigger an execution of verification engine 330 by the one or more processors of gateway system 160. In some instances, executed verification engine 330 may parse public key certificate 528 to extract public cryptographic key 518 of executed wallet application 104, and may parse public key certificate 326 to extract public cryptographic key 320 of wallet system 130. Executed verification engine 330 may perform operations that validate second digital signature 540 (e.g., as applied to allocation request 524 and first digital signature 526) using public cryptographic key 320 and further, that validate first digital signature 526 (e.g., as applied to allocation request 524) using public cryptographic key 518.

If, for example, executed verification engine 330 were unable to verify first digital signature 526, and additionally, or alternatively, second digital signature 540, executed verification engine 330 may decline the requested allocation, and may discard allocation request 524. In some instances (not illustrated in FIG. 5B), executed verification engine 330 may generate and transmit an error message across network 120 to client device 102, e.g., for presentation within a display screen of referral interface 220.

Alternatively, if executed verification engine 330 were to verify first digital signature 526 and second digital signature 540, executed verification engine 330 may perform operations that obtain, from allocation request 524, code challenge 522, device identifier 506, and/or application cryptogram 508. In some examples, executed verification engine 330 may access credential data store 162, and identify one or more data records 542 that include or reference device identifier 506 or application cryptogram 508, and as such, as associated with client device 102 or executed wallet application 104. As illustrated in FIG. 5B, executed verification engine 330 may obtain, from data records 542, a local code challenge 544 (e.g., generated using any of the exemplary processes described herein), and perform operations that determine whether code challenge 522 (e.g., as received from client device 102) is consistent with, and corresponds to, local code challenge 544.

As described herein, code challenge 522 may also be associated with an additional digital signature applied to code challenge 522 by executed wallet application 104 using private cryptographic key 520. In some instances, not illustrated in FIG. 5B, executed verification engine 330 may perform any of the exemplary processes described herein to validate the additional digital signature applied to code challenge 522 prior to determining the consistency and correspondence between code challenge 522 and local code challenge 544.

If, for example, executed verification engine 330 were to detect an inconsistency between code challenge 522 and local code challenge 544 (and in some instances, were unable to validate the additional digital signature applied to code challenge 522), executed verification engine 330 may decline the requested allocation, and may discard allocation request 524. In some instances (not illustrated in FIG. 5B), executed verification engine 330 may perform any of the exemplary processes described herein to generate and transmit a corresponding error message across network 120 to client device 102, e.g., for presentation within a display screen of referral interface 220. Alternatively, based on the validation of first digital signature 526 and second digital signature 540 (and in some instances, the validation of the additional digital signature applied to code challenge 522), and based on the determined consistency between code challenge 522 and local code challenge 544, executed verification engine 330 may approve the requested allocation, e.g., based on the prior approval of, and consent to, the requested allocation registration by user 101 and wallet system 130, as indicated by respective ones of now-validated first and second digital signatures 526 and 540.

As illustrated in FIG. 5B, executed verification engine 330 may provide approved allocation request 524 as an input to a distributed allocation engine 546 executed by the one or more processors of gateway system 160. In some examples, executed distributed allocation engine 546 may perform any of the exemplary processes described herein to determine that the requested allocation complies within one or more allocation rules associated with the referral campaign (e.g., as maintained by gateway system 160 within campaign data store 166), and based on the determination that the requested allocation complies with the one or more allocation rules, and generate an allocation object indicative of the allocation of the redeemable and transferrable digital asset, or the predetermined quantity of that digital asset, to user 101 in response to the successful referral of user 121 for membership in the loyalty program (e.g., that associates public cryptographic key 518 with asset data identifying and characterizing the allocated digital asset, or the quantity of allocated digital assets).

Executed distributed allocation engine 546 may access campaign data store 166 (and/or rules database 168), and obtain allocation data 548 that, among other things, identify the digital asset, or the predetermined quantity of that digital asset, subject to allocation to user 101 in response to the successful referral of user 121 for membership in the loyalty program (e.g., ten units of the redeemable and transferrable digital coin), and identify and characterize one or more allocation rules that impose corresponding conditions on the allocation of the digital asset, or the predetermined quantity of the digital asset, to user 101 in response to the successful referral. Examples of these imposed conditions may include, but are not limited to, a requirement that user 121 represent a newly registered member of the loyalty program, and as such, that the elements of updated distributed ledger 356 record a single registration object associated with executed wallet application 124 (e.g., registration object 338 that includes public cryptographic key 272), or a requirement that the elements of updated distributed ledger 356 record a single registration object that includes data characterizing user 121, client device 122, or executed wallet application 124 (e.g., registration object 338 that includes registration data 304, which specifies device identifier 254, application cryptogram 256, and/or customer profile data 253).

In some examples, and to establish a compliance between the requested allocation and the conditions imposed on the requested allocation by the one or more allocation rules of allocation data 548. For instance, executed distributed allocation engine 546 may access confirmation message 362 maintained within allocation request 524, and may obtain public cryptographic key 272 of executed wallet application 124 (e.g., as associated with referred user 121 of client device 122) and identifier 352A, which identifies the particular element of updated distributed ledger 356 that maintains registration object 338 associated with user 121 and executed wallet application 124. Executed distributed allocation engine 546 may also access updated distributed ledger 356, as maintained the one or more tangible, non-transitory memories of gateway system 160, and may parse the elements of updated distributed ledger 356 to identify one or more of the elements recording a registration object that includes, or references, public cryptographic key 272.

As illustrated in FIG. 5B, executed distributed allocation engine 546 may establish that updated distributed ledger 356 includes only a single element, e.g., element 352, that includes a registration object references public cryptographic key 272, e.g., registration object 338. As such, executed distributed allocation engine 546 may establish that the requested allocation complies with a first one of the conditions imposed by the allocation rules of allocation data 548, e.g., that updated distributed ledger 356 record a single registration object associated with executed wallet application 124. In other instances, executed distributed allocation engine 546 may also perform operations that access registration object 338, and obtain device identifier 254 (e.g., which identifies client device 122), application cryptogram 256 (e.g., which identifies executed wallet application 124), and/or customer profile data 253 (e.g., which identifies and characterized successfully referred user 121).

In further instances, executed distributed allocation engine 546 may parse the elements of updated distributed ledger 356 to identify a presence of any additional, or alternate elements (e.g., other than element 352) that include registration objects referencing device identifier 254, application cryptogram 256, or any portion of customer profile data 253. For example, if executed distributed allocation engine 546 were to establish that element 352 represents the only element of updated distributed ledger 356 having a registration object that references device identifier 254, application cryptogram 256, or any portion of customer profile data 253, executed distributed allocation engine 546 may establish that the requested allocation complies with a second first one of the conditions imposed by the allocation rules of allocation data 548, e.g., that the elements of updated distributed ledger 356 record a single registration object that includes data characterizing user 121, client device 122, or executed wallet application 124. The disclosed embodiments are, however, not limited to these exemplary imposed conditions or these exemplary allocation rules, and in other examples, allocation data 548 may identify any additional or alternate allocation rule that imposes any additional or alternate or alternate condition on the requested allocation of the digital asset, or the predetermined quantity of the digital asset, to user 101 in response to the successful referral of user 121 for membership in the loyalty program.

In other examples, not illustrated in FIG. 5B, gateway system 160 may broadcast public cryptographic key 272 of executed wallet application 124 and/or element identifier 352A across network 120 to one or more of node systems 180, including node system 182. Each of the one or more of node systems 180, including node system 182, may access and execute elements of code recorded within the elements of distributed ledger 356 (e.g., within smart contract elements 192), which collectively establish a distributed smart contract that determines the consistency between the conditions imposed by the one or more allocation rules and requested allocation of the digital asset, or the predetermined quantity of the digital asset to user 101 in response to the successful referral. For example, all or a selected portion of allocation data 548, which identifies and characterizes the one or more allocation rules, may be immutably recorded within smart contract elements 192 of distributed ledger 356.

Referring back to FIG. 5B, if executed distributed allocation engine 546 may establish an inconsistency between at least one of the conditions imposed by the allocation rules and requested allocation of the digital asset, executed distributed allocation engine 546 may decline the requested allocation and may generate an error message, which gateway system 160 may transmit across network 120 to client device 102 via wallet system 130, e.g., for presentation within a display screen of referral interface 220. Alternatively, if executed distributed allocation engine 546 were to establish a consistency between the conditions imposed by the allocation rules and the requested allocation of the digital asset, executed distributed allocation engine 546, may also apply one or more fraud detection and mitigation processes to the allocation request (not illustrated in FIG. 5B). By way of example, the applied fraud detection and mitigation processes may include adding data characterizing the allocation request to a queue of pending requests, which may delay processing that allocates the digital asset, or the predetermined quantity of the digital asset, to user 101 predetermined or dynamically determined time period. In some instances, and upon expiration of the predetermined or dynamically determined time period, executed distributed allocation engine 546 may establish a successful outcome of the fraud detection and mitigation processes, and may perform further operations that complete the allocation of the digital asset, or the predetermined quantity of the digital asset, to user 101 in response to the successful referral of user 121 for membership in the loyalty program.

Referring back to FIG. 5B, executed distributed allocation engine 546 may perform operations that obtain, from allocation data 548, credit data 550 that identifies the digital asset, or the predetermined quantity of the digital asset, available for allocation to user 101 in response to the successful referral of user 121 for membership in the loyalty program, e.g., the ten units of the redeemable or transferrable digital coins. In some examples, executed distributed allocation engine 546 may package public cryptographic key 518 of executed wallet application 104 and credit data 550 into corresponding portions of an allocation object 552 associated with user 101 and executed wallet application 104, and may also apply a digital signature 554 to allocation object 552 using private cryptographic key 342 of gateway system 160, e.g., as maintained within cryptographic data store 164.

In some instances, executed distributed allocation engine 546 may perform additional operations that cause gateway system 160 to broadcast allocation object 552, digital signature 554, and public key certificate 344 of gateway system 160 (that includes public cryptographic key 346 of gateway system 160) across network 120 to one or more of node systems 180, such as node system 182, which may perform any of the exemplary processes described herein to record allocation object 552 within one or more elements of a distributed ledger, such as an latest, longest version of distributed ledger 356. As described herein, upon recordation of allocation object 552 within the one or more elements of the distributed ledger, the digital asset, or the predetermined quantity of the digital asset (e.g., as specified within credit data 550) may be allocated to user 101, and may credit a current balance of the digital asset held by user 101 and available for redemption or for transfer to other members of the loyalty program or to members of additional loyalty program, e.g., using any of the exemplary redemption or transfer processes implemented collectively by executed wallet application 104 (or executed wallet application 124), wallet system 130, and gateway system 160.

For example, and as illustrated in FIG. 5B, a programmatic interface established and maintained by each of node systems 180, such as API 348 of node system 182, may receive allocation object 552, digital signature 554, and public key certificate 344 from gateway system 160, and may route allocation object 552, digital signature 554, and public key certificate 344 to a corresponding block generation engine, such as block generation engine 350 of node system 182. When executed by the one or more processors of node system 182 (and each additional or alternate one of node systems 180), block generation engine 350 may perform operations that verify digital signature 554 using public cryptographic key 346 (e.g., as obtained from public key certificate 344), that generate an additional element 556 of distributed ledger 356 that, among other things, includes allocation object 552, e.g., public cryptographic key 518 of executed wallet application 104 and credit data 550, which identifies the digital asset, or the predetermined quantity of the digital asset, subject to allocation to user 101.

In some instances, executed block generation engine 350 (and the block generation engine executed by additional ones of node systems 180) may perform operations that generate and apply a digital signature 558 to allocation object 552 (e.g., using a corresponding private cryptographic key of node system 182), and that generate a hash value 560 based on an application of one or more appropriate hash algorithms to allocation object 552 and digital signature 558 (and in some instances, to other elements of distributed ledger 356). Executed block generation engine 350 may package digital signature 558 and hash value 560 into corresponding portions of additional element 556, e.g., in conjunction with allocation object 552.

Further, node system 182 (and each additional or alternate one of node systems 180) may perform additional operations that append additional element 556 to a prior version of the permissioned distributed ledger (e.g., distributed ledger 356) to generate a latest, longest version of the permissioned distributed ledger, e.g., an updated distributed ledger 564. In some instances, node system 182 (and each additional or alternate one of node systems 180), may also generate and assign an identifier 556A to the additional element, such as a positional identifier (e.g., a "block number") that specifies a sequential position of additional element 556 in relation to the existing, prior elements of the distributed ledger. These additional operations may, for example, be established through a distributed consensus among additional ones of node systems 180, and may include, but are not limited to, the calculation of an appropriate proof-of-work or proof-of-stake by distributed consensus module 358 prior to the other peer systems. In certain aspects, node system 182 may broadcast evidence of the calculated proof-of-work or proof-of-stake to additional ones of node systems 180 across network 120 (e.g., as consensus data 566).

Node system 182 may also broadcast updated distributed ledger 564, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. In some instances, not illustrated in FIG. 3B, executed distributed allocation engine 546 of gateway system 160 may store updated distributed ledger 564 within a portion of the one or more tangible, non-transitory memories, such as data repository 161 (e.g., to replace distributed ledger 190), and may generate a confirmation message 568 that confirms the allocation of the digital asset, or the predetermined quantity of the digital asset, to user 101 in response to the successful referral of user 121 for membership in the loyalty program, and the availability of these allocated digital asserts for redemption or transfer using any of the exemplary processes described herein.

Executed distributed allocation engine 546 may perform operations that cause gateway system 160 to transmit confirmation message 568 across network 120 to client device 102, e.g., for presentation within a corresponding display screen of referral interface 220. A secure, programmatic interface established and maintained by client device 102, such as API 214, may receive confirmation message 568, and may route confirmation message 568 to executed wallet application 104, which may process confirmation message 568 and generate one or more interface elements 570 that, when rendered for presentation by display unit 218, collectively establish an additional display screen 572 of referral interface 220 (not illustrated in FIG. 5B).

In some examples, the referral campaign established by and operating within the loyalty program of the financial institution may allocate a digital asset, or a predetermined quantity of the digital asset (e.g., the ten units of the redeemable and transferrable digital coins described herein) to an existing customer to a successful referral of an additional customer of the financial institution for membership in the loyalty program, and further, to the additional customer upon successful registration as a member of the loyalty program. As described herein, certain of these digital assets, e.g., as allocated to the members of the loyalty program through participation in the exemplary qualifying transactions or the referral campaigns described herein, or received through the exemplary peer-to-peer (P2P) transfers described herein, may be redeemed for one or more physical or digital products offered by the financial institution that established and manages the loyalty program.

By way of example, these physical or digital products may include, but are not limited to, one or more physical or virtual stored-value or "gift" cards loaded with predetermined amounts of a fiat currency and exchangeable for corresponding, predetermined quantities of the allocated digital assets (e.g., the digital coins described herein). In other instances, certain of these allocated digital assets may be redeemed, and converted into, a credit against an outstanding balance associated with one or more payment instruments issued by the financial institution and held by one or more of the existing members or the newly registered customers. The disclosed embodiments are, however, not limited to these exemplary physical or digital products, and in other instances, the existing member or the newly registered customer may redeem certain quantities of the allocated digital assets for any additional or alternate physical or digital product available to and offered by the financial institution associated with the loyalty program.

Figure 6A:
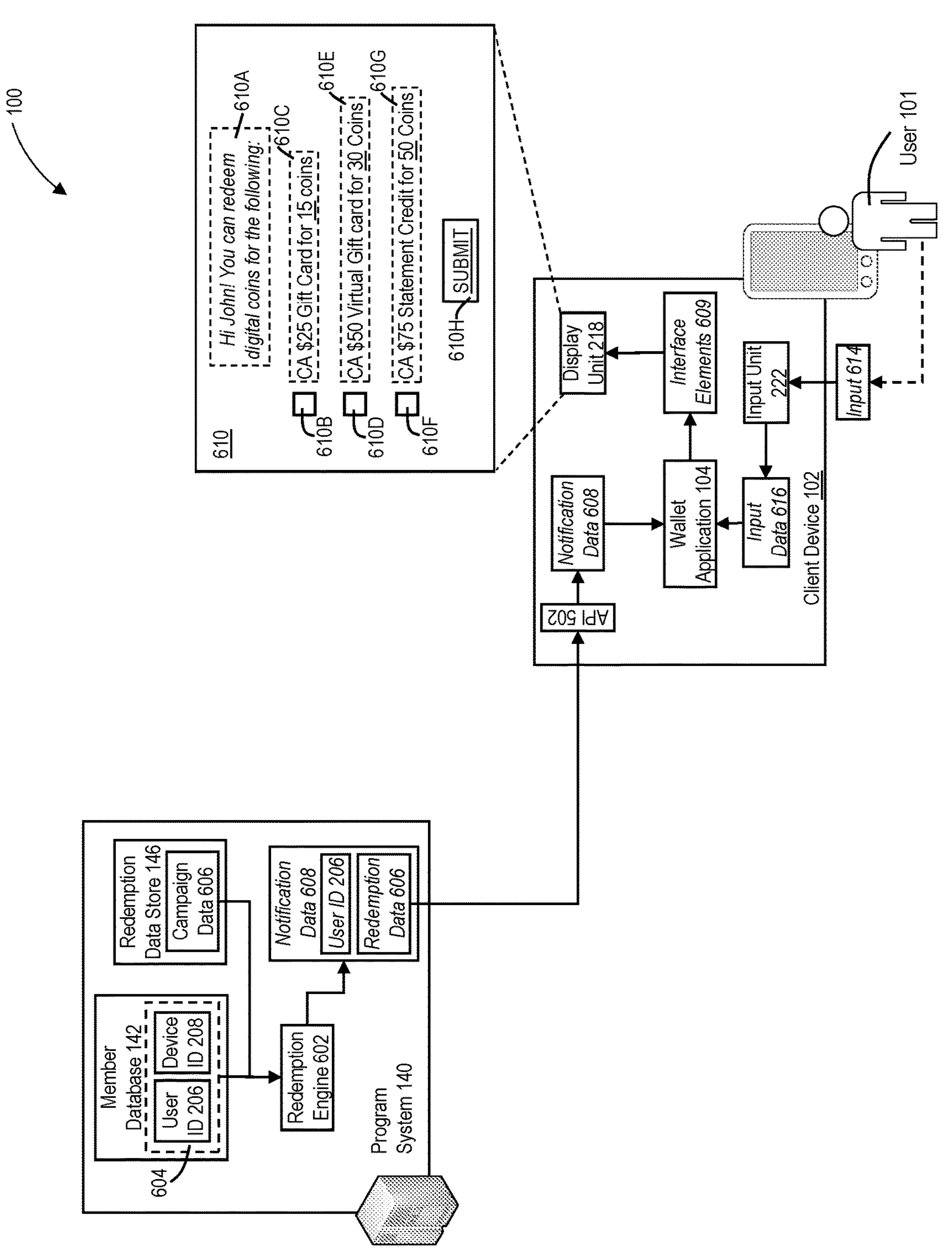

Referring to FIG. 6A, a redemption engine 602 executed by the one or more processors of program system 140 may access member database 142, and may further access one or more structured or unstructured data records 204, which identify and characterize a current member of the loyalty program, such as user 101. As described herein, data record 204 may include information that identifies user 101, the device operated by or associated with user 101 (e.g., the IP or MAC address of client device 102), along with additional elements of contact information and profile data that identify and characterize user 101. In some instances, executed redemption engine 602 may extract, from data record 204, a user identifier 206 of user 101 and a device identifier 208 of client device 102 (e.g., IP address).

Further, executed redemption engine 602 may also perform operations that access redemption data store 146, and obtain one or more elements 606 of the redemption data that identify and characterize the physical or virtual products available for redemption by user 101 using predetermined quantities of digital assets allocated to user 101, through participation in the exemplary qualifying transactions or the referral campaigns described herein, or received through the exemplary peer-to-peer (P2P) transfers described herein. By way of example, redemption data elements 604 may specify that user 101 may redeem a first quantity of digital assets (e.g., fifteen units of the digital coin) in exchange for a physical stored-value card loaded within CA $25.00, a second quantity of the digital assets (e.g., thirty units of the digital coin) in exchange for a virtual stored-value card loaded within CA $60.00, and a third quantity of digital assets (e.g., fifty units of the digital coin) in exchange for a credit of CA $75.00 against an statement of a credit card account issued by the financial institution and held by user 101. Executed redemption engine 602 may package user identifier 206 and all, or a selected portion, of redemption data elements 606, into corresponding portions of notification data 608, which program system 140 may transmit across network 120 to client device 102, e.g., using the IP address specified within device identifier 208.

A programmatic interface associated with wallet application 104, such as API 214, may receive notification data 608 from program system 140, and may provide notification data 608 as an input to wallet application 104, e.g., as executed by the or more processors of client device 102. Executed wallet application 104 may perform operations that store notification data 608 within a portion of the tangible, non-transitory memories of client device 102, e.g., for subsequent processing during one or more of the exemplary asset redemption operations described herein (not illustrated in FIG. 6A). In some instances, executed wallet application 104 may process notification data 608 (e.g., that includes user identifier 206 and redemption data elements 606), and may generate one or more interface elements 609 that, when rendered for presentation by display unit 218, collectively establish a display screen of a redemption interface 612. For example, as illustrated in FIG. 6A, the display screen of redemption interface 610 may include interface elements 610A, which identity and offer user 101 an opportunity to redeem allocated and accrue digital assets (e.g., digital coins) for available physical or digital products of services (e.g., "Hi John! You can redeem digital coins for the following").

The display screen of redemption interface 610 may also include: (i) interface element 610B, which identifies the available physical stored-value card loaded within CA $25.00 and redeemable for fifteen units of the digital coin, and an interactive interface element, e.g., check box 610C, that allows user 101 to select the physical stored-value card for redemption; (ii) interface element 610D, which identifies the available virtual stored-value card loaded within CA $60.00 and redeemable for thirty units of the digital coin, and an interactive interface element, e.g., check box 610E, that allows user 101 to select the virtual stored-value card for redemption; and (iii) interface element 610F, which identifies the available statement credit in the amount of CA $75.00 and redeemable for fifty units of the digital coin, and an interactive interface element, e.g., check box 610G, that allows user 101 to select the available statement credit for redemption. Additionally, the display screen of redemption interface 610 may also include an additional interactive interface element, e.g., "SUBMIT" icon 610H, which upon selection by user 101, causes executed wallet application 104 to perform operations that initiate one or more of the exemplary processes described herein to redeem the selected physical or virtual product for the corresponding units of the allocated and accrued digital asset, e.g., based on data exchanged with, and validated by, wallet system 130 and gateway system 160.

For example, and upon viewing the display screen of redemption interface 612, user 101 may elect to redeem the fifteen units of the digital coin for the available physical stored-value card loaded within CA $25.00. In some instances, user 101 may provide, via input unit 222 of client device 102, input 224 that selects check box 610C (e.g., by "checking" check box 610C) to indicate an intention to redeem the fifteen units of the digital coin for the available physical stored-value card loaded within CA $25.00, and that then selects "SUBMIT" icon 610H. Further, although not illustrated in FIG. 6A the selection of SUBMIT" icon 610G may cause display unit 240 to present interface elements that establish one or more additional display screens of redemption interface 612, and that prompt user 101 to provide further input specifying one or more authentication credentials of user 101, such as, but not limited to, an alphanumeric login credential, an alphanumeric password, or a biometric credential (e.g., a thumbprint image, a facial image, etc.). In some instances, the provisioning of the one or more authentication credentials in response to the selection of "SUBMIT" icon 610H may further confirm the intention of user 101 to redeem the fifteen units of the digital coin for the available physical stored-value card loaded within CA $25.00. Input unit 222 may receive input 614 (e.g., that specifies the selection of check box 610C, the selection of "SUBMIT" icon 610H, and in some instances, the one or more authentication credentials) and may route input data 616 representative of the received input to executed wallet application 104.

Figure 6B:
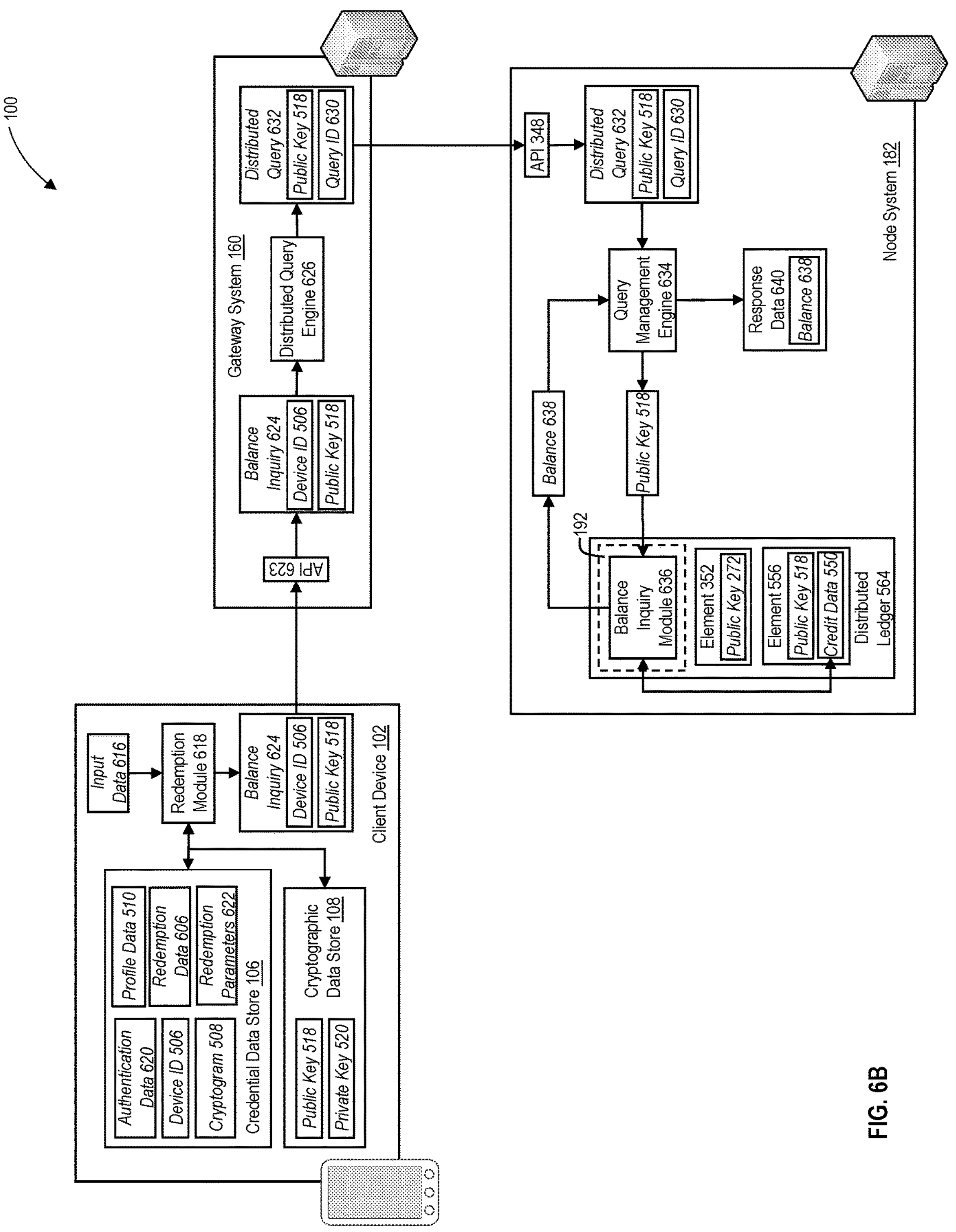

Referring to FIG. 6B, a redemption module 618 of executed wallet application 104 may receive input data 616, and may parse input data 616 to detect the requested redemption of the fifteen units of the digital coin by user 101, and to extract authentication data 620 representative of the provisioned authentication credentials, which redemption module 618 may store within a portion of credential data store 106, e.g., in association with device identifier 506 (e.g., the IP address of client device 102), application cryptogram 508 (e.g., that uniquely identifies executed wallet application 104), and customer profile data 510 (e.g., the identifies and characterizes user 101). Further, redemption module 618 may further process input data 616 and corresponding portions of redemption data elements 606 (e.g., as maintained locally within notification data 608) to generate parameter data 622 that characterizes the requested redemption. By way of example, parameter data 622 may include one or more identifiers of the selected physical or virtual product (e.g., an alphanumeric identifier assigned to the selected physical stored-value card by program system 140) and data that identifies the quantity of the digital asset subject to redemption (e.g., the fifteen units of the digital coin). As illustrated in FIG. 6B, redemption module 618 may also store redemption parameter data 622 within a corresponding portion of credential data store, e.g., in conjunction with authentication data 620, device identifier 506, application cryptogram 508, and customer profile data 510.

In some instances, and prior to initiating one or more of the exemplary redemption processes described herein (e.g., through a generation and transmission of a corresponding redemption request to wallet system 130), executed wallet application 104 may perform additional operations that, in conjunction with gateway system 160, determine a current balance of digital assets held by user 101 and available for redemption for the physical or virtual products. For example, the elements of distributed ledger 564 (and any of the additional or alternate of the exemplary distributed ledgers described herein, such as distributed ledger 190 and 356) may record information that, in conjunction with public cryptographic key 518 of executed wallet application 104, identifies and tracks each unit of the digital asset allocated to user 101 through participation in the exemplary qualifying transactions or the referral campaigns described herein, redeemed by user 101 through any of the exemplary redemption processes described herein, or received or transferred through the exemplary peer-to-peer (P2P) transfers described herein. Further, the elements of distributed ledger 564 may also record elements of code (e.g., within one or more smart contract elements 192) that, when executed by one or more of node systems 180 in response to instructions received from gateway system 160, cause node systems 180 to perform consensus-based operations that query the elements of distributed ledger 564 and establish the current balance of digital assets associated with public cryptographic key 518 and as such, available to user 101 for transfer or redemption.

As illustrated in FIG. 6B, redemption module 618 may perform operations that obtain device identifier 506 from credential data store 106, and that obtain public cryptographic key 518 of executed wallet application 104 from cryptographic data store 108. In some instances, redemption module 618 may package device identifier 506 and public cryptographic key 518 into corresponding portions of a balance query 624, which client device 102 may transmit across network 120 to gateway system 160. In some instances, balance query 624 may be generated, and transmitted to gateway system 160, without one or more of the challenge codes generated by gateway system 160, e.g., using any of the processes described herein.

A secure, programmatic interface of gateway system 160, such as application programming interface (API) 623, may receive balance query 624, and may provide balance query 624 as an input to a distributed query engine 626 of gateway system 160. Upon execution by the one or more processors of gateway system 160, distributed query engine 626 may perform operations that store balance query 624, which includes public cryptographic key 518 and device identifier 506, within a portion of the one or more tangible, non-transitory of gateway system 160, e.g., within a portion of data repository 161 (not illustrated in FIG. 6B). Further, executed distributed query engine 626 may extract public cryptographic key 518 from balance query 624, and may package public cryptographic key 518 and a query identifier 630 into corresponding portions of a distributed query 632, which gateway system 160 may broadcast across network 120 to one or more of node systems 180, including node system 182.

In some instances, a secure programmatic interface of the one or more of node systems 180, such as API 348 of node system 182, may receive distributed query 632 from gateway system 160, and may route distributed query 632 to a corresponding query management engine, such as query management engine 634 of node system 182. When executed by the one or more processors of node system 182 (and each additional or alternate one of node systems 180), query management engine 634 may process distributed query 632, detect query identifier 630 (e.g., that identifies the requested balance inquiry associated with public cryptographic key 518), and based on the detection of query identifier 630, perform operations that trigger an execution of the one or more elements of code recorded within smart contract element 192 of distributed ledger 564 (e.g., a balance inquiry module 636). For example, and upon execution by the one or more processors of node system 182 (and by each additional or alternate one of node systems 180), balance inquiry module 636 may receive distributed query 632, access public cryptographic key 518 of executed wallet application 104, and parse the elements of distributed ledger 564 to identify each element that includes or references public cryptographic key 518, such as, but not limited to, element 556 that records allocation object 552, as described herein.

As described herein, each identified element of distributed ledger 564 that includes or references public cryptographic key 518 may record information (e.g., a data object) associated with a registration operation or a key-regeneration operation involving user 101 or executed wallet application 104, or with an allocation, redemption, or transfer operation that credits a quantity of the digital asset (e.g., the digital coin) to, or that debits a quantity of the digital asset from, user 101 or executed wallet application 104. In some instances, executed balance inquiry module 636 may perform operations that parse the identified elements of distributed ledger 564 (e.g., that include or reference public cryptographic key 518) and obtain corresponding elements of asset credit or asset debit data, and based on the elements of asset credit or asset debit data, compute a current balance 638 of digital assets associated with public cryptographic key 518 and available to user 101. As illustrated in FIG. 6B, executed balance inquiry module 636 may return current balance 638 to executed query management engine 634 of node system 182, which may package current balance 638 into a corresponding portion of response data 640. Upon successful completion of any of the exemplary consensus-based processes described herein, node system 182 may transmit response data 640 across network 120 to gateway system 160 (e.g., via API 623), and executed distributed query engine 626 may perform operations that cause gateway system 160 to route response data 640 back to client device 102 across network 120 (not illustrated in FIG. 6B).

Figure 7A:
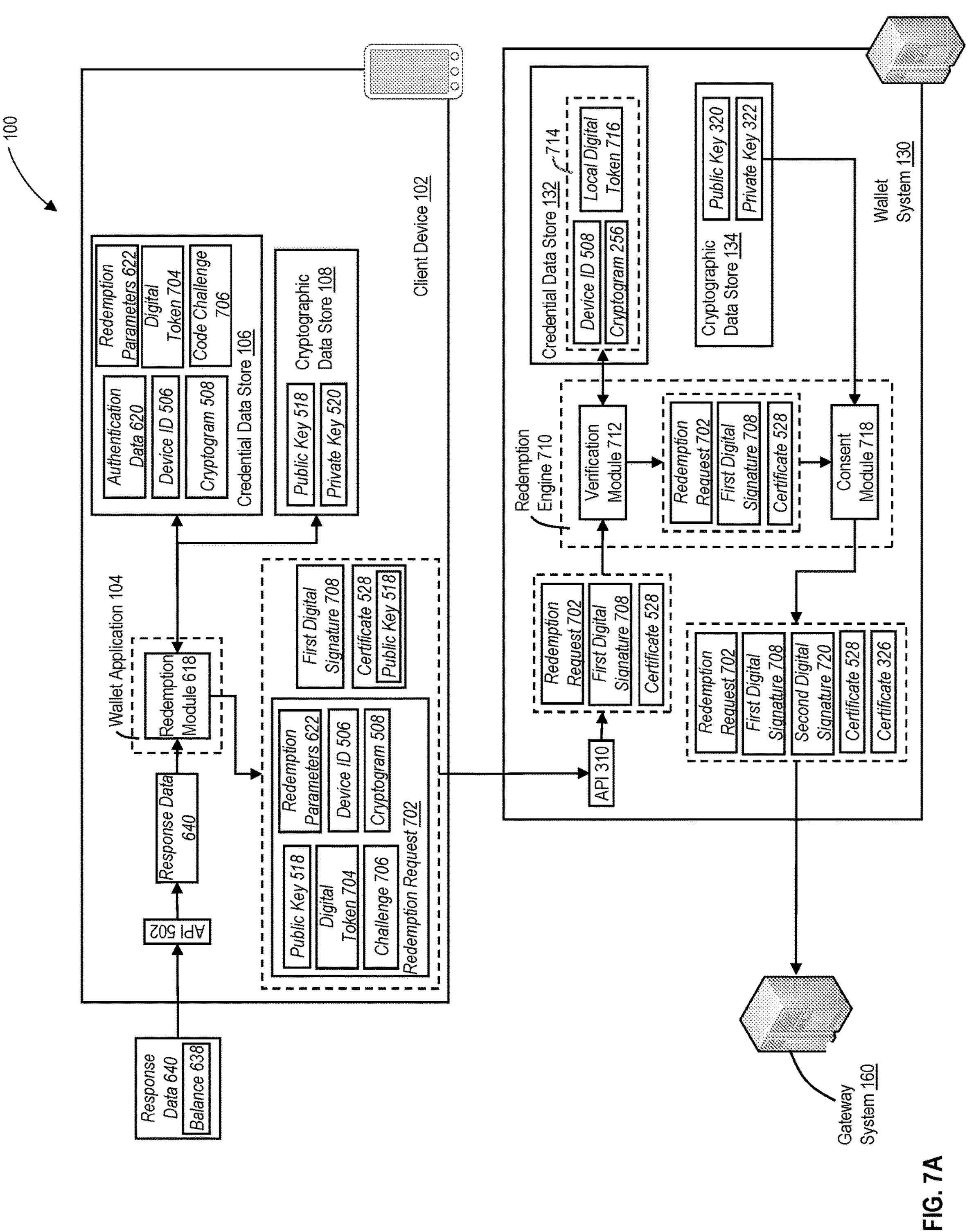

Referring to FIG. 7A, a programmatic interface established and maintained by client device 102, such as API 502 of executed wallet application 104, may receive response data 640 and may route response data 640 to redemption module 618 of executed wallet application 104. In some instances, redemption module 618 may perform operations that obtain current balance 638 of the available digital assets from response data 640, and based on portions of redemption parameter data 622, determine whether current balance 638 of the available digital assets is equivalent to, or exceeds, the quantity of the digital asset subject to redemption (e.g., the fifteen digital coins). If, for example, redemption module 618 were to determine that the available balance of the digital assets is insufficient to support the requested redemption (e.g., that the quantity of the digital asset subject to redemption exceeds the current balance), redemption module 618 may decline to initiate the requested redemption, and executed wallet application 104 may perform operations that generate and present an error message within an additional display screen of redemption interface 612. Alternatively, if redemption module 618 were to determine that the available balance of the digital assets is sufficient to support the requested redemption (e.g., that the current balance of the digital asset exceeds the quantity of the digital asset subject to redemption), redemption module 618 may perform additional operations that, in conjunction with wallet system 130, gateway system 160, and program system 140, initiate a redemption of the selected physical product (e.g., the stored-value card loaded with CA $25) for the corresponding quantity of the digital asset (e.g., the fifteen digital coins).

Redemption module 618 may also perform operations that generate a request 702 to redeem the specified quantity of the digital asset (e.g., the fifteen units of the digital coin) for the selected physical product (e.g., the stored-value card loaded with CA $25). For example, redemption module 618 may generate redemption request 702 based on, and responsive to, the determination that the available balance of the digital assets held by user 101 is sufficient to support the requested redemption, and further, redemption module 618 may generate redemption request 702 automatically and without further input by user 101. In some instances, redemption module 618 may package, into corresponding portions of redemption request 702, one of more of: (i) public cryptographic key 518, which uniquely identifies user 101 and executed wallet application 104); (ii) redemption parameter data 622, which includes the one or more identifiers of the selected physical product (e.g., an alphanumeric identifier assigned to the selected physical stored-value card by program system 140) and data that identifies the quantity of the digital asset subject to redemption (e.g., the fifteen units of the digital coin); and (iii) one or more of device identifier 506 or application cryptogram 508.

Further, although not illustrated in FIG. 7A, redemption module 618 may perform any of the exemplary processes described herein to request, and receive, a digital token 704 from wallet system 130 (e.g., in response to a successful authentication process between executed wallet application 104 and one or more application programs, engines, or modules executed by the one or more processors of wallet system 130), and to request, and receive, a code challenge 706 from gateway system 160. In some instances, redemption module 618 may store digital token 704 and code challenge 706 within a portion of credential data store 106 associated with authentication data 620, device identifier 506, application cryptogram 508, and customer profile data 510. As described herein, digital token 704 may correspond to a one-time-use (OTU) token valid to authenticate the identity of user 101 during a single digital-asset redemption process, and may be characterized by a predetermined composition, length, or format. Further, code challenge 706 may be generated by gateway system 160 using any of the exemplary processes described herein, and correspond to a hash value representative of all or a selected portion of device identifier 506 and/or application cryptogram 508, or may correspond to a hash value representative of a plaintext cipher maintained confidentially by gateway system 160.

Redemption module 618 may also package digital token 704 and code challenge 706 into corresponding portions of redemption request 702, e.g., in addition to public cryptographic key 518, redemption parameter data 622, device identifier 506, and/or application cryptogram 508. Further, although not illustrated in FIG. 7A, redemption module 618 may also apply a digital signature to code challenge 706 prior to packaging code challenge 706 into a corresponding portion of redemption request 702. Redemption module 618 of executed wallet application 104 may also perform operations that apply a first digital signature 708 to redemption request 702 using private cryptographic key 520 of executed wallet application 104, as maintained securely within cryptographic data store 108. In some examples, the application of first digital signature 708 to redemption request 702 may be indicative of an approval of, and a consent to, the requested redemption of the specified quantity of the digital asset (e.g., the fifteen digital coins) for the selected physical product (e.g., the stored-value card loaded with CA $25). Further, certain of the exemplary process described herein, which couple the application of first digital signature 708 to redemption request 702 to a level or type of consent granted by user 101 to wallet system 130 and/or gateway system 160 to access or manipulate confidential registration, allocation, or redemption data, may be implemented in addition to, or as an alternate to, existing token-based authorization and consent protocols (e.g., an OAuth protocol, etc.) during the asset-allocation processes implemented collectively by client device 102, wallet system 130, and gateway system 160.

Redemption module 618 may also perform operations that cause client device 102 to transmit redemption request 702, first digital signature 708, and in some instances, public key certificate 528 of client device 102 (which includes public cryptographic key 518) across network 120 to wallet system 130. As illustrated in FIG. 7A, a secure, programmatic interface established and maintained by wallet system 130, such as API 310, may receive redemption request 702, first digital signature 708, and in some instances, public key certificate 528, and may trigger an execution of a redemption engine 710 by the one or more processors of wallet system 130.

For example, a verification module 712 of executed redemption engine 710 may receive redemption request 702, first digital signature 708, and public key certificate 528 from API 310. In some instances, verification module 712 may parse public key certificate 528 and obtain a public cryptographic key associated client device 102 (e.g., public cryptographic key 518 of executed wallet application 104), and perform operations that verify first digital signature 708 based on the obtained public cryptographic key. If, for example, verification module 712 were unable to verify first digital signature 708, verification module 712 may establish that redemption request 702 was either corrupted during transmission of altered one or more third parties without permission, and executed redemption engine 710 may decline the requested redemption. In some instances (not illustrated in FIG. 7A), executed redemption engine 710 may generate and transmit an error message across network 120 to client device 102, e.g., for presentation within a corresponding digital interface, such as a display screen of redemption interface 612.

Alternatively, if verification module 712 were to verify first digital signature 708, verification module 712 may perform operations that obtain device identifier 506, application cryptogram 508, and digital token 704 from redemption request 702, and may identify one or more data records 714 within credential data store 132 that include or reference device identifier 506 or application cryptogram 508, and as such, are associated with client device 102 or executed wallet application 104. As illustrated in FIG. 7A, verification module 712 may obtain, from data records 714, a local digital token 716, which is indicative of a currently valid authentication of the identity of user 101, and perform operations that determine whether digital token 704 (e.g., as received from client device 102) is consistent with, and corresponds to, local digital token 716. If, for example, verification module 712 were to detect an inconsistency between digital token 704 and local digital token 716, executed redemption engine 710 may decline the requested redemption, and may generate and transmit an error message across network 120 to client device 102, e.g., for presentation within a display screen of redemption interface 612.

Alternatively, based on the verification of first digital signature 708, and based on the determined consistency between digital token 704 and local digital token 716, verification module 712 may approve the requested redemption and verify redemption request 702 for further processing, e.g., by gateway system 160. In some instances, verification module 712 may provide redemption request 702, first digital signature 708, and in some instances, public key certificate 528 and as input to a consent module 718 of executed redemption engine 710. In some instances, consent module 718 may perform operations that apply a second digital signature 720 to redemption request 702 (e.g., that includes public cryptographic key 518, redemption parameter data 622, digital token 704, code challenge 706, device identifier 506 and/or application cryptogram 508) and to first digital signature 708. As described herein, the application of second digital signature 720 to redemption request 702 and to first digital signature 708 may indicative of an approval of, and a consent to, the requested redemption of the specified quantity of the digital asset (e.g., the fifteen digital coins) for the specified physical product (e.g., the stored-value card loaded with CA $25) by wallet system 130. Executed redemption engine 710 may perform operations that cause wallet system 130 to transmit redemption request 702, first digital signature 708, second digital signature 720, public key certificate 528 of client device 102 (e.g., that includes public cryptographic key 518) and public key certificate 326 (e.g., that includes public cryptographic key 320 of wallet system 130) across network 120 to gateway system 160.

Figure 7B:
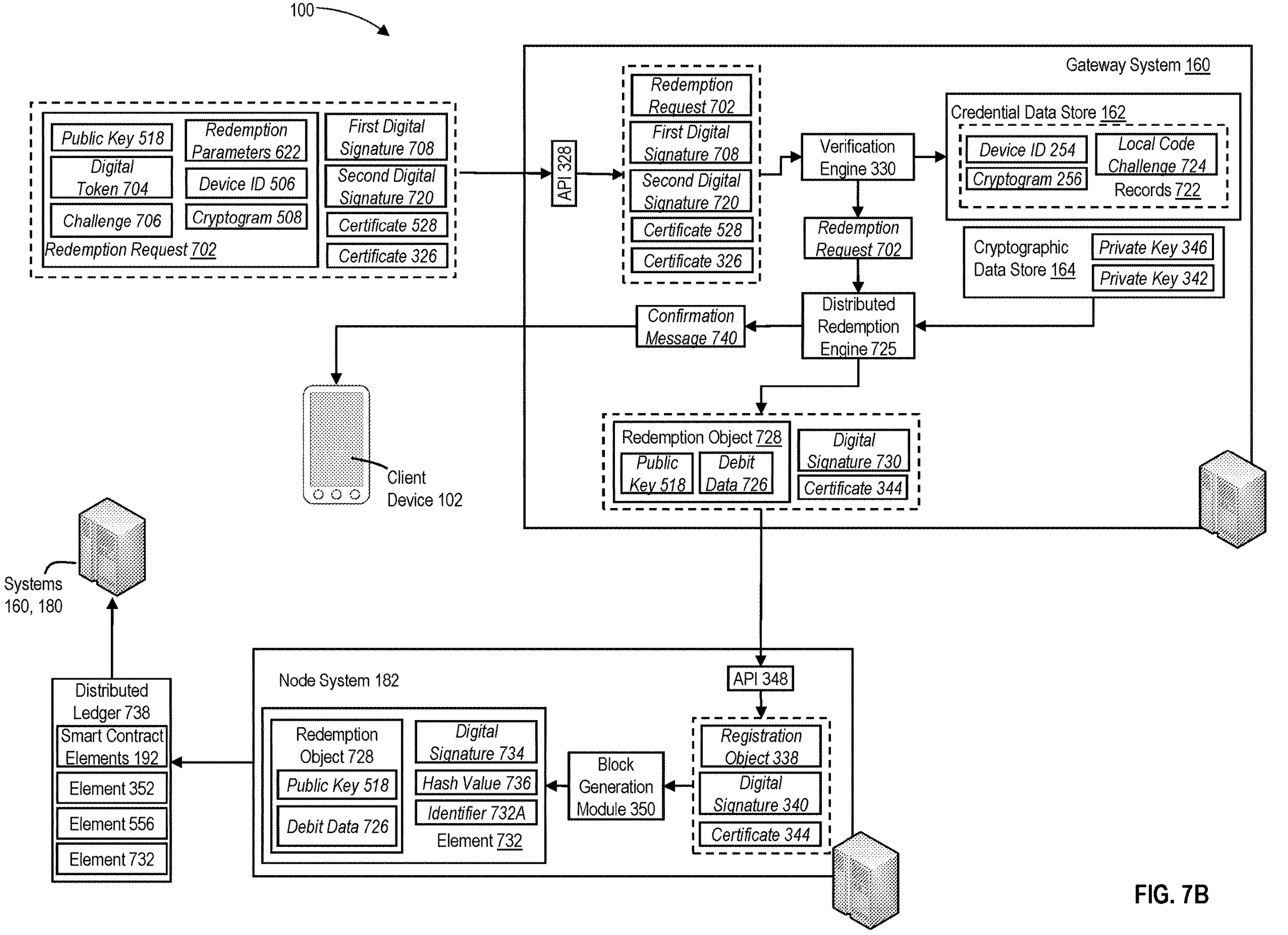

Referring to FIG. 7B, a programmatic interface establish and maintained by gateway system 160, such as API 328, may receive redemption request 702, first digital signature 708, second digital signature 720, public key certificate 528, and public key certificate 326, and may perform operations that trigger an execution of verification engine 330 by the one or more processors of gateway system 160 (e.g., based on one or more programmatically generated commands). In some instances, executed verification engine 330 may parse public key certificate 528 to extract public cryptographic key 518 of executed wallet application 104, and may parse public key certificate 326 to extract public cryptographic key 320 of wallet system 130. Executed verification engine 330 may perform operations that validate second digital signature 720 (e.g., as applied to redemption request 702 and first digital signature 708) using public cryptographic key 320 of wallet system 130 and further, that validate first digital signature 708 (e.g., as applied to redemption request 702) using public cryptographic key 518 of executed wallet application 104.

If, for example, executed verification engine 330 were unable to verify first digital signature 708, and additionally, or alternatively, second digital signature 720, executed verification engine 330 may decline the requested allocation, and may discard redemption request 702. In some instances (not illustrated in FIG. 7B), executed verification engine 330 may generate an error message indicative of the failed verification of first digital signature 708 and/or second digital signature 720, and gateway system 160 may transmit the generated error message across network 120 to client device 102, e.g., for presentation within redemption interface 612.

Alternatively, if executed verification engine 330 were to verify first digital signature 708 and second digital signature 720, executed verification engine 330 may perform operations that obtain, from redemption request 702, code challenge 706, device identifier 506, and/or application cryptogram 508. In some examples, executed verification engine 330 may access credential data store 162, and identify one or more of data records 722 that include or reference device identifier 506 or application cryptogram 508, and as such, as associated with client device 102 or executed wallet application 104. As illustrated in FIG. 7B, executed verification engine 330 may obtain, from the one or more of data records 542, a local code challenge 544 (e.g., generated using any of the exemplary processes described herein), and perform operations that determine whether code challenge 706 (e.g., as received from client device 102) is consistent with, and corresponds to, local code challenge 724.

As described herein, code challenge 706 may also be associated with an additional digital signature applied to code challenge 706 by executed wallet application 124 using private cryptographic key 520. In some instances, not illustrated in FIG. 7B, executed verification engine 330 may perform any of the exemplary processes described herein to validate the additional digital signature applied to code challenge 706 prior to determining the consistency and correspondence between code challenge 706 and local code challenge 724.

If, for example, executed verification engine 330 were to detect an inconsistency between code challenge 706 and local code challenge 724 (and in some instances, were unable to validate the additional digital signature applied to code challenge 706), executed verification engine 330 may decline the requested allocation, and may discard redemption request 702. In some instances (not illustrated in FIG. 7B), executed verification engine 330 may perform any of the exemplary processes described herein to generate and transmit a corresponding error message across network 120 to client device 102, e.g., for presentation within a display screen of redemption interface 612. Alternatively, based on the validation of first and second digital signatures 708 and 720 (and in some instances, the validation of the additional digital signature applied to code challenge 706), and based on the determined consistency between code challenge 706 and local code challenge 724, executed verification engine 330 may approve the requested allocation.

As illustrated in FIG. 7B, executed verification engine 330 may provide approved redemption request 702 as an input to a distributed redemption engine 725, which may be executed by the one or more processors of gateway system 160. In some instances, executed distributed redemption engine 725 may perform operations that obtain, from redemption request 702, public cryptographic key 518 of executed wallet application 104 and redemption parameter data 622. As described herein, executed distributed redemption engine 725 may perform operations that store redemption parameter data 622 within one or more of the tangible, non-transitory memories of gateway system 160, e.g., within a portion of data repository 161.

Further, executed distributed redemption engine 725 may extract the data that identifies the quantity of the digital asset subject to redemption (e.g., the fifteen units of the digital coin) from redemption parameter data 622, and package the extracted data into corresponding portions of debit data 726, which recorded within an additional element of distributed ledger 564, effects a final redemption of the quantity of the digital assets and debit the identified quantity of the digital asset from the current balance of the digital asset held by user 101. As illustrated in FIG. 7B, executed distributed redemption engine 725 may generate a redemption object 728 associated with the requested and now-approved redemption that includes public cryptographic key 518 of executed wallet application 104 and debit data 726, and may also apply a digital signature 730 to redemption object 728 using private cryptographic key 342 of gateway system 160, e.g., as maintained within cryptographic data store 164. Further, executed distributed redemption engine 725 may perform additional operations that cause gateway system 160 to broadcast redemption object 728, digital signature 730, and public key certificate 344 of gateway system 160 (that includes public cryptographic key 346 of gateway system 160) across network 120 to one or more of node systems 180, such as node system 182.

In some examples, each of the one or more of node systems 180, including node system 182, may receive redemption object 728, digital signature 730, and public key certificate 344, e.g., via API of node system 182. Each of the one or more of node systems 180, including node system 182, may perform any of the exemplary, consensus-based operations described herein to: (i) verify digital signature 730 using public cryptographic key 346 (e.g., as obtained from public key certificate 344); and (ii) generate an additional element 732 of distributed ledger 564 that includes, among other things, redemption object 728 (e.g., which itself includes public cryptographic key 518 and debit data 726), a digital signature 734 applied to redemption object 728 (e.g., using a private cryptographic key of corresponding ones of node systems 180, including node system 182), a hash value 736 representative of redemption object 728 and digital signature 734 (and in some instances, to other elements of distributed ledger 564), and an identifier 732A (e.g., a "block number") that specifies a sequential position of additional element 732 in relation to the existing, prior elements of distributed ledger 564. The one or more of node systems 180, including node system 182, may also perform operations that append additional element 732 to distributed ledger 564 to generate an updated distributed ledger, e.g., distributed ledger 738.

Further, and based on a successful completion of these exemplary consensus-based processes (e.g., the calculation of an appropriate proof-of-work or proof-of-stake, as described herein) prior to other ones of node systems 180, node system 182 may broadcast distributed ledger 738, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. As described herein, the recordation of redemption object 728 within element 732 of distributed ledger 738 may result in a final and irrevocable redemption of the identified quantity of the digital assets (e.g., the fifteen units of the digital coin) and may debit of the identified quantity of the digital asset from the current balance of the digital asset held by user 101, as tracked by the elements of distributed ledger 738.

Although not illustrated in Gateway system 160 may receive distributed ledger 738, and executed distributed redemption engine 725 of gateway system 160 may store distributed ledger 738 within a portion of the one or more tangible, non-transitory memories, such as data repository 161 (e.g., to replace distributed ledger 564). Executed distributed redemption engine 725 may also perform operations that, based on the receipt of distributed ledger 738 and the recordation of redemption object 728 within element 732, generate a confirmation message 740 that confirms the redemption of the quantity of the digital asset (e.g., the fifteen units of the digital coin) and the debit of those fifteen units of the digital coin from the current balance held by user 101. In some instances, executed distributed redemption engine 725 may also package, into confirmation message 740, a portion of the redemption parameter data 622 that identifies the physical product associated with the requested redemption (e.g., the stored-value card loaded with CA $25), and may perform operations that cause gateway system 160 to transmit confirmation message 740 across network 120 via wallet system 130 and to client device 102.

Figure 7C:
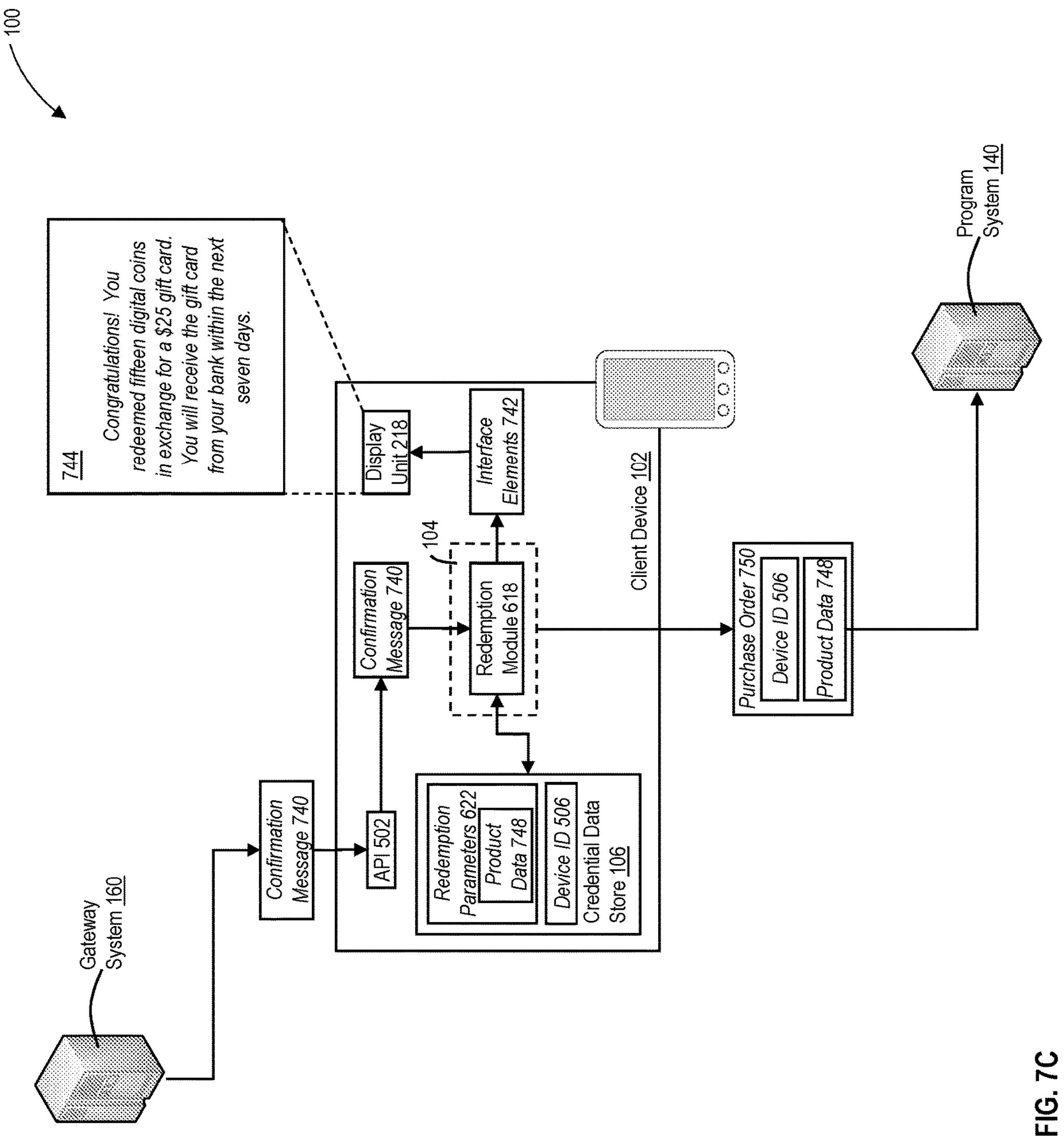

Referring to FIG. 7C, a secure, programmatic interface established and maintained by client device 102, such as API 502, may receive confirmation message 740, and may route confirmation message 740 to redemption module 618 of executed wallet application 104, which may process conformation message 740 and generate one or more interface elements 742 that, when rendered for presentation by display unit 218, collectively establish an additional display screen 744 of redemption interface 612. For example, as illustrated in FIG. 7C, display screen 744 may confirm the redemption of the identified quantity of the digital asset (e.g., the fifteen units of the digital coin) for the selected physical product, such as the physical stored-value card loaded with CA $25 (e.g., "Congratulations! You redeemed fifteen digital coins in exchange for a $25 gift card. You will receive the gift card from your bank within the next seven days.").

Additionally, and in response to the receipt of confirmation message 740, redemption module 618 may obtain redemption parameter data 622 from credential data store 132, and may extract, from redemption parameter data 622, product data 748 that identifies the physical product associated with the requested redemption (e.g., alphanumeric identifier assigned to the stored-value card loaded with CA $25 by program system 140). In some instances, redemption module 618 may package product data 748, device identifier 506, and/or application cryptogram 508 into corresponding portions of a purchase order 750, which wallet system 130 may transmit across network 120 to program system 140. For example, program system 140 may receive purchase order 750 through a secure, programmatic interface, such as an application program interface (API) associated with executed redemption engine 602, and executed redemption engine 602 may perform operations that complete the redemption of the stored-value card loaded with CA $25 and provision the selected stored-value card to user 101, e.g., via an out-of-band communications channel, such as mail or courier delivery.

Figure 8A:
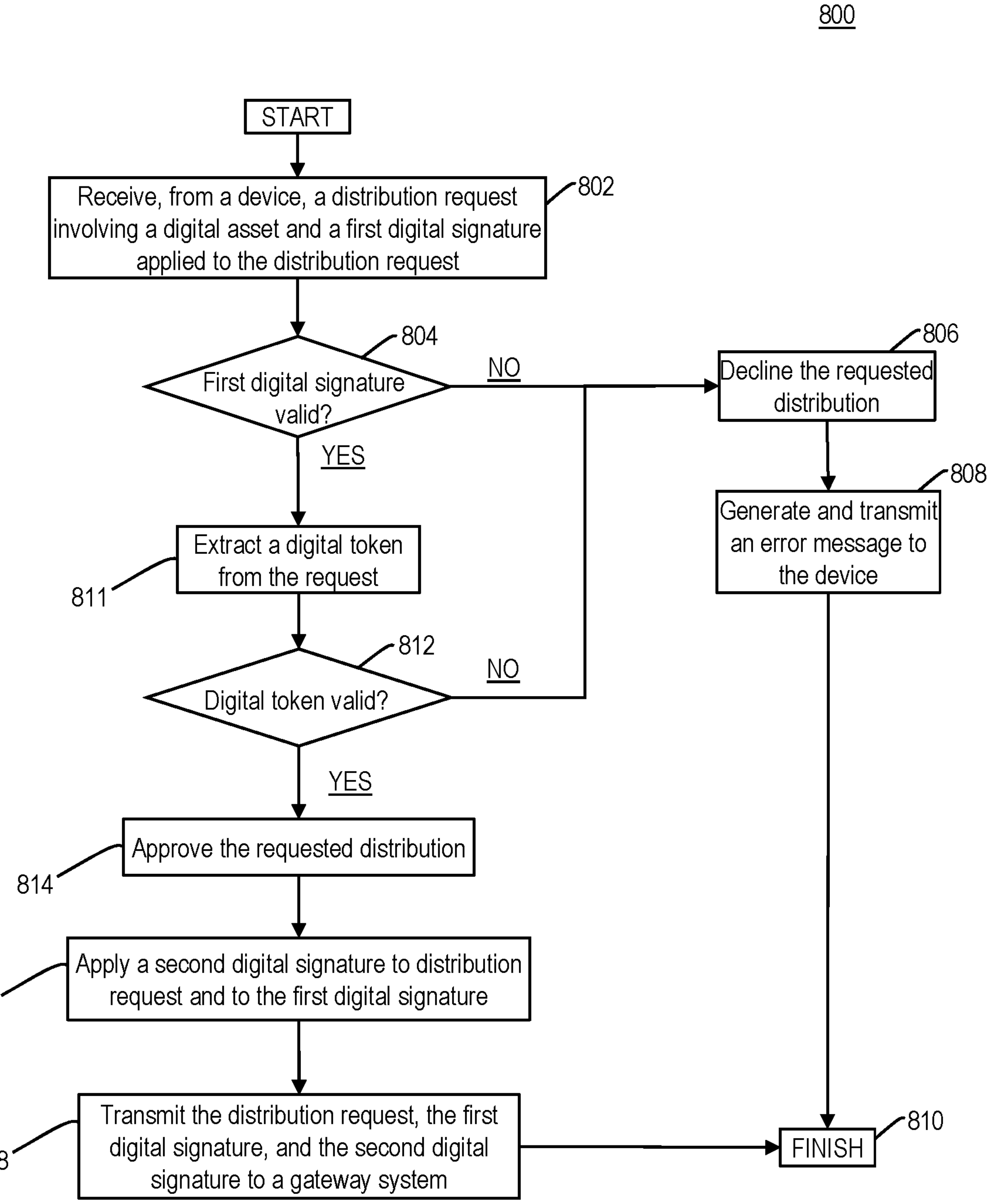
FIGS. 8A and 8B are flowcharts of exemplary processes for securely initiating and managing a distribution of digital assets within a computing environment using permissioned distributed ledgers, in accordance with some exemplary embodiments.

FIGS. 8A and 8A are flowcharts of exemplary processes for securely initiating and managing a distribution of digital assets within a computing environment using permissioned distributed ledgers, in accordance with the disclosed embodiments. In some examples, a computing system capable of provisioning and supporting wallet applications executed by computing devices within the computing environment, such as wallet system 130, may perform one or more of the exemplary steps of process 800, as described below in reference to FIG. 8A. Further, a computing system associated with permissioned, distributed-ledger network operating within the environment, such as gateway system 160, may perform one or more of the exemplary steps of process 850, as described below in reference to FIG. 8B.

Referring to FIG. 8A, wallet system 130 may receive, from a client device (e.g., client device 102 or client device 122 of FIG. 1) across network 120, a distribution request involving a digital asset and a first digital signature applied to the distribution request (e.g., in step 802). As described herein, the distribution request may be generated by a wallet application executed by the client device (e.g., executed wallet application 104 or executed wallet application 124), and the distribution request may include, among other things, a public cryptographic key that identifies the executed wallet application, a digital token generated by wallet system 130 in response to a successful authentication of an identity of a user associated with the client device (e.g., a one-time-user (OTU) token), and a code challenge generated by gateway system 160.

In some examples, described herein, the distribution request may correspond to a request for an allocation of a predetermined digital asset, or a predetermined quantity of the digital asset, to the user in response to a successfully completed referral of an additional user for membership in a loyalty program (e.g., within an ongoing referral campaign, as described herein), or in response to a successful registration of the user as a member of the loyalty program. The allocation request may, for instance, also include data confirming the successful completion of the referral and additionally, or alternatively, the successful registration of the user as the member of the loyalty program (e.g., a portion of confirmation message 362, as described herein). In other examples, also described herein, the distribution request may correspond to a request to redeem a predetermined digital asset, or a predetermined quantity of the digital asset, held by the user in exchange for a selected physical or virtual product through a redemption campaign implemented by the loyalty program. The redemption request may, for instance, also include data (e.g., redemption parameter data 622) that identifies the selected physical or virtual product (e.g., an alphanumeric identifier assigned by program system 140) and data that identifies the quantity of the digital asset subject to redemption.

Further, as also described herein, the wallet application executed by the client device may apply the first digital signature to the distribution request, e.g., using a corresponding private cryptographic key. In some instances, the application of the first digital signature to the distribution request by the executed wallet application may be indicative of an approval of and consent to the requested distribution registration (e.g., the requested allocation or the requested redemption) by the user of the client device.

In some instances, wallet system 130 may perform any of the exemplary processes described herein to validate the applied first digital signature (e.g., in step 804). If wallet system 130 were unable to verify the first digital signature, (e.g., step 804; NO), wallet system 130 may decline the requested distribution (e.g., the requested allocation or redemption) of the digital asset, or the predetermined quantity of the digital asset (e.g., in step 806). Wallet system 130 may perform any of the exemplary processes described herein to generate and transmit an error message across network 120 to the client device (e.g., in step 808). Exemplary process 800 is then complete in step 810.

Alternatively, if wallet system 130 were to verify the first digital signature (e.g., step 804; YES), wallet system 130 may parse the distribution request to extract the digital token (e.g., in step 811) and may perform any of the exemplary processes described herein to verify the extracted digital token is consistent with, and corresponds to, a locally maintained copy of the digital token provisioned to the client device (e.g., in step 812). If, for example, wallet system 130 were to detect an inconsistency between the extracted digital token and the local copy of the digital token (e.g., step 812; NO), exemplary process 800 may pass back to step 806, and wallet system 130 may decline the requested distribution of the digital asset, or of the predetermined quantity of the digital asset.

In other examples, if wallet system 130 were to establish a consistency, and a correspondence, between the extracted digital token and the locally maintained copy of the digital token (e.g., step 812; YES), wallet system 130 may approve, and consent to, the requested distribution (e.g., the requested allocation or the requested redemption) of the digital asset, or of the predetermined quantity of the digital asset (e.g., in step 814). Further, wallet system 130 may perform any of the exemplary processes described herein to apply a second digital signature to the distribution request and to the first digital signature (e.g., in step 816). As described herein, the application of the second digital signature to the distribution request and to the first digital signature may indicative of an approval of, and a consent to, the requested allocation or redemption of the digital asset, or the predetermined quantity of the digital asset, by wallet system 130.

In some instances, wallet system 130 may transmit the distribution request, the first digital signature, and the second digital signature across network 120 to a computing system associated with, and that participates in, the permissioned, distributed-ledger network described herein, such as gateway system 160 (e.g., in step 818). Exemplary process 800 is then complete in step 810.

Figure 8B:
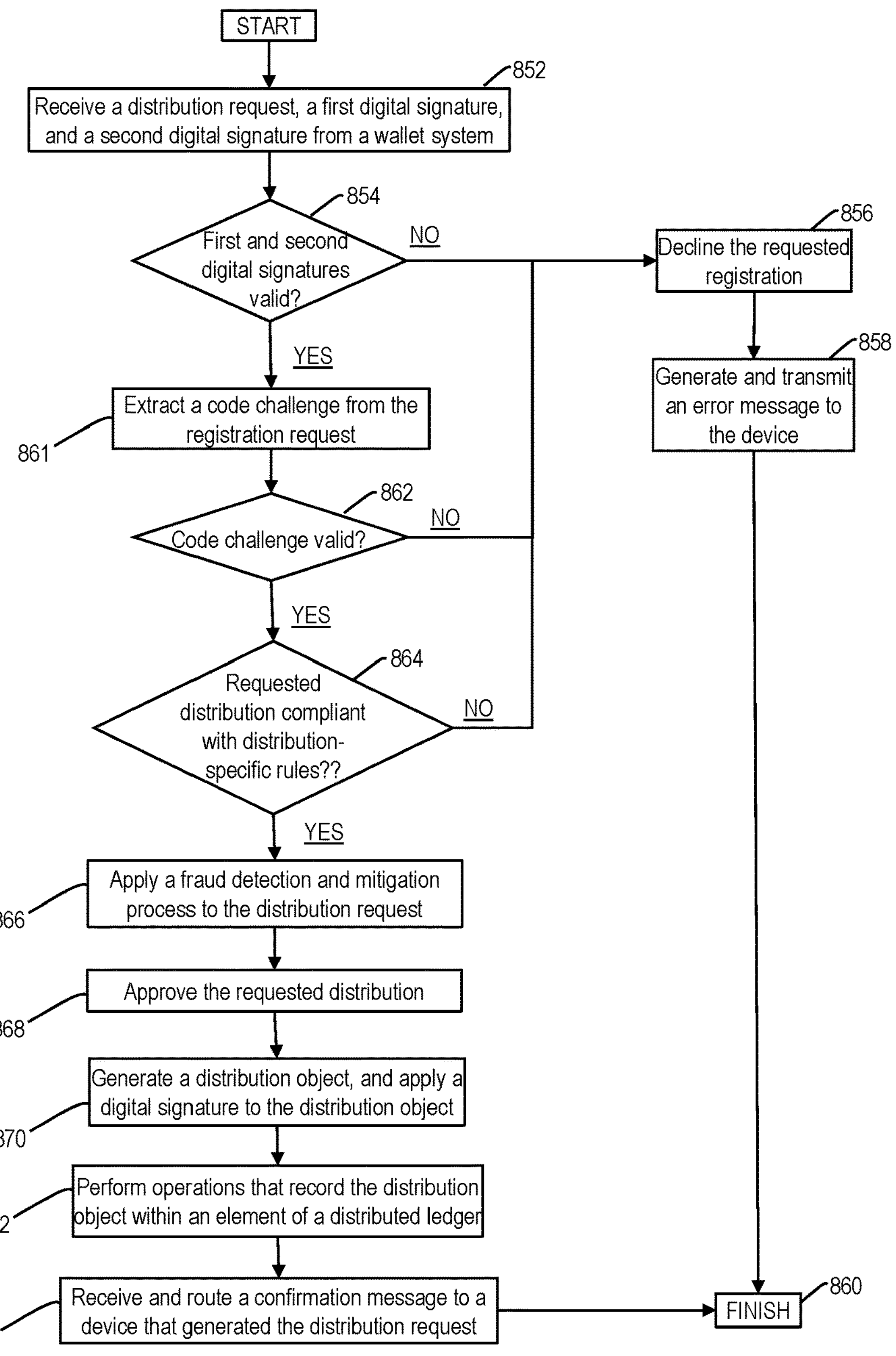

Referring to FIG. 8B, gateway system 160 may receive the distribution request, the first digital signature, and the second digital signature from wallet system 130 (e.g., in step 852). In some instances, in step 854, gateway system 160 may perform any of the exemplary processes described herein to validate the first and second digital signatures. If gateway system 160 were unable to validate the first or second digital signatures, (e.g., step 854; NO), gateway system 160 may decline the requested distribution (e.g., the requested allocation, or the requested redemption) of the digital asset, or of the predetermined quantity of that digital asset (e.g., in step 856). Gateway system 160 may perform any of the exemplary processes described herein to generate and transmit an error message to the client device via wallet system 130 (e.g., in step 858). Exemplary process 850 is then complete in step 860.

Alternatively, if gateway system 160 were to verify both the first and second digital signatures (e.g., step 854; YES), gateway system 160 may parse the distribution request to extract the code challenge (e.g., in step 861), and may perform any of the exemplary processes described herein to verify that the extracted code challenge is consistent with, and corresponds to, a locally maintained copy of the code challenge provisioned to the client device (e.g., in step 862). If, for example, gateway system 160 were to detect an inconsistency between the extracted code challenge and the local copy of the code challenge (e.g., step 862; NO), exemplary process 850 may pass back to step 856, and gateway system 160 may decline the requested distribution, as described herein.

Alternatively, if gateway system 160 were to establish a consistency, and a correspondence, between the extracted code challenge and the locally maintained copy of the code challenge (e.g., step 862; YES), gateway system 160 may perform any of the exemplary processes described herein to establish a compliance of the requested distribution with one or more distribution-specific rules that impose corresponding conditions on the requested distribution of the digital asset, or the predetermined quantity of the digital asset (e.g., in step 864). In some instances, the distribution-specific rules and the corresponding imposed conditions may be established by the loyalty program (e.g., through the implementation of the corresponding referral or redemption campaigns described herein) or by the financial institution associated with the loyalty program, and a computing system associated with the loyalty program, such as program system 140 of FIG. 1, may provision data identifying and characterizing the distribution-specific rules to gateway system 160 for storage within on the of the tangible, non-transitory memories, e.g., within campaign data store 166 or rules database 168 of data repository 161.

As described herein, the distribution request may correspond to a request to allocate of the digital asset, or a predetermined quantity of the digital asset, to the user in response to a successfully completed referral of an additional user for membership in a loyalty program established by a financial institution (e.g., as a portion of a referral campaign), or in response to a successful registration of the user of the client device as a member of the loyalty program. In some instances, in step 864, gateway system 160 may establish a compliance of the requested distribution with one or more distribution-specific rules that impose corresponding conditions on the requested distribution. Examples of these imposed conditions may include, but are not limited to, a requirement that additional referred user represent a newly registered member of the loyalty program, and as such, that the elements of the exemplary distributed ledgers described herein (e.g., one or more of distributed ledgers 190, 356, 564, or 738) record a single registration object associated with a wallet application executed at a device associated with that newly registered member.

In other examples, the conditions imposed by the one or more distribution-specific rules may require that the elements of these exemplary distributed ledgers record only a single registration object that includes profile data characterizing the newly registered member or a device operable by that newly registered member. The disclosed embodiments are, however, not limited to these exemplary distribution-specific rules, and in other examples, the distribution-specific rules may include additional or alternate rules that impose conditions on the requested allocation, or on a requested redemption of the digital asset, or the predetermined quantity of the digital asset for a selected physical or virtual product offered by the loyalty program, e.g., as specified within a corresponding redemption request.

If, for instance, gateway system 160 were to detect an inconsistency between at least one of the conditions imposed by the one or more distribution-specific rules and requested distribution of the digital asset (e.g., step 864; NO), exemplary process 850 may pass back to step 856, and gateway system 160 may decline the requested distribution, e.g., the requested allocation of the digital asset or the predetermined quantity of the digital asset, or the requested redemption of the digital asset of the predetermined quantity of the digital asset for the selected physical or virtual product, as described herein. Alternatively, if gateway system 160 were to establish a consistency between the conditions imposed by the one or more distribution-specific rules and requested distribution of the digital asset (e.g., step 864; YES), gateway system 160 may also apply one or more fraud detection and mitigation processes to the distribution request (e.g., in step 866). By way of example, the applied fraud detection and mitigation processes may include adding data identifying the distribution request to a queue of pending requests, which may delay a processing of the distribution request for predetermined or dynamically determined time period.

For example, and upon expiration of the predetermined or dynamically determined time period, gateway system 160 may establish a successful outcome of the fraud detection and mitigation processes, and approve, and consent to, the requested distribution of the digital asset, or of the predetermined quantity of that digital asset (e.g., in step 868). Gateway system 160 may also perform any of the exemplary processes described herein to generate a distribution object associated with the now-approved registration request, and to apply any additional digital signature to the registration object (e.g., in step 870). As described herein, the generated distribution object may, for example, represent an allocation object indicative of the allocation of the digital asset, or the predetermined quantity of that digital asset, to the user in response to the successful referral of the additional user for membership in the loyalty program, or in response to the successful registration of the user as a member of the loyalty program. Additionally, or alternatively, the generated distribution object may represent a redemption object that, as described herein, indicates a redemption of the digital asset, or a specified quantity of that digital asset, for a selected physical or virtual product offered through a redemption campaign of the loyalty program.

Further, gateway system 160 may also perform any of the exemplary processes described herein, in conjunction with one or more node systems operating within the computing environment, to record immutably the distribution object within an element of a cryptographically secure distributed ledger, such as within element 556 of distributed ledger 564 of FIG. 5B or within element 732 of distributed ledger 738 of FIG. 7B (e.g., in step 872). In some instances, and as described herein, gateway system 160 may receive a confirmation message indicative of the recordation of the distribution object within the element of the distributed ledger, and may route the confirmation message back to the client device via wallet system 130 (e.g., in step 874). Exemplary process 850 is then complete in step 860.

D. Secure Management and Regeneration of Cryptographic Keys within a Computing Environment Using Permissioned Distributed Ledgers Through an implementation of certain of the exemplary processes described herein, one or more computing systems operating within environment 100, such as gateway system 160 and one or more of node systems 180, may perform operations that record a registration object indicative of a successful registration of a corresponding customer of a financial institution, e.g., user 121 that operates client device 122, as a member of a loyalty program implemented by that financial institution. For example, the registration object (e.g., registration object 338 of FIG. 3B) may include a public cryptographic key of a wallet application executed at client device 122 (e.g., public cryptographic key 272 maintained within cryptographic data store 128 of client device 122) and additional elements of registration data that identify and characterize user 121, client device 122, or executed wallet application 124.

In some instances, and as described herein, public cryptographic key 272 may represent a unique cryptographic identifier of user 121, client device 102, and executed wallet application 124 during interactions associated with the loyalty program (e.g., through any of the exemplary digital-asset allocation, redemption, or transfer processes described herein) and involving other computing devices and systems within environment 100, such as wallet system 130, gateway system 160, or node systems 180. Further, and through a generation of a data object that includes public cryptographic key 272 and information characterizing each of the interactions between user 121, client device 102, and executed wallet application 124 with the loyalty program, and through a recordation of each of the generated data objects within elements of a cryptographically secure, permissioned distributed ledger, certain of the exemplary processes described herein may establish an immutable and time evolving record of these interactions, which may be queried using public cryptographic key 272.

As described herein, executable wallet application 124 (e.g., executed at client device 122) may generate public cryptographic key 272 and corresponding private cryptographic key 274 in response to a successful outcome of an authentication process involving wallet system 130, and may store public cryptographic key 272 and corresponding private cryptographic key 274 within a secure portion of the one or more tangible, non-transitory memories of client device 122, e.g., within credential data store 126. In some examples, an occurrence of one or more events, e.g., a "regeneration" event, may trigger a performance, by executed wallet application 124, of operations that regenerate public cryptographic key 272 and corresponding private cryptographic key 274 and further, that requests recordation onto the permissioned distributed ledger of an updated registration object that not only specifies the updated cryptographic identifier of user 121, client device 102, and executed wallet application 124 (e.g., the regenerated public cryptographic key), but also additional data that characterizes each of the previously generated public cryptographic keys that identifying user 121, client device 102, and executed wallet application 124 within the permissioned distributed ledger (e.g., pointers to additional elements of the distributed ledger that record these previously generated public cryptographic keys). The immutable recordation of the regenerated public cryptographic key, in conjunction with the additional data specifying the previously generated public cryptographic keys, may establish a temporal evolution in the unique cryptographic identifiers of user 121, client device 102, and executed wallet application 124 and as such, may establish a "lineage" of these public cryptographic keys within the loyalty program.

Figure 9A:
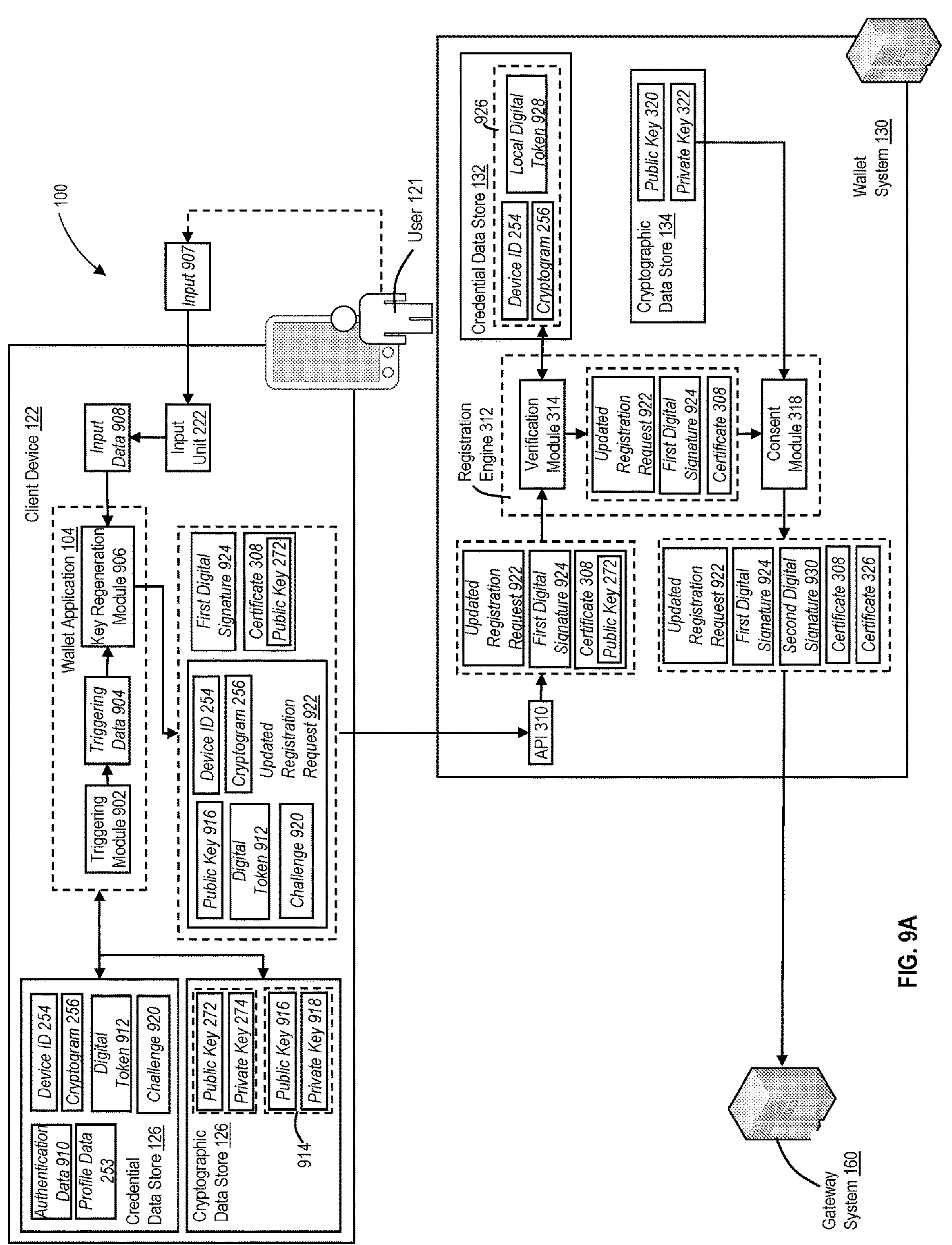
FIGS. 9A and 9B are block diagrams illustrating portions of an exemplary computing environment, in accordance with some exemplary embodiments.

Referring to FIG. 9A, executed wallet application 124 of client device 122 may access an asymmetric cryptographic key pair, e.g., public cryptographic key 272 and private cryptographic key 274, maintained within a secure portion of the one or more tangible, non-transitory memories of client device 122, such as cryptographic data store 128. For example, executed wallet application 124 may generate public cryptographic key 272 and private cryptographic key 274 in accordance with any of the exemplary processes described herein, e.g., in response to a successful authentication of an identity of user 121 in conjunction with wallet system 130. Further, in some examples, a triggering module 902 of executed wallet application 124 may perform operations that detect an occurrence of an event, e.g., a "regeneration" event, that triggers a regeneration of public cryptographic key 272 and private cryptographic key 274 and that initiates a registration of the regenerated public key within the loyalty program and a recordation an updated registration block that includes the regenerated public key within one or more elements of the exemplary, cryptographically secure and permissioned distributed ledgers described herein.

For example, each of public cryptographic key 272 and private cryptographic key 274 may be associated with a corresponding temporal period of validity, and upon detection of an expiration of the corresponding temporal validity period, triggering module 902 may establish the occurrence of the regeneration event. In some instances, and based on the established occurrence of the regeneration event, triggering module 902 may generate and provide triggering data 904 to a key regeneration module 906 of executed wallet application 124, which may perform any of the exemplary processes described herein to regenerate public cryptographic key 272 and private cryptographic key 274, e.g., based on a successful outcome of an authentication process involving wallet system 130.

The disclosed embodiments are, however, not limited to regeneration events associated with the temporal validity of public cryptographic key 272 and private cryptographic key 274, and in other examples, regeneration events consistent with the disclosed embodiments may include, but are not limited to, an establishment by executed wallet application 124 of an additional instance of an mobile wallet at client device 102, or a request, by executed wallet application 124, to record a registration object associated with that additional instance of the mobile wallet onto the exemplary, cryptographically secure and permissioned distributed ledgers described herein (e.g., permissioned distributed ledger 738 of FIG. 7B). Examples of these regeneration events may also include, but are not limited to, a deletion and reinstallation of executed wallet application 124 at client device 102, or a migration of user 121, and executed wallet application 124, to another network-connected computing device or system. Further, in some instances, regeneration events consistent with the disclosed embodiments may also be associated with, and correspond to, instances of fraudulent activity involving client device 102, wallet system 130, or gateway system 160, such as, but not limited to, an attempted or a successful breach, or an unintentional release of confidential data.

Referring back to FIG. 9A, key regeneration module 906 may receive triggering data 904, which confirms the detected occurrence of the regeneration event associated with public cryptographic key, and may perform any of the exemplary processes described herein to obtain, from user 121, one or more authentication credentials associated with user 101 and executed wallet application 124 or wallet system 130. Examples of these authentication credentials include, but are not limited to, an alphanumeric login credential, an alphanumeric password, or a biometric credential, such as a facial image or a thumbprint image, and in some instances (not illustrated in FIG. 9A), key regeneration module 906 may perform operations that cause client device 122 to present, via display unit 240, one or more interface elements that establish an authentication interface prompting user 101 to provide the one or more authentication credentials.

By way of example, input unit 244 may receive input 907 from user 121 that specifies the one or more authentication credentials, and may route input data 908 representative of the received input to key regeneration module 906 of executed wallet application 124. Key regeneration module 906 may parse input data 908 and extract authentication data 910, which corresponds to the provisioned authentication credentials, and may also perform operations that store authentication data 910 within credential data store 126, e.g., as a replacement to authentication data 252 within a portion credential data store 126 that includes customer profile data 253, device identifier 254, and application cryptogram 256.

Further, key regeneration module 906 of executed wallet application 124 may also perform any of the exemplary authentication processes described herein to request, and obtain, a digital token 912 from wallet system 130, e.g., in response to a successful authentication process between executed wallet application 124 and one or more application programs, engines, or modules executed by the one or more processors of wallet system 130. Executed wallet application 124 may also perform operations that store digital token 912 within a portion of the one or more tangible, non-transitory memories of client device 102, e.g., within a portion of credential data store 126 associated with authentication data 910, customer profile data 253, device identifier 254, and application cryptogram 256. For example, digital token 912 may correspond to a one-time-use (OTU) token valid to authenticate the identity of user 101 during a single registration, key-regeneration, or digital-asset-allocation, -redemption, or -transfer process, and may be characterized by a predetermined composition, length, or format. The disclosed embodiments are, however, not limited to OTU tokens, and in other examples, digital token 912 may be valid to authenticate an identity of user 101 during a predetermined temporal period, or for processes initiated within a predetermined geographic region.

Based on the successful authentication of the identity of user 121 by wallet system 130, and on the receipt of digital token 912, key regeneration module 906 of executed wallet application 124 may perform operations that regenerate the public cryptographic key 272 and corresponding private cryptographic key 274 of executed wallet application 124, and that store the regenerated public and private cryptographic keys within an additional portion of credential data store 126. For example, and as illustrated in FIG. 9A, key generation module 906 may generate an asymmetric cryptographic key pair 914, including public cryptographic key 916 and private cryptographic key 918, for executed wallet application 104 using one or more of the appropriate key generation algorithms described herein, and may store each of regenerated public and private cryptographic keys 916 and 918 within the additional portion of credential data store 126, e.g., in additional to existing public and private cryptographic keys 272 and 274.

Further, key regeneration module 906 of executable wallet application 104 may also perform any of the exemplary processes described herein to request and receive a code challenge 920 from gateway system 160, which key regeneration module 906 may store within a portion of credential data store 106 associated with authentication data 910, device identifier 254, application cryptogram 256, and digital token 912. In some instances, code challenge 920 may be generated by gateway system 160 using any of the exemplary processes described herein, and may correspond to a hash value representative of all or a selected portion of device identifier 254 and/or application cryptogram 256, or may correspond to a hash value representative of a plaintext cipher maintained confidentially by gateway system 160.

In some examples, key regeneration module 906 of executed wallet application 124 may access credential data store 126, and obtain digital token 912 (e.g., the OTU token described herein), code challenge 920 (e.g., as received from gateway system 160), device identifier 254 of client device 122, and an identifier of executed wallet application 124, such as application cryptogram 256. Additionally, key regeneration module 906 may obtain public cryptographic key 916 from cryptographic data store 128, and may perform operations that package public cryptographic key 916, digital token 912, code challenge 920, device identifier 254, and application cryptogram 256 into corresponding portions of an updated registration request 922. In some instances, not illustrated in FIG. 9A, key generation module 906 may also apply a digital signature to code challenge 920 prior to packaging code challenge 920 into a corresponding portion of updated registration request 922.

Further, key regeneration module 906 of executed wallet application 124 may also perform operations that apply a first digital signature 924 to updated registration request 922. In some instances, key generation module 906 may apply first digital signature 924 using existing private cryptographic key 274 of executed wallet application 124 (e.g., as maintained securely within cryptographic data store 128), and executed wallet application 124 may perform operations that cause client device 122 to transmit updated registration request 922, first digital signature 924, and in some instances, existing public key certificate 308 of client device 122 (which includes existing public cryptographic key 272) across network 120 to wallet system 130.

In other instances, and resulting from a particular one of the regeneration events detected by triggering module 902, existing public and private cryptographic keys 272 and 274 of executed wallet application 124 may be unavailable to key regeneration module 906 (e.g., due to a migration of user 101 from client device 122 to an additional computing device) or may be compromised due to a detected breach or instance of other fraudulent activity. Due to the unavailability, or the comprised nature, of existing private cryptographic key 274, key regeneration module 906 may perform additional operations that apply first digital signature 924 to updated registration request 922 based not on existing private cryptographic key 274, but instead based on public cryptographic key 918 (not illustrated in FIG. 9A), and that cause client device 122 to transmit updated registration request 922, first digital signature 924, and a regenerated public key certificate (that includes public cryptographic key 916) across network 120 to wallet system 130 (also not illustrated in FIG. 9A).

As described herein, the application of first digital signature 924 to updated registration request 922 may be indicative of user 121's approval of, and consent to, the requested registration of public cryptographic key 916 within the loyalty program, the request recordation of public cryptographic key 916 within an element of the permissioned distributed ledger described herein, and as such, a requested establishment of public cryptographic key 916 as an updated cryptographic identifier of user 121, client device 102, and executed wallet application 124 within the permissioned distributed ledger. Further, certain of the exemplary process described herein, which couple the application of first digital signature 924 to registration request 922 to a level or type of consent granted by user 121 to wallet system 130 and/or gateway system 160 to access and manipulate confidential data, may be implemented in addition to, or as an alternate to, existing token-based authorization and consent protocols (e.g., an OAuth protocol, etc.) during the registration processes implemented collectively by client device 122, wallet system 130, and gateway system 160.

As illustrated in FIG. 9A, a secure, programmatic interface established and maintained by wallet system 130, such as API 310, may receive updated registration request 922, first digital signature 924, and in some instances, public key certificate 308 (or alternatively, the regenerated public key certificate that includes public cryptographic key 916), and may perform any of the exemplary processes described herein to programmatically trigger an execution of registration engine 312 by the one or more processors of wallet system 130. For example, verification module 314 of executed registration engine 312 may receive updated registration request 922 (e.g., that includes public cryptographic key 916, digital token 912, code challenge 920, device identifier 254, and application cryptogram 256), first digital signature 924, and public key certificate 308 (or alternatively, the regenerated public key certificate that includes public cryptographic key 916) from API 310.

In some instances, verification module 314 may parse public key certificate 308 and obtain an existing public cryptographic key associated client device 122 (e.g., existing public cryptographic key 272 of executed wallet application 124), and perform operations that verify first digital signature 924 based on existing public cryptographic key 272. In other instances, and due to the unavailability or the compromised nature of existing public cryptographic key 272, verification module 314 may parse the regenerated public key certificate of client device 122 (not illustrated in FIG. 9A) to obtain a public cryptographic key 916, and perform operations that verify first digital signature 924 based on public cryptographic key 916.

If, for example, verification module 314 were unable to verify first digital signature 924, verification module 314 may establish that updated registration request 922 was either corrupted during transmission of altered one or more third parties without permission, and executed registration engine 312 may decline to approve the requested registration and recordation of public cryptographic key 916. In some instances (not illustrated in FIG. 9A), executed registration engine 312 may generate and transmit an error message across network 120 to client device 122, e.g., for presentation within a corresponding digital interface.

Alternatively, if verification module 314 were to verify first digital signature 924, verification module 314 may perform operations that obtain, from updated registration request 922, digital token 912, device identifier 254, and application cryptogram 256. In some instances, verification module 314 may access credential data store 132, and may identify one or more data records 926 that include or reference device identifier 254 or application cryptogram 256, and as such, as associated with client device 122 or executed wallet application 124. As illustrated in FIG. 9A, verification module 314 may obtain, from the data records 926, a local digital token 928, which is indicative of a currently valid authentication of the identity of user 121, and perform operations that determine whether digital token 912 (e.g., as received from client device 122) is consistent with, and corresponds to, local digital token 928. If, for example, verification module 314 were to detect an inconsistency between digital token 912 and local digital token 928, executed registration engine 312 may decline to further process updated registration request 922 and may generate and transmit an error message across network 120 to client device 122, e.g., for presentation within the corresponding digital interface.

Alternatively, based on the verification of first digital signature 924, and based on the determined consistency between digital token 912 and local digital token 928, verification module 314 may elect to approve updated registration request 922 for further processing, and may provide updated registration request 922, first digital signature 924, and in some instances, public key certificate 308 (or alternatively, the regenerated public key certificate that includes public cryptographic key 916) and as input to consent module 318 of executed registration engine 312. Further, as illustrated in FIG. 9A, verification module 314 may also perform operations that store all or a selected portion of updated registration request 922 within a portion of credential data store 132, e.g., within, or in association with, the one or more data records 926.

Consent module 318 may receive updated registration request 922, first digital signature 924, and public key certificate 308 (or alternatively, the regenerated public key certificate that includes public cryptographic key 916), and may obtain a public cryptographic key 320 and a corresponding private cryptographic key 322 of wallet system 130 from cryptographic data store 134. Public and private cryptographic keys 320 and 322 may establish an asymmetric key pair or wallet system 130, which may be generated using one or more of the key generation algorithms described herein, and public cryptographic key 320 may be distributed to one or more additional or alternate computing systems and devices operating within environment 100, such as, but not limited to, program system 140 or gateway system 160.

In some instances, consent module 318 may perform operations that apply a second digital signature 930 to registration request 922 (e.g., that includes public cryptographic key 916, digital token 912, code challenge 920, device identifier 254, and application cryptogram 256) and to first digital signature 924. As described herein, the application of second digital signature 930 to updated registration request 922 and to first digital signature 306 may indicative of an approval of, and a consent to, the requested registration of public cryptographic key 916 within the loyalty program, and the requested recordation of public cryptographic key 916 onto an element of the permissioned distributed ledger, by executed registration engine 312 and as such, by wallet system 130. Executed registration engine 312 may perform operations that cause wallet system 130 to transmit updated registration request 922, first digital signature 924, second digital signature 930, public key certificate 308 of client device 122 (e.g., that includes existing public cryptographic key 272) and a public key certificate 326 (e.g., that includes public cryptographic key 320) across network 120 to gateway system 160. In other examples, and due to an unavailability or a compromised nature of existing public cryptographic key 272, wallet system 130 may also transmit the regenerated public key certificate, which includes public cryptographic key 916, in place of public key certificate 308.

Figure 9B:
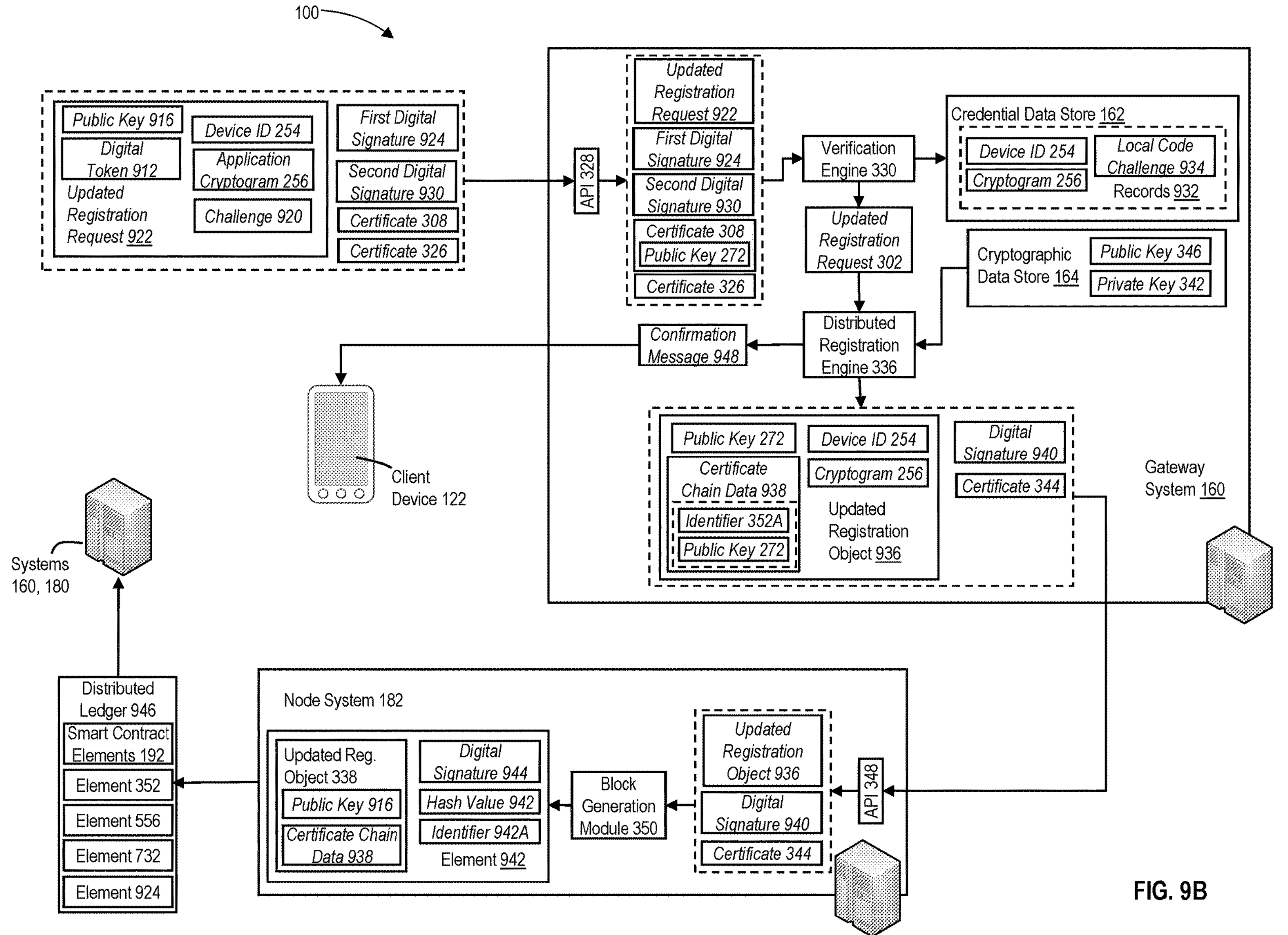

Referring to FIG. 9B, a programmatic interface establish and maintained by gateway system 160, such as API 328, may receive updated registration request 922, first digital signature 924, second digital signature 930, public key certificate 308 (or alternatively, the regenerated public key certificate that includes public cryptographic key 916), and public key certificate 326, and may perform operations that trigger an execution of verification engine 330 by the one or more processors of gateway system 160 (e.g., based on one or more programmatically generated commands). In some instances, executed verification engine 330 may parse public key certificate 326 to extract public cryptographic key 320 of wallet system 130, and may perform operations that validate second digital signature 930 (e.g., as applied to updated registration request 922 and first digital signature 924) using public cryptographic key 320.

Further, executed verification engine 330 may also parse public key certificate 308 to extract existing public cryptographic key 272 of executed wallet application 124, and may perform operations that validate first digital signature 924 (e.g., as applied to updated registration request 922) using existing public cryptographic key 272. In other instances, and due to the unavailability or the compromised nature of existing public cryptographic key 272, executed verification engine 330 may alternatively parse the regenerated public key certificate of client device 122 (not illustrated in FIG. 9B) to obtain a public cryptographic key 916, and perform operations that verify first digital signature 924 based on public cryptographic key 916.

If, for example, executed verification engine 330 were unable to verify first digital signature 924, and additionally, or alternatively, second digital signature 930, executed verification engine 330 may decline the requested registration of public cryptographic key 916 and recordation of public cryptographic key 916 within an element of the permissioned distributed ledger, and may discard updated registration request 922. In some instances (not illustrated in FIG. 9B), executed verification engine 330 may generate and transmit an error message across network 120 to client device 122 via wallet system 130, e.g., for presentation within the corresponding digital interface.

Alternatively, if executed verification engine 330 were to verify first digital signature 924 and second digital signature 930, executed verification engine 330 may perform operations that obtain, from updated registration request 922, code challenge 920, device identifier 254, and application cryptogram 256. In some examples, executed verification engine 330 may access credential data store 162, and identify one or more data records 932 that include or reference device identifier 254 or application cryptogram 256, and as such, as associated with client device 122 or executed wallet application 124. As illustrated in FIG. 9B, executed verification engine 330 may obtain, from the one or more of data records 932, a local code challenge 934 (e.g., generated using any of the exemplary processes described herein), and perform operations that determine whether code challenge 920 (e.g., as received from client device 122) is consistent with, and corresponds to, local code challenge 934.

As described herein, code challenge 920 may also be associated with an additional digital signature applied to code challenge 920 by executed wallet application 124 using existing private cryptographic key 274 and additionally, or alternatively, using public cryptographic key 918. In some instances, not illustrated in FIG. 9B, executed verification engine 330 may perform any of the exemplary processes described herein to validate the additional digital signature applied to code challenge 920 prior to determining the consistency and correspondence between code challenge 920 and local code challenge 934.

If, for example, executed verification engine 330 were to detect an inconsistency between code challenge 920 and local code challenge 394 (and in some instances, were unable to validate the additional digital signature applied to code challenge 920), executed verification engine 330 may decline the requested registration of public cryptographic key 916 and recordation of public cryptographic key 916 within an element of the exemplary permissioned distributed ledgers described herein, and may discard updated registration request 922. In some instances (not illustrated in FIG. 9B), executed verification engine 330 may perform any of the exemplary processes described herein to generate and transmit a corresponding error message across network 120 to client device 122 via wallet system 130, e.g., for presentation within the corresponding digital interface. Alternatively, based on the validation of first digital signature 924 and second digital signature 930 (and in some instances, the validation of the additional digital signature applied to code challenge 920), and based on the determined consistency between code challenge 920 and local code challenge 934, executed verification engine 330 may approve the requested registration of public cryptographic key 916, e.g., based on the prior approval of, and consent to, the requested registration by user 121 and wallet system 130, as indicated by respective ones of now-validated first digital signature 924 and now-validated second digital signature 930.

As illustrated in FIG. 9B, executed verification engine 330 may provide updated registration request 922 as an input to distributed registration engine 336, which may be executed by the one or more processors of gateway system 160. In some examples, executed distributed registration engine 336 may perform operations that parse updated recordation request 922 to extract public cryptographic key 916, device identifier 254, and application cryptogram 256. Further, executed distributed registration engine 336 may perform operations that package public cryptographic key 916, and in some instances, one or more of device identifier 254 and application cryptogram 256, into corresponding portions of an updated registration object 936, which may be associated with user 121 and executed wallet application 124. Further, executed distributed registration engine 336 may also generate one or more elements of certificate chain data 938, which identifies one or more public cryptographic keys that previously identified user 121, client device 122, and executed wallet application 124 within the elements of the exemplary permissioned distributed ledgers described herein, and that packages certificate chain data 938 into a corresponding portion of updated registration object 936.

For example, although not illustrated in FIG. 9B, executed distributed registration engine 336 may receive public key certificate 308 of client device 122 in conjunction with updated registration request 922, and may parse public key certificate 308 to extract existing public cryptographic key 272, which currently identifies user 121, client device 122, and executed wallet application 124 within the elements of the exemplary permissioned distributed ledger described herein. In some instances, executed distributed registration engine 336 may access a locally maintained version of the permissioned distributed ledger, e.g., distributed ledger 738 maintained within data repository 161, and may parse the elements of distributed ledger 738 to identify a corresponding one of the elements that records a registration object that includes existing public cryptographic key 272, e.g., element 352 that records registration object 338. As illustrated in FIG. 9B, executed distributed registration engine 336 may obtain, from element 352, an element identifier 352A (e.g., a block number) that specifies a sequential position of element 352 in relation to the other elements of distributed ledger 738, and package element identifier 352A and existing public cryptographic key 272 within a corresponding portion of certificate chain data 938.

In further examples, not illustrated in FIG. 9B, executed distributed registration engine 336 may further parse the elements of distributed ledger 738 to identify additional ones of the elements that record a corresponding registration object that includes device identifier 254 or application cryptogram 256, e.g., as portions of corresponding elements of registration data. For instance, the registration objects recorded within these additional elements may include public cryptographic keys that identified user 121, client device 122, and executed wallet application 124 prior to existing public cryptographic key 272, e.g., that were replaced by existing public cryptographic key 272 through the exemplary key regeneration processes described herein. For each of the additional identified elements of distributed ledger 738, executed distributed registration engine 336 may extract the prior public cryptographic key from the corresponding registration object, and may obtain an additional positional identifier (e.g., a block number) that specifies a sequential position of the corresponding element within distributed ledger 738. Executed distributed registration engine 336 may perform operations that package each of the extracted public cryptographic keys and the corresponding positional identifier within corresponding portions of certificate chain data 938 (not illustrated in FIG. 9B).

Executed distributed registration engine 336 may perform operations that apply a digital signature 940 to updated registration object 936 (e.g., that includes public cryptographic key 916, certificate chain data 938, device identifier 254, and application cryptogram 256) using private cryptographic key 342 of gateway system 160, e.g., as maintained within cryptographic data store 164. In some instances, executed distributed registration engine 336 may perform additional operations that cause gateway system 160 to broadcast updated registration object 936, digital signature 940, and public key certificate 344 of gateway system 160 (that includes a public cryptographic key 346 of gateway system 160) across network 120 to one or more of node systems 180, such as node system 182

In some examples, each of the one or more of node systems 180, including node system 182, may perform any of the exemplary, consensus-based operations described herein to: (i) verify digital signature 940 using public cryptographic key 346 (e.g., as obtained from public key certificate 344); and (ii) generate an additional element 942 of distributed ledger 738 that includes, among other things, updated registration object 936 (e.g., public cryptographic key 916, certificate chain data 938, device identifier 254, and application cryptogram 256), a digital signature 944 applied to updated registration object 936 (e.g., using a private cryptographic key of corresponding ones of node systems 180, including node system 182), a hash value 945 representative of updated registration object 936 and digital signature 944 (and in some instances, to other elements of distributed ledger 738), and an identifier 942A (e.g., a "block number") that specifies a sequential position of element 942 in relation to the existing, prior elements of distributed ledger 738. The one or more of node systems 180, including node system 182, may also perform operations that append element 942 to distributed ledger 738, and generate an updated distributed ledger, e.g., distributed ledger 946.

Further, and based on a successful completion of these exemplary consensus-based processes (e.g., the calculation of an appropriate proof-of-work or proof-of-stake, as described herein) prior to other ones of node systems 180, node system 182 may broadcast distributed ledger 946, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. As described herein, the recordation of updated registration object 936 within element 942 of distributed ledger 946 may confirm the establishment of public cryptographic key 916 as an updated cryptographic identifier of user 121, client device 102, and executed wallet application 124 within the elements of cryptographically secure, permissioned distributed ledger 946, and throughout interactions between executed wallet application 124 of client device 122 and the one or more application programs or program modules executed by wallet system 130 and gateway system 160.

Although not illustrated in FIG. 9B, gateway system 160 may receive distributed ledger 946, and executed distributed registration engine 336 of gateway system 160 may store distributed ledger 946 within a portion of the one or more tangible, non-transitory memories, such as data repository 161 (e.g., to replace distributed ledger 738). Executed distributed registration engine 336 may also perform operations that, based on the receipt of distributed ledger 946 and the recordation of updated registration object 936 within element 942, generate a confirmation message 948 that confirms the establishment of public cryptographic key 916 as an updated cryptographic identifier of user 121, client device 102, and executed wallet application 124 within the elements of distributed ledger 946, and may perform operations that cause gateway system 160 to transmit confirmation message 948 across network 120 to client device 122, e.g., via wallet system 130.

In some examples, not illustrated in FIG. 9B, client device 122 may receive confirmation message 948 through a secure, programmatic interface, such as an application programming interface (API). In response to the receipt of confirmation message 948, key regeneration module 906 of executed wallet application 124 may perform operations that invalidate existing public and private cryptographic keys 272 and 274, as maintained within cryptographic data store 128, in favor of regenerated public and private cryptographic keys 916 and 918 (e.g., by generating and storing an invalidation flag in conjunction with each of existing public and private cryptographic keys 272 and 274 within cryptographic data store 128, by deleting existing public and private cryptographic keys 272 and 274 from cryptographic data store 128, or by overwriting existing public and private cryptographic keys 272 and 274 with regenerated public and private cryptographic keys 916 and 918).

Upon invalidation of existing public and private cryptographic keys 272 and 274 by key regeneration module 906, future interactions and exchanges of data between executed wallet application 124 and other application programs or program modules executed by wallet system 130 or gateway system 160, e.g., regarding an allocation, redemption, or transfer of digital assets, may reference or include public cryptographic key 916, and may be digitally signed using public cryptographic key 918. Further, although not illustrated in FIG. 9B, key regeneration module 906 may perform further operations that broadcast public cryptographic key 916 across network 120 to one or more computing systems operating within environment 100, such as wallet system 130 and gateway system 160, for storage within corresponding local cryptographic stores, e.g., respective ones of cryptographic data stores 134 and 164.

Figure 10A:
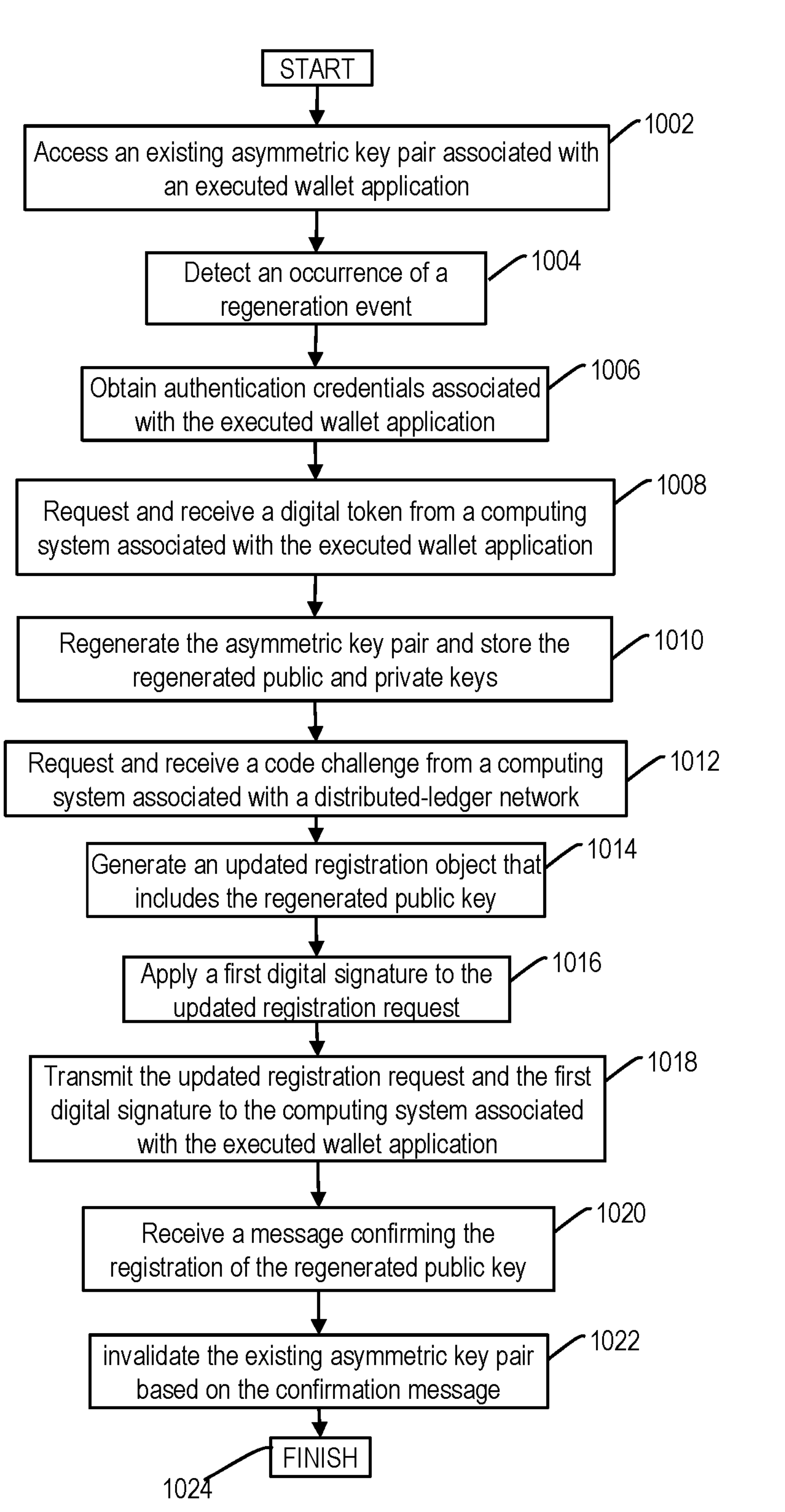
FIGS. 10A-10C are flowcharts of exemplary processes for securely managing and regenerating cryptographic keys within a computing environment using permissioned distributed ledgers, in accordance with some exemplary embodiments.
Figure 10B:
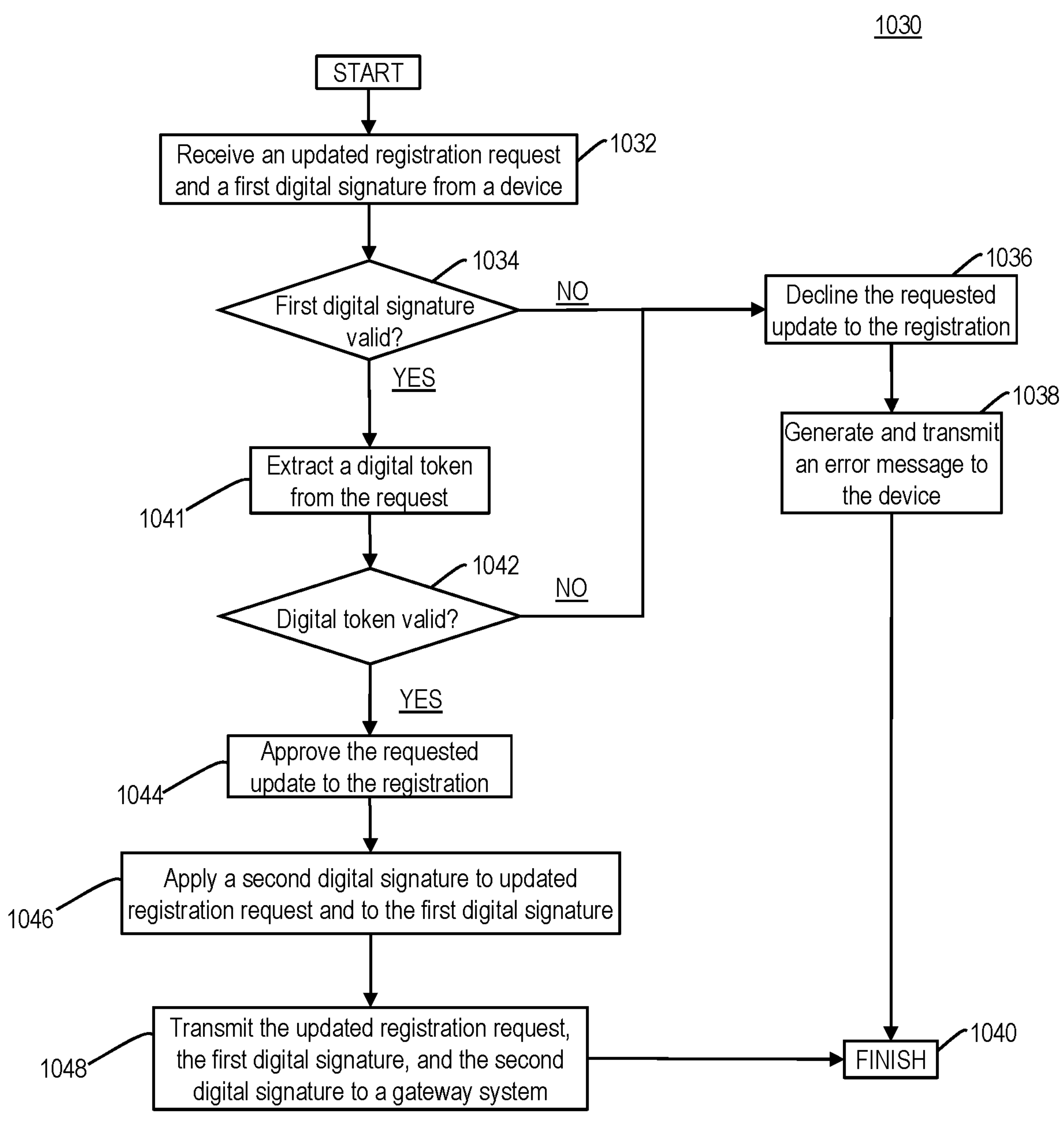
Figure 10C:
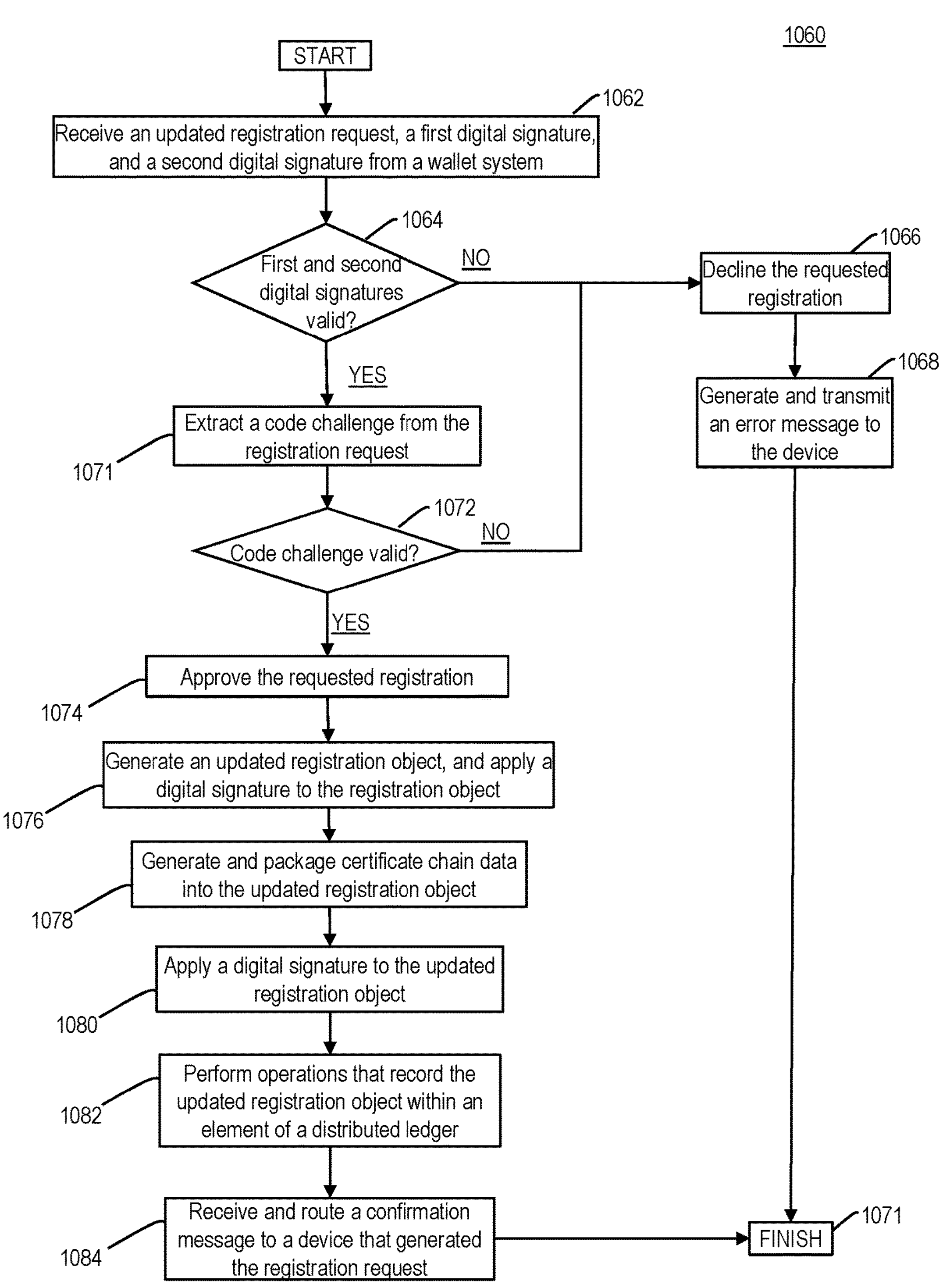

FIGS. 10A, 10B, and 10C are flowcharts of exemplary processes for securely managing and regenerating cryptographic keys within a computing environment using permissioned distributed ledgers, in accordance with the disclosed embodiments. In some examples, a client device that executes a wallet application, such as client device 102 that executes wallet application 104 or client device 122 that executes wallet application 124, may perform one or more of the exemplary steps of process 1000, as described below in reference to FIG. 10A. Further, a computing system capable of provisioning and supporting the wallet applications executed by computing devices within the computing environment, such as wallet system 130, may perform one or more of the exemplary steps of process 1030, as described below in reference to FIG. 10B. Further, a computing system associated with permissioned, distributed-ledger network operating within the environment, such as gateway system 160, may perform one or more of the exemplary steps of process 1060, as described below in reference to FIG. 10C.

Referring to FIG. 10A, client device 102 or client device 122 may access an existing asymmetric cryptographic key pair associated with an executed wallet application, including an existing public cryptographic key and an existing private cryptographic key, maintained within a secure portion of one or more tangible, non-transitory memories (e.g., in step 1002). In some examples, client device 102 or client device 122 may perform any of the exemplary processes described herein to detect an occurrence of one or more events, e.g., a “regeneration” event, that trigger a regeneration of existing asymmetric cryptographic key pair, including the existing public and private cryptographic keys (e.g., in step 1004).

For example, each of the existing public and private cryptographic keys may be associated with a corresponding temporal period of validity, and upon expiration of the corresponding temporal validity period, client device 102 may detect an occurrence of a corresponding one of the regeneration events, e.g., in step 1004. The disclosed embodiments are, however, not limited to regeneration events associated with the temporal validity of the existing public and private cryptographic keys, and in other examples, regeneration events consistent with the disclosed embodiments may include, but are not limited to, an establishment by the executed wallet application of an additional instance of a mobile wallet at client device 102 or client device 122, or a request, by the executed wallet application, to record a registration object associated with that additional instance of the mobile wallet onto the exemplary, cryptographically secure and permissioned distributed ledgers described herein. Examples of these registration events may also include, but are not limited to, a deletion and reinstallation of the executed wallet application at client device 102 or client device 122, or a migration of a user, and the executed wallet application, to another network-connected computing device or system. Further, in some instances, regeneration events consistent with the disclosed embodiments may also be associated with, and correspond to, instances of fraudulent activity, such as, but not limited to, an attempted or a successful breach, or an unintentional release of confidential data associated with client device 102 or client device 122, the user of client device 102 or client device 122, or the executed wallet application.

In response to the detection of the one or more regeneration events (e.g., in step 1004), client device 102 or client device 122 may perform any of the exemplary processes described herein to obtain authentication data that specifies one or more authentication credentials associated with the user of client device 102 or client device 122 and a computing system within environment 100 that supports the executed wallet application, such as wallet system 130 of FIG. 1 (e.g., in step 1006). Examples of these authentication credentials include, but are not limited to, an alphanumeric login credential, an alphanumeric password, or a biometric credential, such as a facial image or a thumbprint image.

Client device 102 or client device 122 may also perform any of the exemplary processes described herein to request, and receive, a digital token from the computing system within environment 100 that supports executed wallet application 104 and 124, such as wallet system 130 of FIG. 1 (e.g., in step 1008). In some instances, wallet system 130 may generate the digital token in response to a successful authentication of an identity of the user of client device 102, e.g., based on the obtain authentication data. As described herein, the digital token may correspond to a one-time-use (OTU) token valid to authenticate the identity of user 101 during a single registration, key-regeneration, or digital-asset-allocation, -redemption, or -transfer process, and may be characterized by a predetermined composition, length, or format.

Based on the receipt of the digital token, client device 102 or client device 122 may perform any of the exemplary processes described herein to regenerate the existing public and private cryptographic keys, and to store the regenerated public and private cryptographic keys within the secure portion of one or more tangible, non-transitory memories (e.g., in step 1010). Further, client device 102 or client device 122 may also perform any of the exemplary processes described herein to request and receive a code challenge from the computing system associated with permissioned, distributed-ledger network operating within the environment, such as gateway system 160 (e.g., in step 1012).

In some instances, client device 102 or client device 122 may perform any of the exemplary processes described herein to generate an updated registration request that includes the regenerated public cryptographic key, the obtained digital token, the received code challenge, and one or more elements of registration data (e.g., in step 1014). The elements of the registration data may, for example, include a unique device identifier of a respective one of client devices 102 or 122 (e.g., a network address, such as an IP address or a MAC address) and a unique identifier of the executed mobile wallet application, such as an application cryptogram. Further, client device 102 or client device 122 may perform operations that apply a first digital signature to the updated registration request using the existing public cryptographic key associated with the executed wallet application (e.g., in step 1016). In some instances, the application of the first digital signature to the updated registration request may be indicative of an approval of, and a consent to, the requested registration of the regenerated public cryptographic key within the loyalty program, and the requested recordation of the regenerated public cryptographic key within an element of the permissioned distributed ledger, by the user of client device 102 or 122, e.g., user 101 or 121.

Further, in step 1018, client device 102 or client device 122 may transmit the updated registration request, the first digital signature, and an existing public cryptographic key of client device 102 or client device 122 across network 120 to the computing system within environment 100 that supports the executed wallet application, such as wallet system 130. In some examples, wallet system 130 may perform any of the exemplary processes described herein to validate the first digital signature and the digital token, and based on the validation of the first digital signature and the digital token, to apply a second digital signature to the updated registration request and to the first digital signature. As described herein, the application of the second digital signature to the updated registration request and to the first digital signature by wallet system 130 may be indicative of an approval of, and a consent to, the requested registration of the regenerated public cryptographic key within the loyalty program, and the requested recordation of the regenerated public cryptographic key within an element of the permissioned distributed ledger, by wallet system 130.

As described herein, wallet system 130 may transmit the updated registration request, the first digital signature, the second digital signature, the existing public key certificate of client device 102 or client device 122, and a public key certificate of wallet system 130 across network 120 to a computing system associated with permissioned, distributed-ledger network operating within the environment, such as gateway system 160. Upon validation of the first digital signature, the second digital signature, and the code challenge, gateway system 160 may perform any of the exemplary processes described herein to generate an updated registration object that includes the regenerated public cryptographic key, certificate chain data, and one or more elements of registration data, and to record that updated registration element within the element of the permissioned distributed ledger. In some examples, gateway system 160 may generate and transmit a confirmation message that confirms the establishment of the regenerated public cryptographic key as an updated cryptographic identifier of client device 102 or client device 122, the corresponding user, or the corresponding executed wallet application across network 120 to client device 102 or client device 122, e.g., via wallet system 130.

Referring back to FIG. 10A, client device 102 or client device 122 may receive the confirmation message from gateway system 160 (e.g., in step 1020). In some examples, and in response to the receipt of the confirmation message, client device 102 or client device 122 may perform any of the exemplary processes described herein invalidate the existing public and private cryptographic keys in favor of the regenerated public and private cryptographic keys (e.g., in step 1022). By way of example, client device 102 or client device 122 may invalidate the existing public and private cryptographic keys by, among other things, by generating and storing an invalidation flag in conjunction with each of the existing public and private cryptographic keys within the one or more tangible, non-transitory memories, by deleting the existing public and private cryptographic keys from the one or more tangible, non-transitory memories, or by overwriting the existing public and private cryptographic keys with the regenerated public and private cryptographic keys 916 and 918. Exemplary process 1000 is then complete in step 1024.

Referring to FIG. 10B, wallet system 130 may receive a request to register a regenerated public cryptographic key (e.g., an "updated" registration request) within one or more elements of a permissioned distributed ledger, a first digital signature, and a public key certificate from a client device (e.g., client device 102 or client device 122 of FIG. 1) across network 120 (e.g., in step 1032). As described herein, the request, e.g., an "updated" registration request, may be generated by a wallet application executed by the client device (e.g., executed wallet application 104 or executed wallet application 124), and the registration request may include, among other things, the regenerated public cryptographic key, a digital token generated by wallet system 130 in response to a successful authentication of an identity of the user (e.g., a one-time-user (OTU) token), and a code challenge generated by gateway system 160. Further, as also described herein, the registration request may also include registration data that includes, but is not limited to, a device identifier of the client device (e.g., a network address, such as an IP address) and an identifier of the executed wallet application (e.g., an application cryptogram).

In some instances, wallet system 130 may perform any of the exemplary processes described herein to validate the applied first digital signature (e.g., in step 1034). If wallet system 130 were unable to verify the first digital signature, (e.g., step 1034; NO), wallet system 130 may decline the requested registration of the regenerated public cryptographic key (e.g., in step 1036). Wallet system 130 may perform any of the exemplary processes described herein to generate and transmit an error message to the client device (e.g., in step 1038). Exemplary process 1030 is then complete in step 1040.

Alternatively, if wallet system 130 were to verify the first digital signature (e.g., step 1034; YES), wallet system 130 may parse the updated registration request to extract the digital token (e.g., the OTU token) from the updated registration request (e.g., in step 1041), and may perform any of the exemplary processes described herein to verify the extracted digital token is consistent with, and corresponds to, a locally maintained copy of the digital token provisioned to the client device (e.g., in step 1042). If, for example, wallet system 130 were to detect an inconsistency between the extracted digital token and the local copy of the digital token (e.g., step 1042; NO), exemplary process 400 may pass back to step 1036, and wallet system 130 may decline the requested registration of the user as a member of the loyalty program.

Alternatively, if wallet system 130 were to establish a consistency, and a correspondence, between the extracted digital token and the locally maintained copy of the digital token (e.g., step 1042; YES), wallet system 130 may approve, and consent to, the requested registration of the regenerated public cryptographic key within the loyalty program and to the recordation of the regenerated public cryptographic key within the one or more elements of the permissioned distributed ledger (e.g., in step 1044). Further, wallet system 130 may perform any of the exemplary processes described herein to apply a second digital signature to the updated registration request and to the first digital signature (e.g., in step 1046). As described herein, the application of the second digital signature to the updated registration request and to the first digital signature may be indicative of an approval of, and a consent to, the requested registration of the regenerated public cryptographic key and to the recordation of the regenerated public cryptographic key within the one or more elements of the permissioned distributed ledger by wallet system 130.

In some instances, wallet system 130 may transmit the updated registration request, the first digital signature, and the second digital signature across network 120 to a computing system associated with, and that participates in, the permissioned, distributed-ledger network described herein, such as gateway system 160 (e.g., in step 1048). Exemplary process 1030 is then complete in step 1050.

Referring to FIG. 10C, gateway system 160 may receive the updated registration request, the first digital signature, and the second digital signature from wallet system 130 (e.g., in step 1062). In some instances, in step 1064, gateway system 160 may perform any of the exemplary processes described herein to validate the first digital signature and the second digital signature. If gateway system 160 were unable to validate the first digital signature or the second digital signature, (e.g., step 1064; NO), gateway system 160 may decline the requested registration of the user as a member of the loyalty program (e.g., in step 1066). Gateway system 160 may perform any of the exemplary processes described herein to generate an error message indicative of the failed verification of the first digital signature and the declined request, and may transmit the generated error message to the client device via wallet system 130 (e.g., in step 1068). Exemplary process 1060 is then complete in step 1070.

In other examples, if gateway system 160 were to verify both the first and second digital signatures (e.g., step 1064; YES), gateway system 160 may parse the registration request to extract the code challenge from the registration request (e.g., in step 1071), and may perform any of the exemplary processes described herein to verify the extracted code challenge is consistent with, and corresponds to, a locally maintained copy of the code challenge provisioned to the client device (e.g., in step 1072). If, for example, gateway system 160 were to detect an inconsistency between the extracted code challenge and the local copy of the code challenge (e.g., step 1072; NO), exemplary process 1060 may pass back to step 1064, and gateway system 160 may decline the requested registration of the user as a member of the loyalty program.

Alternatively, if gateway system 160 were to establish a consistency, and a correspondence, between the extracted code challenge and the locally maintained copy of the code challenge (e.g., step 1072; YES), gateway system 160 may approve, and consent to, the requested registration of the regenerated public cryptographic key and to the recordation of the regenerated public cryptographic key within the one or more elements of the permissioned distributed ledger (e.g., in step 1074). Gateway system 160 may also perform any of the exemplary processes described herein to generate a updated registration object associated with the now-approved updated registration request (e.g., in step 1076), and to generate, and package into the updated registration object, certificate chain data that identifies one or more public cryptographic keys previously identifying the client device, a user of the client device, or a wallet application executed at the client device within the elements of the permissioned distributed ledger (e.g., in step 1078). In some instances, gateway system may also perform operations that apply an additional digital signature to the updated registration object using a corresponding private cryptographic key (e.g., in step 1080).

Further, gateway system 160 may also perform any of the exemplary processes described herein, in conjunction with one or more node systems operating within the computing environment, to record immutably the updated registration object within an element of a permissioned distributed ledger, such as within element 942 of updated distributed ledger 946 of FIG. 9B (e.g., in step 1082). In some instances, and as described herein, gateway system 160 may receive a confirmation message indicative of the recordation of the updated registration object within the elements of the permissioned distributed ledger, and may route the confirmation message back to the client device via wallet system 130 (e.g., in step 1084). Exemplary process 1060 is then complete in step 1086.

E. Secure Initiation and Management of Transfers of Digital Assets between Computing Devices using Permissioned Distributed Ledgers In some instances, a cryptographically secure, permissioned distributed ledger, such as distributed ledger 946 of FIG. 9B, may record registration objects that confirm a successful registration of one or more customers of a financial institution, such as users 101 and 121, as members of a loyalty program associated with that financial institution, and also record allocation objects that identifying and characterize a redeemable and transferrable digital asset, or a predetermined quantity of the digital asset, allocated to user 101, user 121, and other members of the loyalty program in response to a successful completion of the exemplary registration processes described herein, in response to a successful participation in the exemplary referral processes described herein, or in response to an initiation of a qualifying transaction involving the loyalty program or the financial institution. Additionally, and as described herein, the elements of distributed ledger 946 may also record one or more redemption objects that identifying and characterize specified digital assets, or quantities of the digital assets, redeemed by user 101, user 121, and other members of the loyalty program in exchange for physical or virtual products offered by the loyalty program.

As described herein, the initial registration of a corresponding member of the loyalty program, and the digital assets allocated to that member or redeemed by that member, may be tracked within the elements of distributed ledger 946 through a unique cryptographic identifier associated with that member, a device operable by that member, of a wallet application executed by that device, such as, but not limited to, public cryptographic key 518 associated with user 101, client device 102, and executed wallet application 104, or public cryptographic key 272 associated with user 121, client device 122, and executed wallet application 124. Further, certain of the exemplary embodiments described herein may leverage these member-specific cryptographic identifiers to facilitate peer-to-peer (P2P) transfers of digital assets between individual members of the loyalty program (such as users 101 and 121) and further, between a member of the loyalty program (such as user 101 or user 121) and a member of an additional, unrelated loyalty program in accordance with an agreed-upon exchange rate.

For example, user 121 may hold hockey tickets for an upcoming game, and may agree to transfer the hockey tickets to user 101 in exchange for a specified quantity of digital assets held by user 101, such as fifty units of digital coin allocated to user 101 through any of the exemplary allocation processes described herein. In some instances, and based on the agreement with user 121 regarding the transfer of the hockey tickets in exchange for the agreed-upon quantity of the digital asset, user 101 may provide input to client device 102, e.g., via input unit 222, that triggers and execution of wallet application 104. Based on the provisioned input, executed wallet application 104 may generate one or more interface elements that, when rendered for presentation by display unit 218, collectively establish one or more display screens of a transfer interface, which prompt user 101 to provide further input to client device 102 that specifies, among other things, a value of one or more parameters of a desired P2P transaction that transfers digital assets between user 101 and a corresponding counterparty, such as user 121, and one or more identifiers of the counterparty to the desired P2P transaction, such as a public cryptographic key of user 121.

Figure 11A:
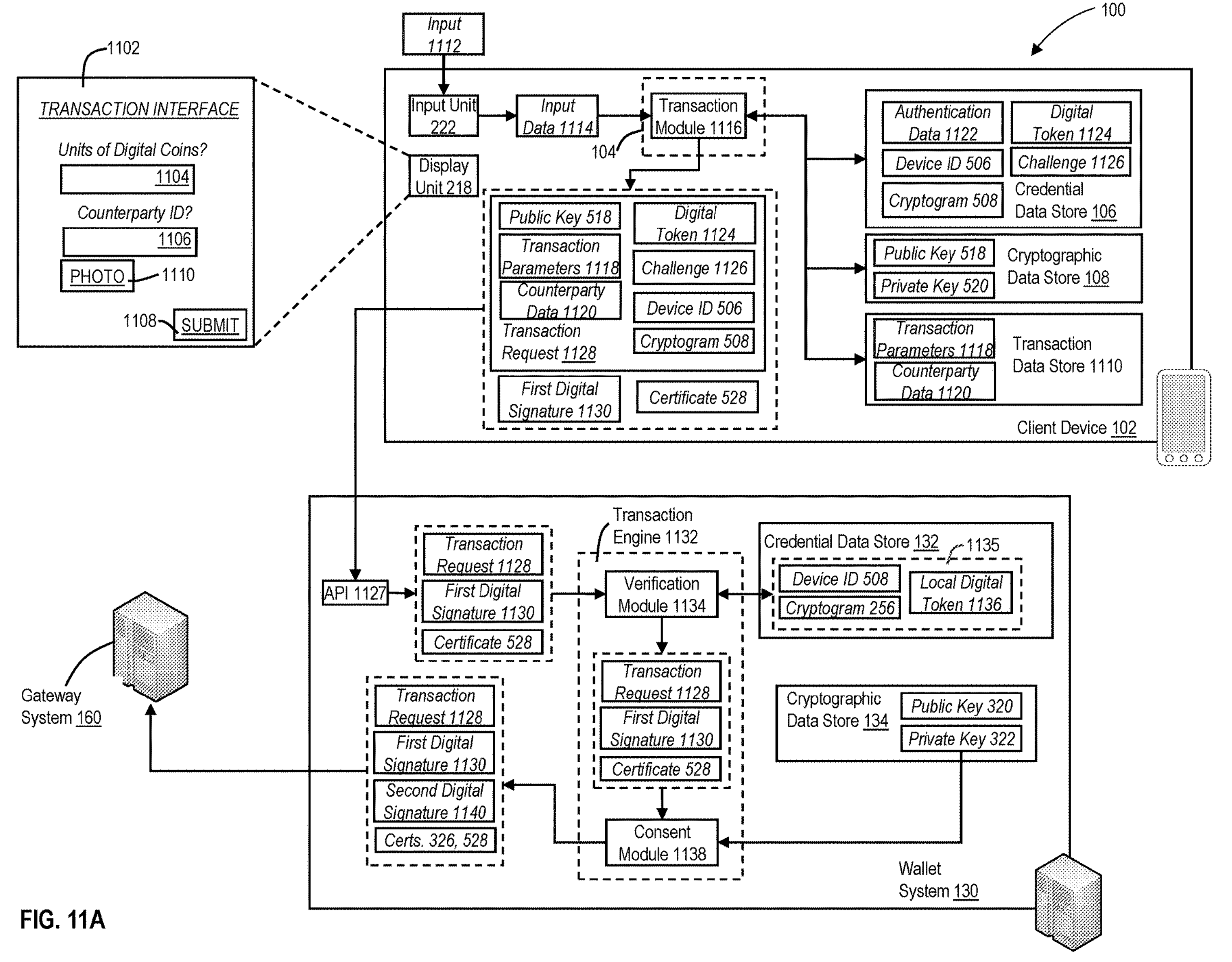
FIGS. 11A, 11B, and 12A-12C are block diagrams illustrating portions of an exemplary computing environment, in accordance with some exemplary embodiments.

Referring to FIG. 11A, a display screen 1102 of peer-to-peer (P2P) transfer interface 1100 may include one or more interactive interface elements, such as a fillable text box 1104, which receives and displays input from user 101 specifying a quantity of digital assets subject to transfer through the desired P2P transaction, and a fillable text box 1106, which receives and displays additional input from user 101 specifying a public cryptographic key associated with the counterparty to the desired P2P transaction, such as public cryptographic key 916 of executed wallet application 124. Further, display screen 1101 may also include an additional interface element, e.g., "SUBMIT" icon 1108, which upon selection by user 101, causes executed wallet application 104 to perform operations that initiate one or more of the exemplary processes described herein to transfer the specified quantity of the digital assets to the counterparty, e.g., based on corresponding transaction recorded onto an element of the permissioned distributed ledger described herein, such as distributed ledger 946.

In some examples, the additional user input that specifies the public cryptographic key of user 121, e.g., the counterparty to the desired P2P transaction, may include an alphanumeric character string entered by user 101 into input unit 222 of client device 102, e.g., a miniaturized keyboard presented a pressure-sensitive touchscreen display unit of client device 102. In other examples, the additional user input may correspond to a selection of selectable icon 1110, which cause the one or more processors of client device 102 to capture, via a digital camera of client device 102, a digital image of a visual representation of the public cryptographic key of user 121, such as, but not limited to, a digital image of a UPC or QR code presented within a corresponding interface of client device 122. The disclosed embodiments are, however, not limited to these exemplary elements of input that specify the public cryptographic key of the counterparty to the desired P2P transaction, and on other examples, the additional user input, e.g., to fillable text box 1106 may include one or more additional or alternate identifiers of the counterparty, such as a login credential, email address, or telephone number of user 101, which executed wallet application 104 or wallet system 130 may associate with the corresponding public cryptographic key.

For example, and upon viewing display screen 1102 of P2P transfer interface 1100, user 101 may provide input 1112 to client device 102 via input unit 222. In some instances, input 1112 may specify, within fillable text box 1104, the quantity of digital assets subject to transfer through the desired P2P transaction (e.g., the fifty digital coins), and may also specify, within fillable text box 1106, the alphanumeric character string corresponding to the public cryptographic key of user 121 (e.g., "1018375387394736" for a 128-bit public cryptographic key). Further, input 1112 may also correspond to the selection of "SUBMIT" icon 1108. Further, although not illustrated in FIG. 11A the selection of SUBMIT" icon 1108 may cause display unit 218 to present interface elements that establish one or more additional display screens of P2P transaction interface 1100, and that prompt user 101 to provide further input specifying one or more authentication credentials of user 101, such as, but not limited to, a login credential, an alphanumeric password, or a biometric credential (e.g., a thumbprint image, a facial image, etc.). In some instances, the provisioning of the one or more authentication credentials in response to the selection of "SUBMIT" icon 1108 may further confirm the intention of user 101 to initiate a P2P transaction that transfers the specified quantity of the digital assets (e.g., the fifty units of the digital coin) to user 121 (e.g., via the public cryptographic key provisioned to fillable text box 1106). In some instances, input unit 222 may route input data 1114 representative of input 1112 to a transaction engine 1116 of executed wallet application 104.

Transaction engine 1116 may receive input data 1114, and may parse input data 1114 to detect the requested initiation of the P2P transaction and to extract, from input data 1114, transaction parameter data 1118 and counterparty data 1120, which P2P transaction engine 1116 may store within a portion of the one or more tangible, non-transitory memories of client device 102, e.g., within transaction data store 110. In some instances, transaction parameter data 1118 may identify and characterize the type and quantity of the digital assets subject to transfer through the desired P2P transaction (e.g., the fifty units of the digital coin), and counterparty data 1120 may include the alphanumeric character string corresponding to the public cryptographic key of user 121 (e.g., "1018375387394736", as described herein). Further, in some instances, transaction engine 1116 may also parse input data 1114 to extract authentication data 1122 (e.g., the login credential, alphanumeric password, or biometric credential of user 101), which P2P transaction engine 116 may store within a portion of credential data store 106, e.g., in association with device identifier 506 (e.g., the IP address of client device 102), application cryptogram 508 (e.g., that uniquely identifies executed wallet application 104), and customer profile data 510 (e.g., the identifies and characterizes user 101).

In some instances, and prior to initiating the requested P2P transaction in accordance with the elements of transaction parameter data 1118, transaction engine 1116 of executed wallet application 104 may perform any of the exemplary processes described herein that, in conjunction with gateway system 160 and node systems 180, determine a current balance of digital assets held by user 101 and available for transfer from user 101 to user 121. Based on the determined current balance of the digital assets held by user 101 (e.g., the quantity of digital coins available for transfer), transaction engine 1116 may establish whether the determined current balance is equivalent to, or exceeds, the quantity of the digital asset (e.g., the fifty units of the digital coin) subject to transfer through the desired P2P transaction. If, for example, P2P transaction engine 1116 were to determine that the available balance of the digital assets is insufficient to support the desired P2P transaction (e.g., that the quantity of the digital asset subject to transfer exceeds the current balance), transaction engine 1116 may decline to initiate the desired P2P transaction, and executed wallet application 104 may perform operations that generate and present an error message within an additional display screen of P2P transaction interface 1100. Alternatively, if transaction engine 1116 were to determine that the available balance of the digital assets is sufficient to support the desired P2P transaction (e.g., that the current balance of the digital asset exceeds the quantity of the digital asset subject to redemption), transaction engine 1116 may perform additional operations that, in conjunction with wallet system 130 and gateway system 160, initiate the desired P2P transaction that transfers the specified quantity of the digital asset (e.g., the fifty units of the digital coin) to user 121 (e.g., via the public cryptographic key specified within counterparty data 1120).

For example, although not illustrated in FIG. 11A, transaction engine 1116 may perform any of the exemplary processes described herein to request, and receive, a digital token 1124 from wallet system 130 (e.g., in response to a successful authentication process between executed wallet application 104 and wallet system 130 based on authentication data 1122), and to request, and receive, a code challenge 1126 from gateway system 160. In some instances, transaction engine 1116 may store digital token 1124 and code challenge 1126 within a portion of credential data store 106 associated with authentication data 1122, device identifier 506, application cryptogram 508, and customer profile data 510. As described herein, digital token 1124 may correspond to a one-time-use (OTU) token, and may be characterized by a predetermined composition, length, or format. Further, code challenge 1126 may be generated by gateway system 160 using any of the exemplary processes described herein, and correspond to a hash value representative of all or a selected portion of device identifier 506 and/or application cryptogram 508, or may correspond to a hash value representative of a plaintext cipher maintained confidentially by gateway system 160.

Transaction engine 1116 may also package, into corresponding portions of a transaction request 1128, public cryptographic key 518 of executed wallet application 104 and user 101 (e.g., that identifies a payer and initiating party of the desired P2P transaction), all or a selected portion of counterparty data 1120 (e.g., that specifies the public cryptographic key of user 121, and as such, the payee of the desired P2P transaction), transaction parameter data 1118 (e.g., the specified quantity of the digital asset subject to transfer), digital token 1124, and code challenge 1126, e.g., in addition to device identifier 506, and/or application cryptogram 508. Further, although not illustrated in FIG. 11A, transaction engine 1116 may also apply a digital signature to code challenge 1126 prior to packaging code challenge 1126 into a corresponding portion of transaction request 1128.

In some instances, transaction engine 1116 of executed wallet application 104 may also perform operations that apply a first digital signature 1130 to transaction request 1128 using private cryptographic key 520 of executed wallet application 104, as maintained securely within cryptographic data store 108. In some examples, the application of first digital signature 1130 to transaction request 1128 may be indicative of an approval of, and a consent to, the requested P2P transaction that transfers the fifty units of the digital coin from user 101 to user 121, e.g., in exchange for the hockey tickets. Further, certain of the exemplary process described herein, which couple the application of first digital signature 1130 to transaction request 1128 to a level or type of consent granted by user 101 to wallet system 130 and/or gateway system 160 to access or manipulate confidential data, may be implemented in addition to, or as an alternate to, existing token-based authorization and consent protocols (e.g., an OAuth protocol, etc.) during the asset-allocation processes implemented collectively by client device 102, wallet system 130, and gateway system 160.

Transaction engine 1116 may also perform operations that cause client device 102 to transmit transaction request 1128, first digital signature 1130, and in some instances, public key certificate 528 of client device 102 (which includes public cryptographic key 518) across network 120 to wallet system 130. As illustrated in FIG. 11A, a secure, programmatic interface established and maintained by wallet system 130, such as application programming interface (API) 1127, may receive transaction request 1128, first digital signature 1130, and in some instances, public key certificate 528, and may programmatically trigger (e.g., based on a generation of one or more electronic commands) an execution of a transaction engine 1132 by the one or more processors of wallet system 130.

For example, a verification module 1134 of executed transaction engine 1132 may receive transaction request 1128, first digital signature 1130, and public key certificate 528 from API 1127. In some instances, verification module 1134 may parse public key certificate 528 and obtain a public cryptographic key associated client device 102 (e.g., public cryptographic key 518 of executed wallet application 104), and perform operations that verify first digital signature 1130 based on the obtained public cryptographic key. If, for example, verification module 1134 were unable to verify first digital signature 1130, verification module 1134 may establish that transaction request 1128 was either corrupted during transmission of altered one or more third parties without permission, and executed transaction engine 1132 may decline the requested P2P transaction. In some instances (not illustrated in FIG. 11A), executed transaction engine 1132 may generate and transmit an error message across network 120 to client device 102, e.g., for presentation within a corresponding digital interface, such as a display screen of P2P transaction interface 1100.

Alternatively, if verification module 1134 were to verify first digital signature 1130, verification module 1134 may perform operations that obtain device identifier 506, application cryptogram 508, and digital token 1124 from transaction request 1128, and may identify one or more data records 1135 within credential data store 132 that include or reference device identifier 506 or application cryptogram 508, and as such, are associated with client device 102 or executed wallet application 104. As illustrated in FIG. 11A, verification module 1134 may obtain, from data records 1135, a local digital token 1136, which is indicative of a currently valid authentication of the identity of user 101, and perform operations that determine whether digital token 1124 (e.g., as received from client device 102) is consistent with, and corresponds to, local digital token 1136. If, for example, verification module 1134 were to detect an inconsistency between digital token 1124 and local digital token 1136, executed transaction engine 1132 may decline the requested P2P transaction and may generate an error message, which wallet system 130 may transmit across network 120 to client device 102, e.g., for presentation within a display screen of P2P transaction interface 1100.

In other instances, based on the verification of first digital signature 1130, and based on the determined consistency between digital token 1124 and local digital token 1136, verification module 1134 may approve the requested P2P transaction that transfers the specifies quantity of the digital asset (e.g., the fifty units of the digital coin) from user 101 to user 121. Further, in some examples, and prior to further processing of transaction request 1128, verification module 1134 may perform operations that verify the status of user 121 as a member of the loyalty program associated with a client device (e.g., client device 122) executing a valid wallet application provisioned by wallet system 130 (e.g., executed wallet application 124).

For example, verification module 1134 may obtain counterparty data 1120 from transaction request 1128, and parse cryptographic data store 138 to verify locally maintained public cryptographic key (e.g., public cryptographic key 916, which client device 122 broadcasted to wallet system 130 through the exemplary key regeneration processes described herein), and determine that the public cryptographic key specified within counterparty data 1120 corresponds to the locally maintained cryptographic key associated with user 121, client device 122, and executed wallet application 124. In other examples, not illustrated in FIG. 11A, verification module 1134 may transmit all or a selected portion of counterparty data 1120 across network 120 to gateway system 160, which may perform operations that, in conjunction with node systems 180, determine whether the public cryptographic key specified within counterparty data 1120 corresponds to a public cryptographic key of user 121 maintained within a registration object recorded onto the permissioned distributed ledger (e.g., within updated registration object 936 recorded onto element 942 of permissioned distributed ledger 946) or a prior, invalid cryptographic key of user 121 linked to a currently valid public cryptographic key through one or more elements of certificate chain data (e.g., certificate chain data 938 maintained within updated registration object 936).

Referring back to FIG. 11A, and based on the approval of the requested P2P transaction between user 101 and user 121, verification module 1134 may provide transaction request 1128, first digital signature 1130, and in some instances, public key certificate 528 and as input to a consent module 1138 of executed transaction engine 1132. As described herein, transaction request 1128 may include, but is not limited to, public cryptographic key 518 associated with user 101, all or the selected portion of counterparty data 1120 (e.g., that specifies the public cryptographic key associated with user 121), transaction parameter data 1118, digital token 1124, code challenge 1126, device identifier 506 and/or application cryptogram 508. Consent module 1138 may, in some examples, perform any of the exemplary processes described herein to apply a second digital signature 1140 to transaction request 1128 and to first digital signature 1130, e.g., using private cryptographic key 322 of wallet system 130, as maintained within cryptographic data store 134. As described herein, the application of second digital signature 1140 to transaction request 1128 and to first digital signature 1130 may indicative of an approval of, and a consent to, the requested P2P transaction that transfers the specified quantity of the digital asset (e.g., the fifty units of the digital coin) from user 101 to user 121 (e.g., via the public cryptographic key specified within counterparty data 1120). Executed transaction engine 1132 may perform operations that cause wallet system 130 to transmit transaction request 1128, first digital signature 1130, second digital signature 1140, public key certificate 528 of client device 102 (e.g., that includes public cryptographic key 518) and public key certificate 326 (e.g., that includes public cryptographic key 320 of wallet system 130) across network 120 to gateway system 160.

Figure 11B:
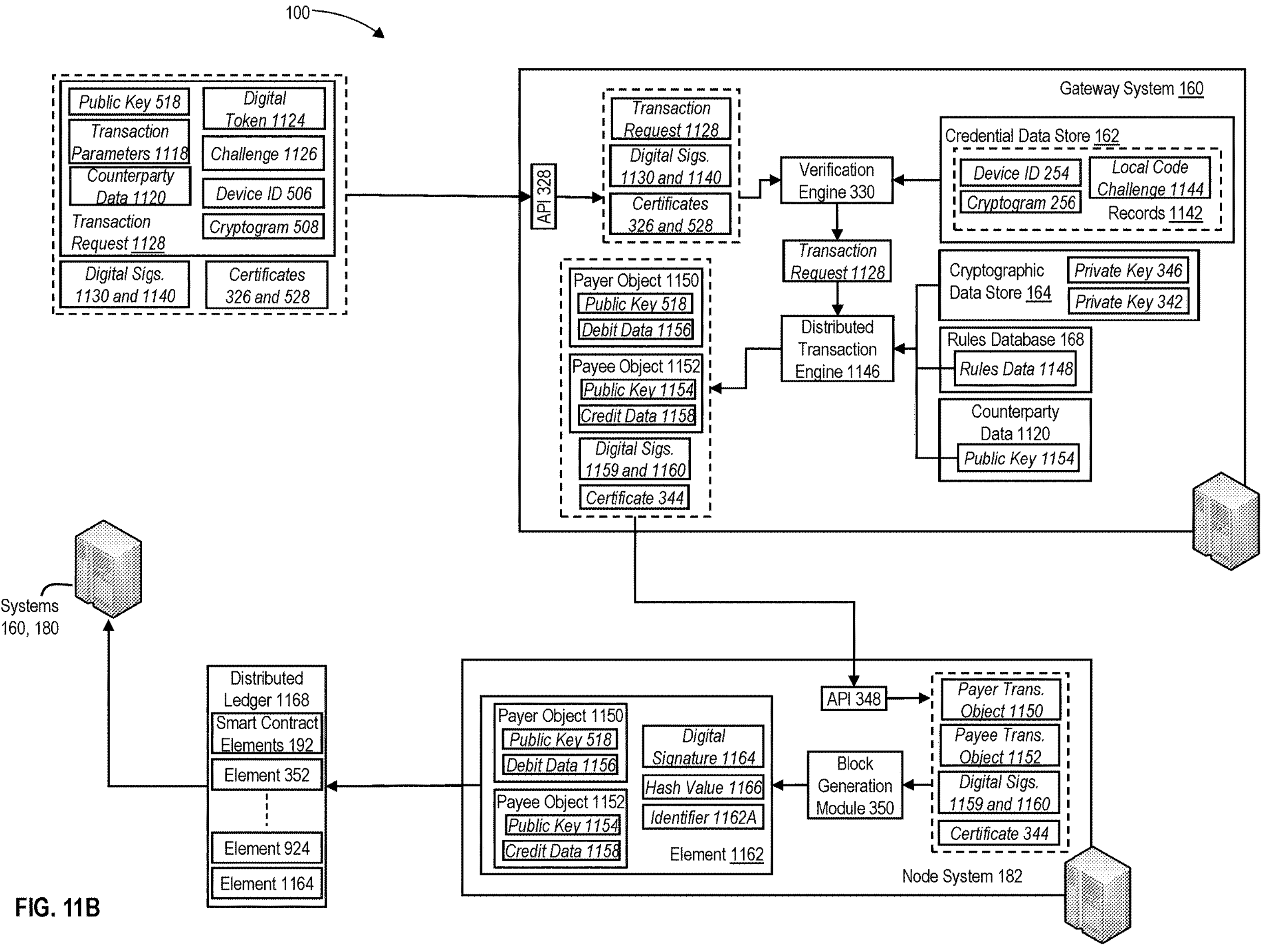

Referring to FIG. 11B, a programmatic interface establish and maintained by gateway system 160, such as API 328, may receive transaction request 1128, first digital signature 1130, second digital signature 1140, and public key certificates 326 and 528, and may perform operations that trigger an execution of verification engine 330 by the one or more processors of gateway system 160. In some instances, executed verification engine 330 may parse public key certificate 528 to extract public cryptographic key 518 of executed wallet application 104, and may parse public key certificate 326 to extract public cryptographic key 320 of wallet system 130. Executed verification engine 330 may perform operations that validate second digital signature 1140 (e.g., as applied to transaction request 1128 and first digital signature 1130) using public cryptographic key 320 and further, that validate first digital signature 1130 (e.g., as applied to transaction request 1128) using public cryptographic key 518.

If, for example, executed verification engine 330 were unable to verify first digital signature 1130, and additionally, or alternatively, second digital signature 1140, executed verification engine 330 may decline the requested P2P transaction, and may discard transaction request 1128. In some instances (not illustrated in FIG. 11B), executed verification engine 330 may generate and transmit an error message across network 120 to client device 102 via wallet system 130, e.g., for presentation within a display screen of P2P transaction interface 1100.

Alternatively, if executed verification engine 330 were to verify first digital signature 1130 and second digital signature 1140, executed verification engine 330 may perform operations that obtain, from transaction request 1128, code challenge 1126, device identifier 506, and/or application cryptogram 508. In some examples, executed verification engine 330 may access credential data store 162, and identify one or more data records 1142 that include or reference device identifier 506 or application cryptogram 508, and as such, as associated with client device 102 or executed wallet application 104. As illustrated in FIG. 11B, executed verification engine 330 may obtain, from data records 1142, a local code challenge 1144 (e.g., generated using any of the exemplary processes described herein), and perform operations that determine whether code challenge 1126 (e.g., as received from client device 102) is consistent with, and corresponds to, local code challenge 1144.

As described herein, code challenge 1126 may also be associated with an additional digital signature applied to code challenge 1126 by executed wallet application 124 using private cryptographic key 520. In some instances, not illustrated in FIG. 11B, executed verification engine 330 may perform any of the exemplary processes described herein to validate the additional digital signature applied to code challenge 1126 prior to determining the consistency and correspondence between code challenge 1126 and local code challenge 1144.

If, for example, executed verification engine 330 were to detect an inconsistency between code challenge 1126 and local code challenge 1144 (and in some instances, were unable to validate the additional digital signature applied to code challenge 1126), executed verification engine 330 may decline the requested P2P transaction, and may discard transaction request 1128. In some instances (not illustrated in FIG. 11B), executed verification engine 330 may perform any of the exemplary processes described herein to generate and transmit a corresponding error message across network 120 to client device 102 via wallet system 130, e.g., for presentation within a display screen of P2P transaction interface 1100. Alternatively, based on the validation of first digital signature 1130 and second digital signature 1140 (and in some instances, the validation of the additional digital signature applied to code challenge 1126), and based on the determined consistency between code challenge 1126 and local code challenge 1144, executed verification engine 330 may validate the requested P2P transaction between user 101 and user 121.

As illustrated in FIG. 11B, executed verification engine 330 may provide approved transaction request 1128 as an input to a distributed transaction engine 1146, which may be executed by the one or more processors of gateway system 160. In some examples, executed distributed transaction engine 1146 may perform operations that determine a compliance of the requested, and now-validated, P2P transaction complies within one or more P2P transaction rules established by the loyalty program or by the financial institution associated with the loyalty program. For instance, executed distributed transaction engine 1146 may access rules database 168 of data repository 161, and obtain rules data 1148 that, among other things, and identify and characterize one or more P2P transaction rules that impose corresponding conditions on the requested P2P transaction. Examples of these imposed conditions may include, but are not limited to, a minimum or maximum quantity of digital assets subject to transfer through the requested P2P transaction (e.g., lower or upper transaction bounds) or a maximum velocity for P2P transactions involving user 101 or user 121 (e.g., an upper bound on a number of executed P2P transactions during a predetermined time period).

If, for example, executed distributed transaction engine 1146 may establish an inconsistency between at least one of the conditions imposed by the one or more P2P transaction rules and requested P2P transaction, executed distributed allocation engine 546 may decline the requested P2P transaction and may generate an error message, which gateway system 160 may transmit across network 120 to client device 102 via wallet system 130, e.g., for presentation within a display screen of P2P transaction interface 1100. Alternatively, if executed distributed transaction engine 1146 were to establish a consistency between the conditions imposed by the one or more P2P transaction rules and requested P2P transaction, executed distributed transaction engine 1146 may also apply one or more fraud detection and mitigation processes to the now-verified allocation request (not illustrated in FIG. 11B). By way of example, the applied fraud detection and mitigation processes may also be specified within rules database 168, and may include adding data characterizing the P2P transaction request to a queue of pending P2P transaction, which may delay processing that executed the requested allocates the digital asset, or the predetermined quantity of the digital asset, to user 101 predetermined or dynamically determined time period. In some instances, and upon expiration of the predetermined or dynamically determined time period, executed distributed transaction engine 1146 may establish a successful outcome of the fraud detection and mitigation processes, and may approve the requested P2P transaction between user 101 and user 121.

In some instances, and based on the approval of the requested P2P transaction, executed distributed transaction engine 1146 may perform operations that generate discrete transaction objects for the now-approved P2P transaction that, upon recordation within one or more elements of the permissioned distributed ledger using any of the exemplary consensus-based processes described herein, execute the P2P transaction by debiting the specified quantity of the digital assets (e.g., the fifty units of the digital coin) from the current balance of digital assets held by user 101 and by crediting the specified quantity of the digital assets to the current balance of digital assets held by user 121. For example, executed distributed transaction engine 1146 may obtain, from transaction request 1128, public cryptographic key 518 associated with user 101 (e.g., and executed wallet application 104), all of the selected portion of counterparty data 1120 (e.g., that includes the specified public cryptographic key of user 121), and transaction parameter data 1118, which includes the specified quantity of the digital assets subject to transfer from user 101 to user 121 through the now-approved P2P transaction (e.g., the fifty digital coins). As described herein, executed distributed transaction engine 1146 may perform operations that store public cryptographic key 518, counterparty data 1120, and transaction parameter data 1118 within one or more of the tangible, non-transitory memories of gateway system 160, e.g., within a portion of data repository 161 (not illustrated in FIG. 11B).

Executed distributed transaction engine 1146 may also perform operations that generate, for the now-approved P2P transaction, a payer transaction object 1150 and a payee transaction object 1152 that, when recorded within an additional element of the permissioned distributed ledger described herein, e.g., distributed ledger 946 of FIG. 9B, executed the P2P transaction and effect an atomic transfer of the specified quantity of the digital assets from user 101 to user 121 via the permissioned distributed ledger. For example, as illustrated in FIG. 11B, executed distributed transaction engine 1146 may package public cryptographic key 518, which uniquely identifies user 101 and executed wallet application 104, within a corresponding portion of payer transaction object 1150.

Further, executed distributed transaction engine 1146 may perform additional operations that extract, from counterparty data 1120, a candidate public key 1154 associated with user 121 (e.g., as specified by user 101 in response to display screen 1102 of P2P transaction interface 1100), and that confirm that candidate public key 1154 corresponds to a currently valid public cryptographic key that uniquely identifies user 121 and executed wallet application 124 within the elements of distributed ledger 946. For example, although not illustrated in FIG. 11B, executed distributed transaction engine 1146 may access permissioned distributed ledger 946, and determine that candidate public key 1154 corresponds to public cryptographic key 916 maintained within updated registration object 936, which may be recorded within element 942 of permissioned distributed ledger 946. Further, and based on portions of registration data maintained within updated registration object 936, such as device identifier 254 and application cryptogram 256, executed distributed transaction engine 1146 may further parse the elements of permissioned distributed ledger 946 to establish that element 942 records the most temporally recent registration or updated registration block associated with user 121, client device 122, and executed wallet application 124, and as such, that candidate public key 1154 represents the currently valid public cryptographic key associated with user 121. In some examples, illustrated in FIG. 11B, executed distributed transaction engine 1146 may package candidate public key 1154 within a corresponding portion of payee transaction object 1152.

In other instances, (also not illustrated in FIG. 11B) executed distributed transaction engine 1146 may detect an inconsistency between candidate public key 1154 and the currently valid public cryptographic key 916 recorded within updated registration object 936 of distributed-ledger element 942. Responsive to the detected inconsistency, executed distributed transaction engine 1146 may parse the elements of permissioned distributed ledger 946 to establish that element 942 records the most temporally recent registration or updated registration block associated with user 121, client device 122, and executed wallet application 124 (e.g., based on portions of the registration data maintained within updated registration object 936, such as device identifier 254 and application cryptogram 256), and further, may obtain one or more elements of certificate chain data 938 from updated registration block object 936. As described herein, the elements of certificate chain data 938 may specify one or more public cryptographic keys (now invalidated) that previously identified user 121, client device 122, and executed wallet application 124 within the elements of the permissioned distributed ledger 946 (and the other exemplary permissioned distributed ledgers described herein), and executed distributed transaction engine 1146 may perform operations that determine whether the one or more prior public cryptographic keys include candidate public key 1154.

If, for example, executed distributed transaction engine 1146 were to establish that the one or more prior public cryptographic keys exclude candidate public key 1154, executed distributed transaction engine 1146 may determine that candidate public key 1154 is invalid for the requested P2P transaction (not illustrated in FIG. 11B). In some instances, executed distributed transaction engine 1146 may generate and transmit an error message across network 120 to client device 102 via wallet system 130, e.g., for presentation within a corresponding digital interface, such as a display screen of P2P transaction interface 1100 (also not illustrated in FIG. 11B).

In other instances, executed distributed transaction engine 1146 were to establish that the one or more prior public cryptographic keys include candidate public key 1154, executed distributed transaction engine 1146 may establish an association between candidate public key 1154 and user 121 or executed wallet application 124, and as such, between candidate public key 1154 and the currently valid public cryptographic key associated with user 121, e.g., public cryptographic key 916. In some instances, not illustrated in FIG. 11B, executed distributed transaction engine 1146 may package currently valid public cryptographic key 916 within a corresponding portion of payee transaction object 1152, e.g., instead of the specified, but not currently invalid, candidate public key 1154.

Referring back to FIG. 11B, executed distributed transaction engine 1146 may extract the data that identifies the quantity of the digital asset subject to transfer through the P2P transaction (e.g., the fifty units of the digital coin) from transaction parameter data 1118, and may package the extracted data into corresponding ones of debit data 1156 and credit data 1158. Further, in some instances, executed distributed transaction engine 1146 may also package debit data 1156 into a corresponding portion of payer transaction object 1150, and credit data 1158 into a corresponding portion of payee transaction object 1152. As described herein, when recorded onto one or more additional elements of distributed ledger 946, respective ones of payee and payer transaction objects 1150 and 1152 may execute the requested and approved P2P transaction between user 101 and user 121, may debit the specified quantity of the digital asset (e.g., as maintained within debit data 1156) from the current balance of the digital asset held by user 101, and may credit the specified quantity of the digital asset (e.g., as maintained within credit data 1158) to the current balance of the digital asset held by user 121.

In some examples, executed distributed transaction engine 1146 and may also apply a digital signature 1159 to payer transaction object 1150, and may apply a digital signature 1160 to payee transaction object 1152, using private cryptographic key 342 of gateway system 160, e.g., as maintained within cryptographic data store 164. Further, executed distributed transaction engine 1146 may perform additional operations that cause gateway system 160 to broadcast payer transaction object 1150 and applied digital signature 1159, payee transaction object 1152 and applied digital signature 1160, and public key certificate 344 (that includes public cryptographic key 346 of gateway system 160) across network 120 to one or more of node systems 180, such as node system 182. As illustrated in FIG. 11B, a programmatic interface established and maintained by each of node systems 180, such as API 348 of node system 182, may receive and route payer transaction object 1150, payee transaction object 1152 applied digital signatures 1159 and 1160, and public key certificate 344 to a corresponding block generation engine, such as block generation engine 350 of node system 182.

In some examples, each of the one or more of node systems 180, including node system 182, may perform any of the exemplary, consensus-based operations described herein to: (i) verify digital signatures 1159 and 1160 using public cryptographic key 346 (e.g., as obtained from public key certificate 344); and (ii) generate an additional element 1162 of distributed ledger 946 that includes, among other things, payer transaction object 1150 (e.g., which itself includes debit data 1156 and public cryptographic key 518 of executed wallet application 104), payee transaction object 1152 (e.g., which itself includes credit data 1158 and the public cryptographic key associated with user 121 and executed wallet application 124), a digital signature 1164 applied to payer and payee transaction objects 1150 and 1152 (e.g., using a private cryptographic key of corresponding ones of node systems 180, including node system 182), a hash value 1166 representative of payer and payee transaction objects 1150 and 1152 and digital signature 1164 (and in some instances, to other elements of distributed ledger 564), and an identifier 1162A (e.g., a "block number") that specifies a sequential position of additional element 1162 in relation to the existing, prior elements of distributed ledger 946. Further, and through any of the exemplary, consensus-based processes described herein, each of the one or more of node systems 180, including node system 182, may append additional element 1162 to distributed ledger 946 to generate an updated distributed ledger, e.g., distributed ledger 1168.

Further, and based on a successful completion of these exemplary consensus-based processes (e.g., the calculation of an appropriate proof-of-work or proof-of-stake, as described herein) prior to other ones of node systems 180, node system 182 may broadcast distributed ledger 1168, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. As described herein, the recordation of payer transaction object 1150 within element 1162 of distributed ledger 1168 may implement an atomic transfer that debits the specified quantity of the digital asset (e.g., the fifty units of the digital coin) from the current balance of the digital asset held by user 101, and the recordation of payee transaction object 1152 within element 1162 of distributed ledger 1168 may implement an atomic transfer that credits the specified quantity of the digital asset (e.g., the fifty digital coins) to the current balance of the digital asset held by user 121.

Although not illustrated in FIG. 11B, Gateway system 160 may receive updated distributed ledger 1168, and executed distributed transaction engine 1146 of gateway system 160 may store distributed ledger 1168 within a portion of the one or more tangible, non-transitory memories, such as data repository 161 (e.g., to replace distributed ledger 946). Executed distributed transaction engine 1146 may also perform operations that, based on the receipt of distributed ledger 1168 and the payer and payee transaction objects 1150 and 1152 within element 1162, generate messages confirming the now-executed P2P transaction and the transfer of the specified quantity of the digital assets (e.g., the fifty digital coins) from user 101 to user 121, gateway system 160 may transmit the confirmation messages across network 120 to client devices 102 and 122 via wallet system 130 (not illustrated in FIG. 11B).

In some instances, the cryptographically secure, permissioned distributed ledger described herein, such as distributed ledger 1168 of FIG. 11B, may immutably record transaction objects that facilitate peer-to-peer (P2P) transactions between members of a corresponding loyalty program, such as user 101 and user 121. By way of example, the P2P transactions may a transfer of a specified quantity of a digital asset allocated by the loyalty program from a first member, such as user 101, to a second member, such as user 121, and the recordation of the transaction objects onto distributed ledger 1168 (e.g., using the exemplary consensus-based processes described herein) may execute a first atomic transfer that debits a specified quantity of a digital asset from a current balance of the digital asset held by user 101, and a second atomic transfer that credits the specified quantity of the digital asset to a current balance of the digital asset held by user 121. Further, and as described herein, the initial registration of each member of the loyalty program, and the digital assets allocated to, redeemed by, or transferred to or from each of the members, may be tracked within the elements of distributed ledger 1168 through a unique cryptographic identifier associated with each member, a device operable by that member, of a wallet application executed by that device, such as, but not limited to, a public cryptographic key generated, or regenerated, using any of the exemplary processes described herein.

In other instances, certain of the exemplary processes described herein may leverage the cryptographically secure and permissioned distributed ledger to facilitate, and immutably track, peer-to-peer (P2P) transactions that exchange specified quantities of the digital asset allocated by the loyalty program associated with the financial institution for corresponding quantities of additional digital assets allocated to members of one or more additional loyalty program in accordance with corresponding exchanges rates established by mutual agreement between corresponding pairs of the loyalty programs. For example, the loyalty program associated with the financial institution (e.g., a "first" loyalty program) may cooperate with a second loyalty program, such as an air-miles reward program, to establish collectively an incentive campaign by which a member of the first and second loyalty programs, such as user 101, may exchange a first digital asset allocated by the first loyalty program (e.g., the units of the first digital coin described herein) for a predetermined quantity, or fraction, of a second digital asset allocated by the second loyalty program, e.g., in accordance with a predetermined and mutually agreed-upon exchange rate, or by which the member of the first loyalty program, such as user 101, may initiate a transfer of a specified quantity of the first digital asset to an additional member of the second loyalty program, e.g., based on a conversion of the specified quantity of the first digital asset into a corresponding quantity of the second digital asset based upon the exchange rate.

In some instances, the agreed-upon exchange rate, along with additional parameters of the incentive campaign and eligibility rules for that incentive campaign, may be maintained locally by one or more computing systems associated with each of the first and second loyalty programs, which may provision incentive campaign data that includes the agreed-upon exchange rate and selected portions of the campaign parameters and the eligibility rules to computing devices within environment 100 that are operated by the members of the first and second loyalty programs. For example, program system 140 associated with the first loyalty program (e.g., the loyalty program associated with the financial institution) may maintain the incentive campaign data within a portion of the one or more tangible, non-transitory memories of program system 140, e.g., within campaign data store 144 of data repository 141, and may transmit all or a selected portion of the locally maintained incentive campaign data across network 120 to one or more computing devices operated by members of the first loyalty program, such as client device 102 operated by user 101 or client device 122 operated by user 121.

By way of example, a wallet application executed by client device 102, such as executed wallet application 104, may receive the transmitted portion of the incentive campaign data from program system 140 (e.g., via a corresponding programmatic interface, such as API 214 of FIG. 2A), and executed wallet application 104 may perform operations that present interface elements representative of the received portion of the incentive campaign data within a corresponding digital interface, e.g., within an additional display screen of P2P transaction interface 1100. For instance, the additional display screen may prompt user 101 to exchange a specified quantity of the first digital asset allocated by the first loyalty program (e.g., the units of the first digital coin described herein) for a corresponding quantity of the second digital asset (e.g., units of a second digital coin) allocated by the second loyalty program in accordance with the exchange rate, or may prompt user 101 to transfer the specified quantity of the first digital asset to an additional member of the second loyalty program, e.g., based on a conversion of the specified quantity of the first digital asset into the corresponding quantity of the second digital asset based upon the exchange rate.

Although not illustrated in FIG. 11A or 11B, user 101 may provide additional input to client device 102, e.g., via input unit 222, that specifies the quantity of the first digital asset (e.g., 100 units of the first digital coin) subject to transfer or exchange, and that specifies a public cryptographic key (or other member-specific data) the uniquely identifies user 101 or the additional member during interactions with computing systems associated with the second loyalty program, and further, that requests an initiation of the exchange or transfer based on the specified input (e.g., and may be indicative of a selection of a corresponding "SUBMIT" icon). As described herein, input unit 222 may provide input data representative of the received input to one or more program modules of executed wallet application 104, such as transaction engine 1116 of executed wallet application 104.

In some instances, also not illustrated in FIG. 11A or 11B, transaction engine 1116 may receive the input data, and may parse the received input data to detect the requested initiation of the P2P exchange (e.g., the exchange of the specified quantity of the first digital asset for the corresponding quantity of the second digital asset by the common member of the first and second loyalty programs, such as user 101) or the P2P transaction (e.g., the transfer of the specified quantity of the first digital asset from user 101 to the additional member of the second loyalty program in accordance with the exchange rate), and to extract, from the input data, information that includes the specified quantity of the first digital asset and the public cryptographic key associated with the member of the second loyalty program. In some examples, executed wallet application 104 may perform any of the exemplary processes described herein to confirm that a current balance of the digital asset held by user 101 is equivalent to, or exceeds the specified quantity of the digital asset subject to exchange or transfer. When the current balance is equivalent to, or exceeds the specified quantity of the digital asset, executed wallet application 104 may perform any of the exemplary processes described herein to generate a digitally signed transaction request (e.g., transaction request 1200 of FIGS. 12A-12C) based on portions of the extracted information, and to transmit the digitally signed transaction request across network 120 to wallet system 130.

Figure 12A:
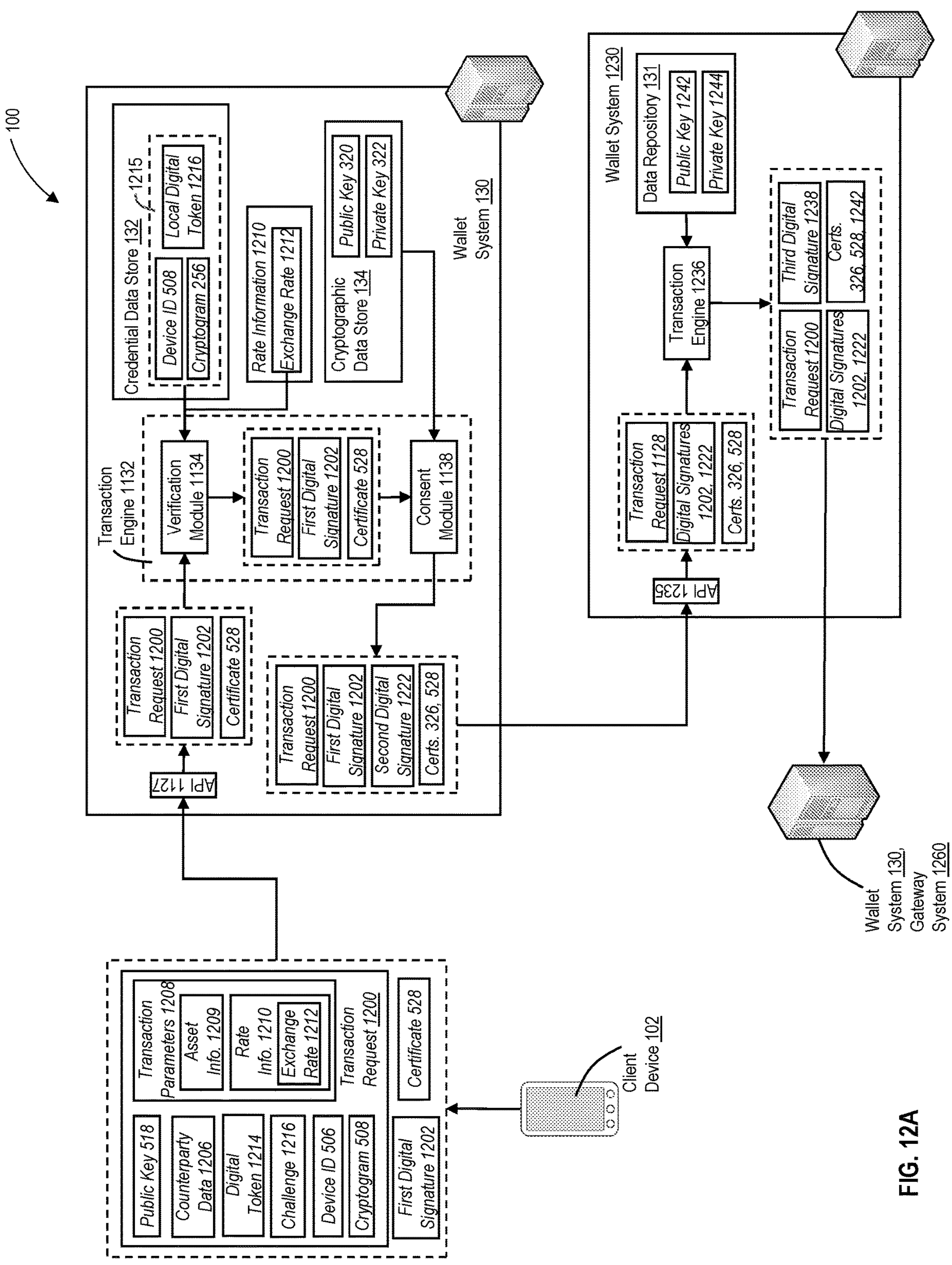

Referring to FIG. 12A, a secure, programmatic interface established and maintained by wallet system 130, such as API 1127, may receive transaction request 1200, a first digital signature 1202, and in some instances, public key certificate 528 of client device 102 (which includes public cryptographic key 518), and may programmatically trigger an execution of transaction engine 1132 by the one or more processors of wallet system 130. In some examples, transaction request 1200 may include, among other things, public cryptographic key 518 (e.g., which identifies the member of the first loyalty program that initiated the desired P2P exchange or transfer) and counterparty data 1206, which includes the public cryptographic key of the member of the second loyalty program (e.g., as specified by user 101 using and of the exemplary processes described herein). Further, as illustrated in FIG. 12A, transaction request 1200 may also include transaction parameter data 1208, such as, but not limited to, asset information 1209 that identifies the quantity of the first digital asset subset to P2P exchange or transfer and rate information 1210 that identifies exchange rate 1212 associated with the requested P2P exchange or transfer.

In some instances, each of public cryptographic key 518 and the public cryptographic key associated with the member of the second loyalty program (e.g., as specified within counterparty data 1206) may be characterized by a common structure, format, or composition. For example, and for the exemplary P2P exchanges described herein, each of public cryptographic key 518 and the public cryptographic key specified within counterparty data 1206 may be associated with, and uniquely identify user 101 (e.g., public cryptographic key 518 may identify user 101 within the first loyalty program associated with the financial institution, and the public cryptographic key specified within counterparty data 1206 may identify user 101 within the second loyalty program, such as the air miles reward program). In other instances, public cryptographic key 518 and the public cryptographic key associated with the member of the second loyalty program (e.g., as specified within counterparty data 1206) may be characterized by a differing and program-specific structures, formats, or compositions, and in some examples, public cryptographic key 518 may identify user 101 within the first loyalty program, and the public cryptographic key specified within counterparty data 1206 may identify and additional, unrelated member of the second loyalty program (e.g., the counterparty that receives the corresponding quantity of the second digital asset subject to conversion from the specified quantity first digital asset via the requested P2P transaction).

Transaction request 1200 may also include a digital token 1214, a code challenge 1216, device identifier 506 (e.g., that identifies client device 102) and/or application cryptogram 508 (e.g., that uniquely identifies executed wallet application 104). As described herein, digital token 1214 may be generated by wallet system 130 in response to a successful outcome of the exemplary authentication processes described herein, as implemented collectively by executed wallet application 104 and wallet system 130. Digital token 1214 may, for example, correspond to a one-time-use (OTU) token, and may be characterized by a predetermined composition, length, or format. Further, code challenge 1216 may be generated by gateway system 160 using any of the exemplary processes described herein, and may correspond to a hash value representative of all or a selected portion of device identifier 506 and/or application cryptogram 508, or may correspond to a hash value representative of a plaintext cipher maintained confidentially by gateway system 160. Further, although not illustrated in FIG. 12A, transaction engine 1116 executed by client device 102 may also apply a digital signature to code challenge 1216 prior to packaging code challenge 1216 into a corresponding portion of transaction request 1200.

In some instances, also not illustrated in FIG. 12A, transaction engine 1116 of executed wallet application 104 may also perform any of the exemplary processes described herein to apply a first digital signature 1202 to transaction request 1200 using private cryptographic key 520 of executed wallet application 104. As described herein, the application of first digital signature 1202 to transaction request 1200 may be indicative of an approval of, and a consent to, the requested P2P exchange or transfer by user 101 and/or executed wallet application 104. Further, certain of the exemplary process described herein, which couple the application of first digital signature 1130 to transaction request 1200 to a level or type of consent granted wallet system 130 and/or gateway system 160 by user 101 to access, manipulate, or store confidential data, may be implemented in addition to, or as an alternate to, existing token-based authorization and consent protocols (e.g., an OAuth protocol, etc.) during the asset-allocation processes implemented collectively by client device 102, wallet system 130, and gateway system 160.

Referring back to FIG. 12A, application programming interface (API) 1127 may route transaction request 1200, a first digital signature 1202, and public key certificate 528 (which includes public cryptographic key 518 of client device 102) to verification module 1134 of executed transaction engine 1132. In some instances, verification module 1134 may parse public key certificate 528 and obtain a public cryptographic key associated client device 102 (e.g., public cryptographic key 518 of executed wallet application 104), and perform operations that verify first digital signature 1202 based on the obtained public cryptographic key. If, for example, verification module 1134 were unable to verify first digital signature 1202, verification module 1134 may establish that transaction request 1200 was either corrupted during transmission of altered one or more third parties without permission, and executed transaction engine 1132 may decline the requested P2P exchange or transfer. In some instances (not illustrated in FIG. 12A), executed transaction engine 1132 may generate and transmit an error message across network 120 to client device 102, e.g., for presentation within a corresponding digital interface.

Alternatively, if verification module 1134 were to verify first digital signature 1202, verification module 1134 may perform operations that obtain device identifier 506, application cryptogram 508, and digital token 1214 from transaction request 1200, and may identify one or more data records 1215 within credential data store 132 that include or reference device identifier 506 or application cryptogram 508, and as such, are associated with client device 102 or executed wallet application 104. As illustrated in FIG. 12A, verification module 1134 may obtain, from data records 1215, a local digital token 1218, which is indicative of a currently valid authentication of the identity of user 101, and perform operations that determine whether digital token 1214 (e.g., as received from client device 102) is consistent with, and corresponds to, local digital token 1218. If, for example, verification module 1134 were to detect an inconsistency between digital token 1214 and local digital token 1218, executed transaction engine 1132 may decline the requested P2P exchange or transfer and may generate an error message, which wallet system 130 may transmit across network 120 to client device 102.

In other instances, based on the verification of first digital signature 1202, and based on the determined consistency between digital token 1214 and local digital token 1217, verification module 1134 may perform additional operations that establish a consistency between the exchange rate specified within transaction request 1200 and a current and valid asset exchange rate agreed upon by the first and second loyalty programs, e.g., the loyalty program associated with the financial institution and air miles reward program. For example, verification module 1134 may access rate information 1210 (e.g., as maintained within transaction request 1200), and obtain exchange rate 1212 associated with the requested P2P exchange or transfer. Further, verification module 1134 may also obtain, from the one or more tangible, non-transitory memories of gateway system 160, current rate information 1220 that specifies a currently valid exchange rate for the conversion of a unit of the first digital asset to a corresponding unit or fraction of the second digital asset, e.g., as agreed upon by the first and second loyalty programs. In some instances, not illustrated in FIG. 12A, verification module 1134 may request, and receive all or a portion of current rate information 1220 from program system 140, e.g., across network 120 through a secure, programmatic interface.

If, for example, verification module 1134 were to detect an inconsistency between exchange rate 1212 (e.g., as received from client device 102) and the currently valid exchange rate, verification module 1134 may determine that user 101 and first and second loyalty programs attest to different exchange rates for the requested P2P exchange or transfer, and executed transaction engine 1132 may decline the requested P2P exchange or transfer. In some instances (not illustrated in FIG. 12A), executed transaction engine 1132 may generate an error message indicative of the inconsistency in the exchange rate for the requested P2P exchange or transfer, and wallet system 130 may transmit the generated error message across network 120 to client device 102, e.g., for presentation within a corresponding digital interface. Although not illustrated in FIG. 12, the presented error message may prompt user 101 to accept or decline the currently valid exchange rate for the requested P2P exchange or transfer.

In other examples, if verification module 1134 were to establish a consistency between exchange rate 1212 (e.g., as received from client device 102) and the currently valid exchange rate (e.g., as agreed upon by the first and second loyalty programs), verification module 1134 may determine that user 101 and first and second loyalty programs each attest to a common exchange rate for the requested P2P exchange or transfer, and executed transaction engine 1132 may approve the requested P2P exchange or transfer. Further, and based on the approval of the requested P2P exchange or transfer, verification module 1134 may provide transaction request 1200, first digital signature 1202, and in some instances, public key certificate 528 and as input to a consent module 1138 of executed transaction engine 1132.

Consent module 1138 may, in some examples, perform any of the exemplary processes described herein to apply a second digital signature 1222 to transaction request 1200 and to first digital signature 1202, e.g., using private cryptographic key 322 of wallet system 130, as maintained within cryptographic data store 134. As described herein, the application of second digital signature 1222 to transaction request 1200 and to first digital signature 1202 may indicative of an approval of, and a consent to, the requested P2P exchange or transfer by wallet system 130, and further, a determination by wallet system 130 that user 101 and each of the first and second loyalty programs attest to a common exchange rate for the requested P2P exchange or transfer.

Based on the application of second digital signature 1222 to transaction request 1200 and to first digital signature 1202, executed transaction engine 1132 may perform operations that identify a network address of one or more computing systems associated with the second loyalty program (e.g., the air miles rewards program) within environment 100, such as, but not limited to, an additional wallet system 1230 configured to provision one or more additional executable wallet applications to computing devices operated by the member of the second loyalty program (e.g., client device 102, etc.). Executed transaction engine 1132 may perform operations that cause wallet system 130 to transmit transaction request 1200, first digital signature 1202, second digital signature 1222, public key certificate 528 of client device 102 (e.g., that includes public cryptographic key 518) and public key certificate 326 (e.g., that includes public cryptographic key 320 of wallet system 130) across network 120 to the identified network address of wallet system 1230.

In some examples, wallet system 1230 may represent a computing system that includes one or more servers and tangible, non-transitory memory devices storing executable code and application modules. The one or more servers may each include one or more processors or processor-based computing devices, and the one or more processors or processor-based computing devices may be configured to execute portions of the stored code or application modules (e.g., such as, but not limited to, the executable application programs, program modules, or elements of code described herein in reference to wallet system 130) to perform operations consistent with the disclosed embodiments. In some examples, wallet system 1230 may include a communications unit or interface coupled to the one or more processors for accommodating wired or wireless communication across network 120 with any of the additional network-connected systems or devices described herein, e.g., a transceiver device. Further, and to perform any of the exemplary processes described herein, wallet system 1230 may maintain, within the one or more tangible, non-transitory memories, a data repository 1231 that maintains locally one or more of the exemplary elements of credential or cryptographic data described herein in reference to wallet system 130.

Referring back to FIG. 12A, a secure, programmatic interface established and maintained by additional wallet system 1230, such as application programming interface (API) 1235, may receive transaction request 1200, first digital signature 1202, second digital signature 1222, public key certificate 528 of client device 102 (e.g., that includes public cryptographic key 518) and public key certificate 326 (e.g., that includes public cryptographic key 320 of wallet system 130), and may perform operations that trigger an execution of a transaction engine 1236 by the one or more processors of wallet system 1230. In some examples, executed transaction engine 1236 may parse public key certificate 528 to extract public cryptographic key 518 of executed wallet application 104, and may parse public key certificate 326 to extract public cryptographic key 320 of wallet system 130. Executed transaction engine 1236 may also perform any of the exemplary processes described herein to validate second digital signature 1222 (e.g., as applied to transaction request 1200 and first digital signature 1202) using public cryptographic key 320 and further, that validate first digital signature 1202 (e.g., as applied to transaction request 1200) using public cryptographic key 518.

If, for example, executed additional transaction engine 1236 were unable to verify first digital signature 1202, and additionally, or alternatively, second digital signature 1222, executed transaction engine 1236 may decline the requested P2P exchange or transfer, and may discard transaction request 1200. In some instances (not illustrated in FIG. 12A), executed transaction engine 1236 may generate and transmit an error message across network 120 to wallet system 130, which may route the error message back to client device 102, e.g., for presentation within the corresponding digital interface.

Alternatively, if executed transaction engine 1236 were to verify first digital signature 1202 and second digital signature 1222, executed transaction engine 1236 may perform any of the exemplary processes described herein to establish a further consistency between the exchange rate specified within transaction request 1200 (e.g., exchange rate 1212 within rate information 1210) and a current and valid asset exchange rate agreed upon by the first and second loyalty programs, e.g., the loyalty program associated with the financial institution and air miles reward program. If, for example, executed transaction engine 1236 were to detect an inconsistency between exchange rate 1212 (e.g., as received from client device 102) and the currently valid exchange rate, executed transaction engine 1236 may determine that user 101 and first and second loyalty programs attest to different exchange rates for the requested P2P exchange or transfer, and executed additional transaction engine 1236 may decline the requested P2P exchange or transfer. In some instances (not illustrated in FIG. 12A), executed transaction engine 1236 may generate an error message indicative of the inconsistency in the exchange rate for the requested P2P exchange or transfer, and wallet system 1230 may transmit the generated error message across network 120 to wallet system 130, which may route the error message back to client device 102, e.g., for presentation within a corresponding digital interface. Although not illustrated in FIG. 12A, the presented error message may prompt user 101 to accept or decline the currently valid exchange rate for the requested P2P exchange or transfer.

In other examples, if executed transaction engine 1236 were to establish a consistency between exchange rate 1212 (e.g., as received from client device 102) and the currently valid exchange rate (e.g., as agreed upon by the first and second loyalty programs), executed additional transaction engine 1236 may determine that user 101 and first and second loyalty programs each attest to a common exchange rate for the requested P2P exchange or transfer, and executed additional transaction engine 1236 may approve the requested P2P exchange or transfer. Further, and based on the approval of the requested P2P exchange or transfer, executed additional transaction engine 1236 may perform operations that apply a third digital signature 1238 to transaction request 1200, first digital signature 1202, and second digital signature 1222 using a private cryptographic key 1240 of wallet system 1230, e.g., as maintained within data repository 1231.

In some instances, the application of third digital signature 1238 to transaction request 1200, first digital signature 1202, and second digital signature 1222 may indicative of an approval of, and a consent to, the requested P2P exchange or transfer by wallet system 1230 and further, a determination by wallet system 1230 that user 101 and each of the first and second loyalty programs attest to a common exchange rate for the requested P2P exchange or transfer. Further, and based on the application of third digital signature 1238 to transaction request 1200, first digital signature 1202, and second digital signature 1222, executed transaction engine 1236 may perform operations that cause wallet system 1230 to transmit transaction request 1200, first digital signature 1202, second digital signature 1222, third digital signature 1238, public key certificates 326 and 528, and a public key certificate 1242 (e.g., that includes a public cryptographic key 1244 of additional wallet system 1230) across network 120 to wallet system 130.

Further, executed transaction engine 1236 may also perform operations that identify a network address of one or more additional computing systems associated with the second loyalty program (e.g., the air miles rewards program) within environment 100, such as, but not limited to, an additional gateway system 1260. In some instances, executed transaction engine 1236 may perform operations that cause wallet system 1230 to transmit transaction request 1200, first digital signature 1202, second digital signature 1222, third digital signature 1238, and public key certificate 326, 528, and 1242 back across network 120 to gateway system 1260 associated with the second loyalty system.

In some examples, gateway system 1260 may represent a computing system that includes one or more servers and tangible, non-transitory memory devices storing executable code and application modules. The one or more servers may each include one or more processors or processor-based computing devices, and the one or more processors or processor-based computing devices may be configured to execute portions of the stored code or application modules (e.g., such as, but not limited to, the executable application programs, program modules, or elements of code described herein in reference to wallet system 130) to perform operations consistent with the disclosed embodiments. In some examples, gateway system 1260 may include a communications unit or interface coupled to the one or more processors for accommodating wired or wireless communication across network 120 with any of the additional network-connected systems or devices described herein, e.g., a transceiver device.

Further, and to perform any of the exemplary processes described herein, gateway system 1260 may maintain, within the one or more tangible, non-transitory memories, a data repository 1261 that maintains locally one or more of the exemplary elements of credential, cryptographic, campaign, or rules data described herein in reference to wallet system 130. In some instances, gateway system 1260 may form a portion of a permissioned, distributed-ledger network associated with the second loyalty program (e.g., the air miles rewards program), and gateway system 1260 may maintain a local version of distributed ledger 1290 within a corresponding tangible, non-transitory memory (e.g., within data repository 1261 of gateway system 1260.

In some instances, a secure, programmatic interface established and maintained by wallet system 130, such as API 1127, may receive and route transaction request 1200, first digital signature 1202, second digital signature 1222, and third digital signature 1238, and public key certificates 326, 528, and 1242 to executed transaction engine 1132. In some instances, executed transaction engine 1132 may perform additional operations that cause wallet system 130 to transmit, across network 120 to gateway system 160, each of transaction request 1200, first, second, and third signatures 1202, 1222, and 1238, and public key certificates 326, 528, and 1242, e.g., using any appropriate communications protocol.

Figure 12B:
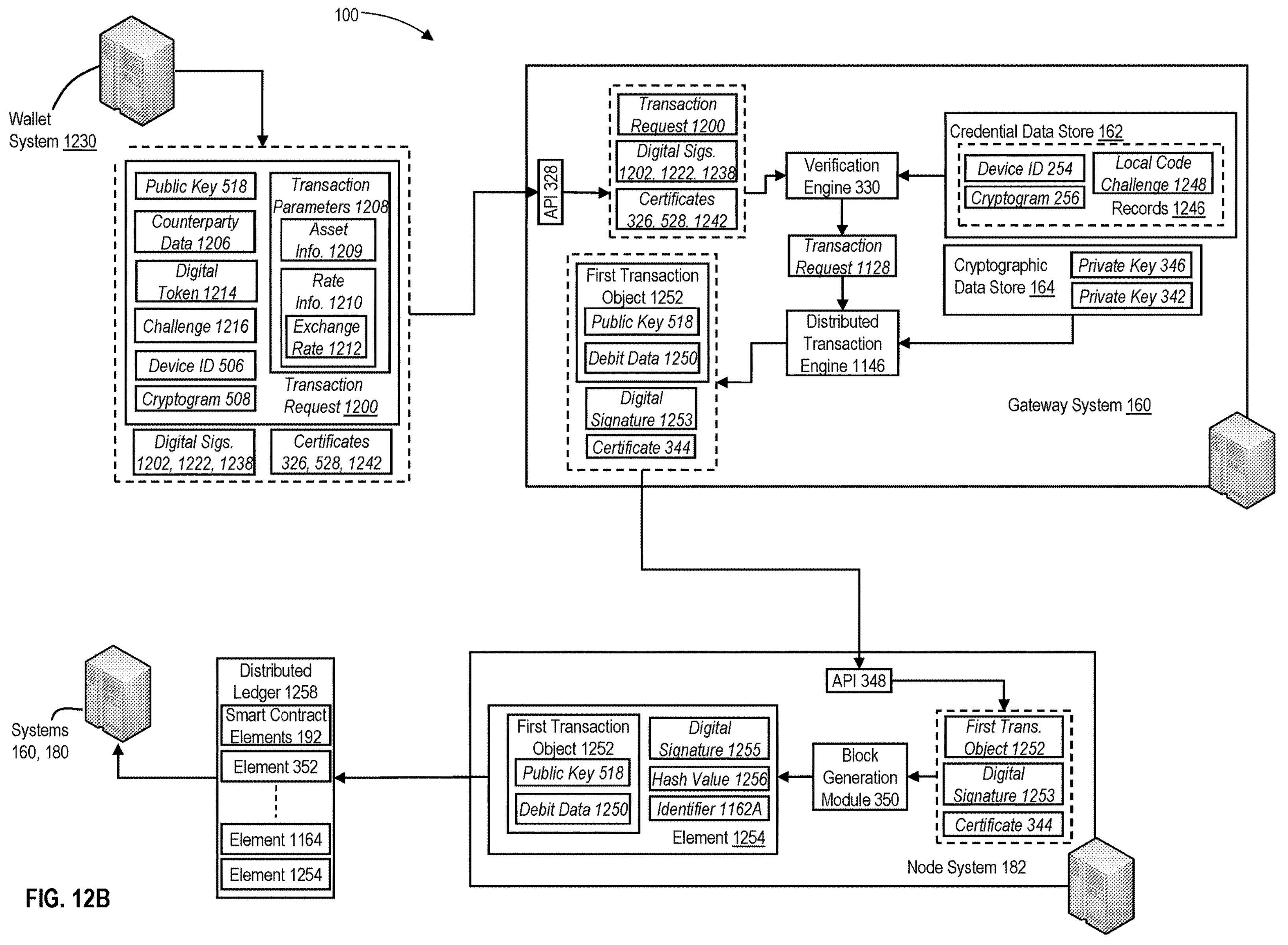

Referring to FIG. 12B, a programmatic interface established and maintained by gateway system 160, such as API 328, may receive transaction request 1200, first, second, and third digital signatures 1202, 1222, and 1238, and public key certificates 326, 528, and 1242 from wallet system 130, and may perform operations that trigger an execution of verification engine 330 by the one or more processors of gateway system 160 (e.g., based on one or more programmatically generated commands). In some instances, executed verification engine 330 may parse public key certificate 528 to extract public cryptographic key 518 of executed wallet application 104, may parse public key certificate 326 to extract public cryptographic key 320 of wallet system 130, and may parse public key certificate 1242 to extract public cryptographic key 1244 of wallet system 1230, e.g., associated with the second loyalty program. Executed verification engine 330 may perform any of the exemplary processes described herein to validate third digital signature 1238 (e.g., as applied to transaction request 1200, first digital signature 1202, and second digital signature 1222) using public cryptographic key 1244, to validate second digital signature 1222 (e.g., as applied to transaction request 1200 and first digital signature 1202) using public cryptographic key 320, and further, to validate first digital signature 1202 (e.g., as applied to transaction request 1200) using public cryptographic key 518.

If, for example, executed verification engine 330 were unable to verify first digital signature 1202, second digital signature 1222, and additionally, or alternatively, third digital signature 1238, executed verification engine 330 may decline the requested P2P exchange or transfer, and may discard transaction request 1200. In some instances (not illustrated in FIG. 12B), executed verification engine 330 may generate an error message indicative of the declined P2P exchange or transfer, and gateway system 160 may transmit the generated error message across network 120 to client device 102 via wallet system 130, e.g., for presentation within the corresponding digital interface.

Alternatively, if executed verification engine 330 were to verify first, second, and third digital signatures 1202, 1222, and 1238, executed verification engine 330 may perform operations that obtain, from transaction request 1200, code challenge 1216, device identifier 506, and/or application cryptogram 508. In some examples, executed verification engine 330 may access credential data store 162, and identify one or more data records 1246 that include or reference device identifier 506 or application cryptogram 508, and as such, as associated with client device 102 or executed wallet application 104. As illustrated in FIG. 12B, executed verification engine 330 may obtain, from data records 1246, a local code challenge 1248 (e.g., generated using any of the exemplary processes described herein), and perform operations that determine whether code challenge 1216 (e.g., as received from client device 102) is consistent with, and corresponds to, local code challenge 1248.

As described herein, code challenge 1216 may also be associated with an additional digital signature applied to code challenge 1216 by executed wallet application 104 using private cryptographic key 520. In some instances, not illustrated in FIG. 12B, executed verification engine 330 may perform any of the exemplary processes described herein to validate the additional digital signature applied to code challenge 1216 prior to determining the consistency and correspondence between code challenge 1216 and local code challenge 1248.

If, for example, executed verification engine 330 were to detect an inconsistency between code challenge 1216 and local code challenge 1248 (and in some instances, were unable to validate the additional digital signature applied to code challenge 1216), executed verification engine 330 may decline the requested P2P transaction or exchange, and may discard transaction request 1200. In some instances (not illustrated in FIG. 12B), executed verification engine 330 may perform any of the exemplary processes described herein to generate and transmit a corresponding error message across network 120 to client device 102 via wallet system 130, e.g., for presentation within the corresponding digital interface. Alternatively, based on the validation of first, second, and third digital signatures 1202, 1222, and 1238 (and in some instances, the validation of the additional digital signature applied to code challenge 1216), and based on the determined consistency between code challenge 1216 and local code challenge 1248, executed verification engine 330 may approve the requested P2P transaction or exchange.

As illustrated in FIG. 12B, executed verification engine 330 may provide approved transaction request 1200 as an input to a distributed transaction engine 1146, which may be executed by the one or more processors of gateway system 160. In some instances, executed distributed transaction engine 1146 may perform operations that obtain, from transaction request 1200, public cryptographic key 518 of executed wallet application 104 and asset information 1209 that identifies the quantity of the first digital asset subset to transfer or exchange (e.g., as maintained within transaction parameter data 1208 of transaction request 1200). Further, although not illustrated in FIG. 12B, executed distributed transaction engine 1146 may perform operations that store public cryptographic key 518 and asset information 1209 within one or more of the tangible, non-transitory memories of gateway system 160, e.g., within a portion of data repository 161, and may perform any of the exemplary processes described herein to verify that the requested P2P exchange or transfer complies with any of the exemplary P2P transaction rules described herein, or to apply any of the exemplary fraud detection or mitigation processes described herein to the P2P exchange or transfer.

In some instances, executed distributed transaction engine 1146 may generate debit data 1250 that identifies the quantity of the first digital asset subject to exchange or transfer through the P2P exchange or transfer (e.g., the 100 units of the first digital coin), as specified within asset information 1209, and may perform operations that package public cryptographic key 518 and debit data 1250 into corresponding portion of a first transaction object 1252. As described herein, when recorded onto one or more additional elements of distributed ledger 1168, first transaction object 1252 may debit the specified first quantity of the digital asset (e.g., as maintained within debit data 1250) from the current balance of the digital asset held by user 101.

In some examples, executed distributed transaction engine 1146 and may also apply a digital signature 1253 to first transaction object 1252 using private cryptographic key 342 of gateway system 160, e.g., as maintained within cryptographic data store 164. Further, executed distributed transaction engine 1146 may perform additional operations that cause gateway system 160 to broadcast first transaction object 1252, applied digital signature 1253, and public key certificate 344 (that includes public cryptographic key 346 of gateway system 160) across network 120 to one or more of node systems 180, such as node system 182 (e.g., through a secure, programmatic interface, such as API 348 of node system 182).

In some examples, each of the one or more of node systems 180, including node system 182, may perform any of the exemplary, consensus-based operations described herein to: (i) verify digital signature 1253 using public cryptographic key 346 (e.g., as obtained from public key certificate 344); and (ii) generate an additional element 1254 of distributed ledger 1168 that includes, among other things, first transaction object 1252 (e.g., which itself includes public cryptographic key 518 of executed wallet application 104 and debit data 1250), a digital signature 1255 applied to first transaction object 1252 (e.g., using a private cryptographic key of corresponding ones of node systems 180, including node system 182), a hash value 1256 representative of first transaction object 1252 and digital signature 1255 (and in some instances, to other elements of distributed ledger 1168), and an identifier 1254A (e.g., a "block number") that specifies a sequential position of additional element 1254 in relation to the existing, prior elements of distributed ledger 1168. The one or more of node systems 180, including node system 182, may also perform operations that append additional element 1254 to distributed ledger 1168 to generate an updated distributed ledger, e.g., distributed ledger 1258.

Further, and based on a successful completion of these exemplary consensus-based processes (e.g., the calculation of an appropriate proof-of-work or proof-of-stake, as described herein) prior to other ones of node systems 180, node system 182 may broadcast distributed ledger 1258, which represents the latest, longest version of the distributed ledger, to the additional ones of node systems 180 operating within environment 100 and additionally or alternatively, to each of the network-connected systems that participate in the permissioned, distributed-ledger network described herein, such as gateway system 160. As described herein, the recordation of first transaction object 1252 within element 1254 of distributed ledger 1258 may debit the specified quantity of the first digital asset, e.g., the one hundred digital coins, from the current balance of the digital asset held by user 101, as tracked by the elements of distributed ledger 1258.

In some instances, gateway system 160 may receive updated distributed ledger 1258, and executed distributed transaction engine 1146 of gateway system 160 may store distributed ledger 1258 within a portion of the one or more tangible, non-transitory memories, such as data repository 161 (e.g., to replace distributed ledger 1168). Executed distributed transaction engine 1146 may also perform operations that, based on the receipt of distributed ledger 1258 and the recordation of first transaction object 1252 within element 1254, generate a confirmation message (not illustrated in FIG. 12B) that confirms the debit of the specified quantity of the digital asset, e.g., the one hundred digital coins, from the current balance of the digital asset held by user 101, and the successful transfer of the specified quantity of the digital asset to the counterparty associated with the requested P2P exchange or transfer, e.g., the member of the second loyalty program. Further, executed distributed transaction engine 1146 may perform operations that cause gateway system 160 to transmit the confirmation message across network 120 to client device 102, e.g., via wallet system 130.

Figure 12C:
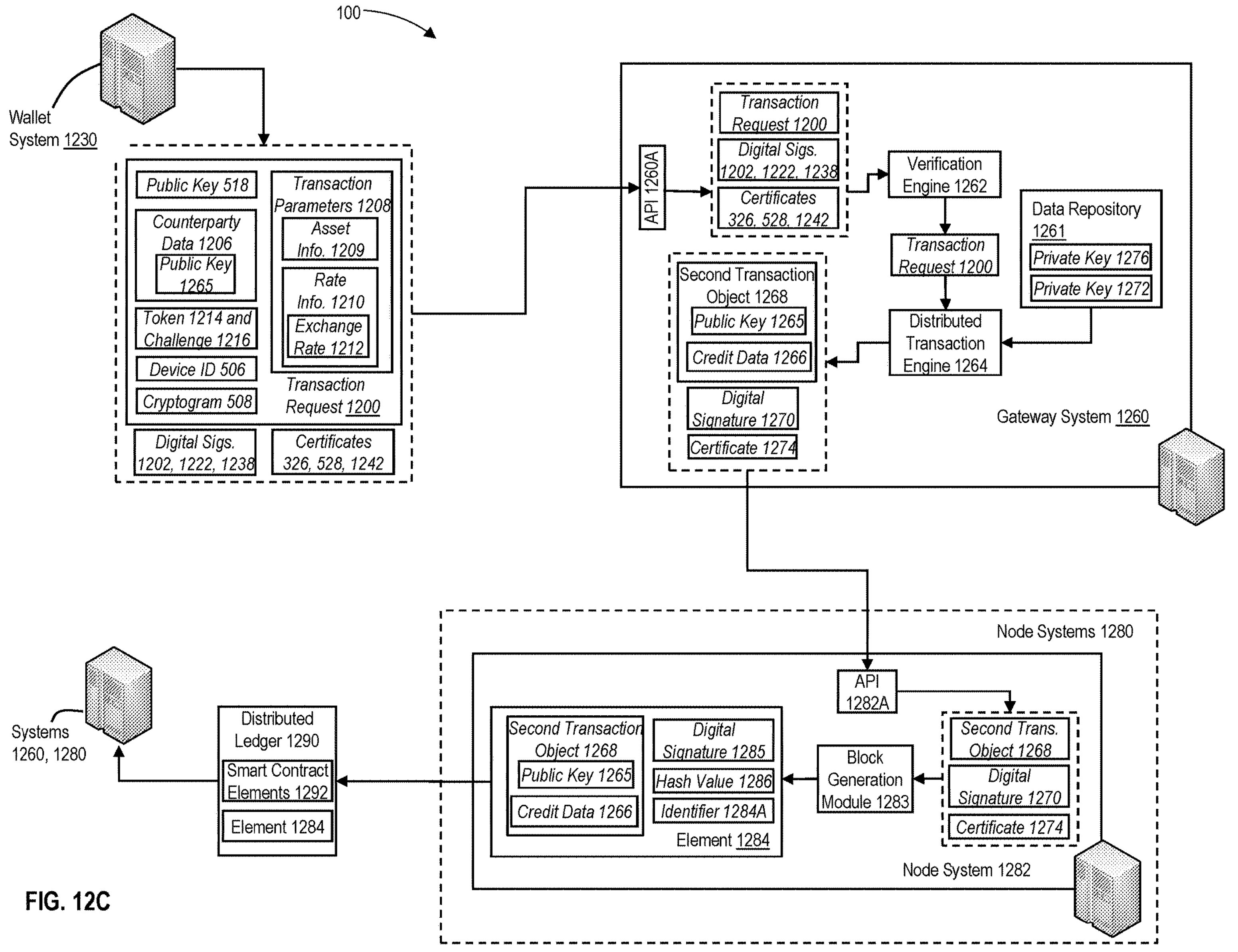

Referring to FIG. 12C, a programmatic interface established and maintained by gateway system 1260, such as API 1260A, may receive transaction request 1200, first, second, and third digital signatures 1202, 1222, and 1238, and public key certificates 326, 528, and 1242 from wallet system 130, and may perform operations that trigger an execution of a verification engine 1262 by the one or more processors of gateway system 1260. In some instances, executed verification engine 1262 may parse public key certificate 528 to extract public cryptographic key 518 of executed wallet application 104, may parse public key certificate 326 to extract public cryptographic key 320 of wallet system 130, and may parse public key certificate 1242 to extract public cryptographic key 1244 of wallet system 1230, e.g., associated with the second loyalty program. Executed verification engine 1262 may perform any of the exemplary processes described herein to validate third digital signature 1238 (e.g., as applied to transaction request 1200, first digital signature 1202, and second digital signature 1222) using public cryptographic key 1244, to validate second digital signature 1222 (e.g., as applied to transaction request 1200 and first digital signature 1202) using public cryptographic key 320, and further, to validate first digital signature 1202 (e.g., as applied to transaction request 1200) using public cryptographic key 518.

If, for example, executed verification engine 1262 were unable to verify first digital signature 1202, second digital signature 1222, and additionally, or alternatively, third digital signature 1238, executed verification engine 1262 may decline the requested P2P exchange or transfer, and may discard transaction request 1200. In some instances (not illustrated in FIG. 12C), executed verification engine 1262 may generate an error message indicative of the declined P2P exchange or transfer, and gateway system 1260 may transmit the generated error message across network 120 to wallet system 1230.

Alternatively, if executed verification engine 1262 were to verify first digital signature 1202, second digital signature 1222, and third digital signature 1238, executed verification engine 1262 may approve the requested P2P transaction or exchange, and may provide approved transaction request 1200 as an input to a distributed transaction engine 1264, which may be executed by the one or more processors of gateway system 1260. In some instances, executed distributed transaction engine 1264 may perform operations that obtain, from transaction request 1200, counterparty data 1206, which includes the public cryptographic key 1265 of the member of the second loyalty program (e.g., as specified by user 101 using and of the exemplary processes described herein) and transaction parameter data 1208, which may include asset information 1209 that identifies the quantity of the first digital asset subset to transfer or exchange and rate information 1210 that identifies the exchange rate 1212 associated with the requested P2P exchange or transfer. Further, although not illustrated in FIG. 12C, executed distributed transaction engine 1264 may perform operations that store public cryptographic key 1265 and transaction parameter data 1208 within one or more of the tangible, non-transitory memories of gateway system 1260, e.g., within a portion of data repository 1261.

In some instances, executed distributed transaction engine 1264 may perform operations that, based on exchange rate 1212, convert the specified quantity of the first digital asset (e.g., as specified within asset information 1209) into the corresponding quantity of the second digital asset associated with the second loyalty program. By way of example, the specified quantity of the first digital asset may include one hundred units of a first digital coin, and exchange rate 1212 may specify that a single unit of the first digital asset corresponds 1.37 units of the second digital asset (e.g., a second digital coin allocated by the second loyalty program), and executed distributed transaction engine 1146 may perform operations that convert the one hundred units of the first digital coins into a corresponding 1.37 units of the second digital coin allocated by the second loyalty program. Executed distributed transaction engine 1146 may also generate credit data 1266 that identifies the converted, corresponding quantity of the second digital asset (e.g., the 1.37 units of second digital coin), and may perform operations that package public cryptographic key 1265 and credit data 1266 into corresponding portion of a second transaction object 1268. As described herein, when recorded onto one or more additional elements of distributed ledger 1290, second transaction object 1268 may debit the corresponding quantity of the second digital assets (e.g., the 1.37 units of second digital coin maintained within credit data 1266) to the current balance of the digital asset held by user 101, e.g., through the executed P2P exchange or transfer.

In some examples, executed distributed transaction engine 1264 may also apply a digital signature 1270 to second transaction object 1268 using a private cryptographic key 1272 of gateway system 1260 (e.g., as maintained within data repository 1261). Further, executed distributed transaction engine 1264 may perform additional operations that cause gateway system 1260 to broadcast second transaction object 1268, applied digital signature 1270, and public key certificate 1274 (that includes public cryptographic key 1276 of gateway system 1260) across network 120 to one or more of node systems 1280, such as node system 1282 (e.g., through a secure, programmatic interface, such as application programming interface (API) 1282A of node system 1282).

Each of node systems 1280, including node system 1282, may represent a computing system that includes one or more servers and tangible, non-transitory memory devices storing executable code and application modules. The one or more servers may each include one or more processors or processor-based computing devices, and the one or more processors or processor-based computing devices may be configured to execute portions of the stored code or application modules (e.g., such as, but not limited to, the executable application programs, program modules, or elements of code described herein in reference to wallet system 130) to perform operations consistent with the disclosed embodiments. In some examples, each of node systems 1280, including node system 1282, may include a communications unit or interface coupled to the one or more processors for accommodating wired or wireless communication across network 120 with any of the additional network-connected systems or devices described herein, e.g., a transceiver device.

In some examples, each of the one or more of node systems 1280, including node system 1282, may execute a block generation module (e.g., block generation module 1283) that performs any of the exemplary, consensus-based operations described herein to: (i) verify digital signature 1270 using public cryptographic key 1276 (e.g., as obtained from public key certificate 1274); and (ii) generate an additional element 1284 of a distributed ledger (e.g., as maintained by node systems 1280) that includes, among other things, second transaction object 1268 (e.g., which itself includes public cryptographic key 1265 of member of the second loyalty program and credit data 1266), a digital signature 1285 applied to second transaction object 1268 (e.g., using a private cryptographic key of corresponding ones of node systems 180, including node system 182), a hash value 1286 representative of second transaction object 1268 and digital signature 1285 (and in some instances, to other elements of distributed ledger 1290), and an identifier 1284A (e.g., a "block number") that specifies a sequential position of additional element 1284 in relation to the existing, prior elements of distributed ledger 1290. The one or more of node systems 1280, including node system 1282, may also perform operations that append additional element 1284 to the prior distributed ledger to generate an updated distributed ledger, e.g., distributed ledger 1290 that includes smart contract elements 1292 and additional element 1284.

Further, and based on a successful completion of these exemplary consensus-based processes (e.g., the calculation of an appropriate proof-of-work or proof-of-stake, as described herein) prior to other ones of node systems 1280, node system 1282 may broadcast distributed ledger 1290, which represents the latest, longest version of the distributed ledger, to the additional ones of node systems 1280 operating within environment 100 and additionally or alternatively, to each of the network-connected systems that participate in the permissioned, distributed-ledger network described herein, such as gateway system 1260. As described herein, the recordation of second transaction object 1268 within element 1284 of distributed ledger 1290 may credit the corresponding quantity of the second digital asset, e.g., the 1.37 units of the second digital coin, to the current balance of the second digital asset held by the member of the second loyalty program, as tracked by the elements of distributed ledger 1290.

In some instances, gateway system 1260 may receive updated distributed ledger 1290, and executed distributed transaction engine 1264 of gateway system 1260 may store distributed ledger 1292 within a portion of the one or more tangible, non-transitory memories, such as data repository 1261 (e.g., to replace distributed ledger 1168). Executed distributed transaction engine 1264 may also perform operations that, based on the receipt of distributed ledger 1290 and the recordation of second transaction object 1268 within element 1284, generate a confirmation message (not illustrated in FIG. 12C) that confirms the credit of the corresponding quantity of the second digital asset, e.g., the 1.37 units of the second digital coin, to the current balance of the digital asset held by the member of the second loyalty program. Further, executed distributed transaction engine 1264 may perform operations that cause gateway system 1260 to transmit the confirmation message across network 120 to a device operated by the member of the second loyalty program, e.g., via wallet system 1230.

Figure 13A:
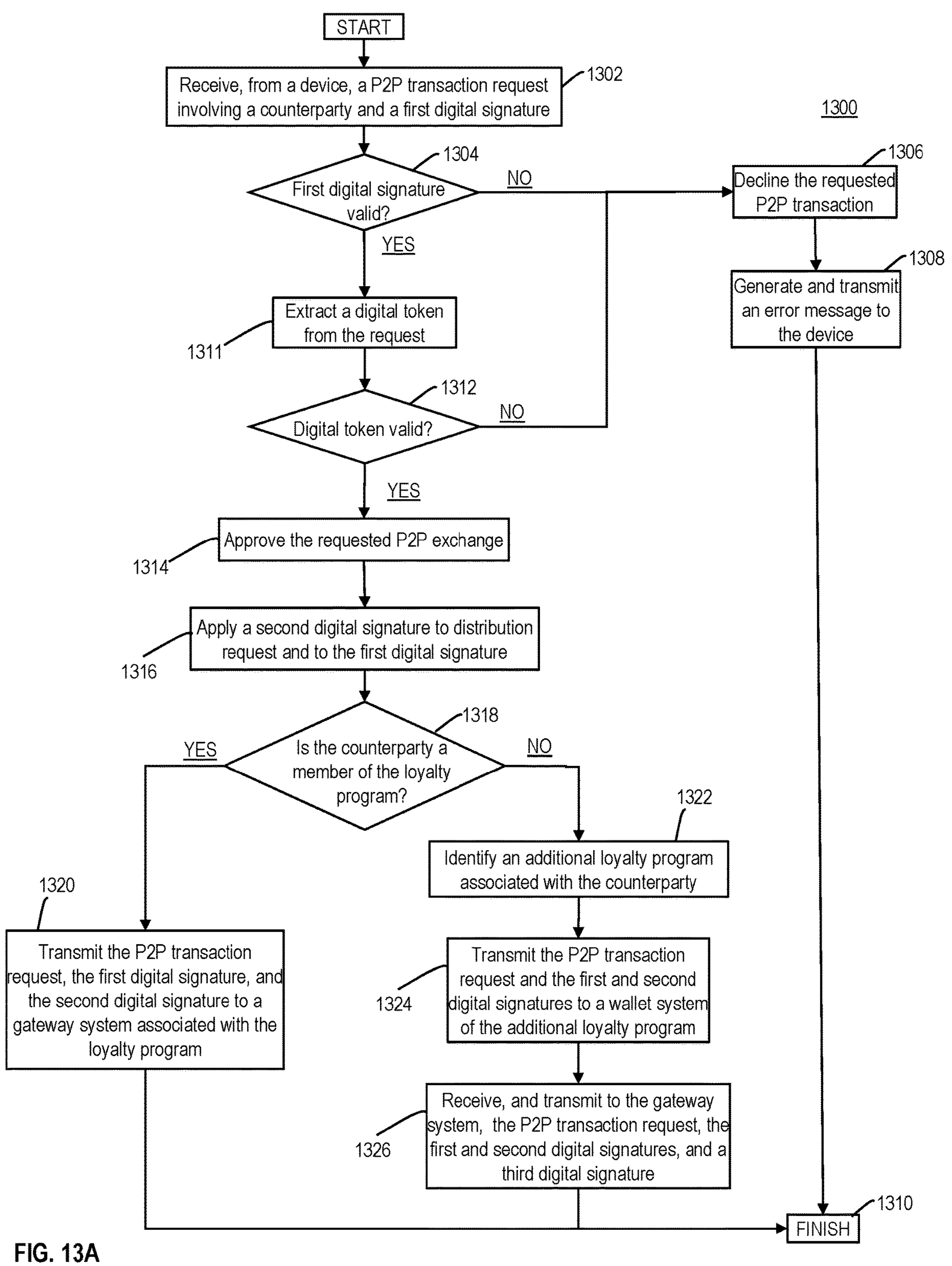
FIGS. 13A and 13B are flowcharts of exemplary processes for initiating and managing transfers of digital assets between computing systems using permissioned distributed ledgers, in accordance with some exemplary embodiments Like reference numbers and designations in the various drawings indicate like elements.
Figure 13B:
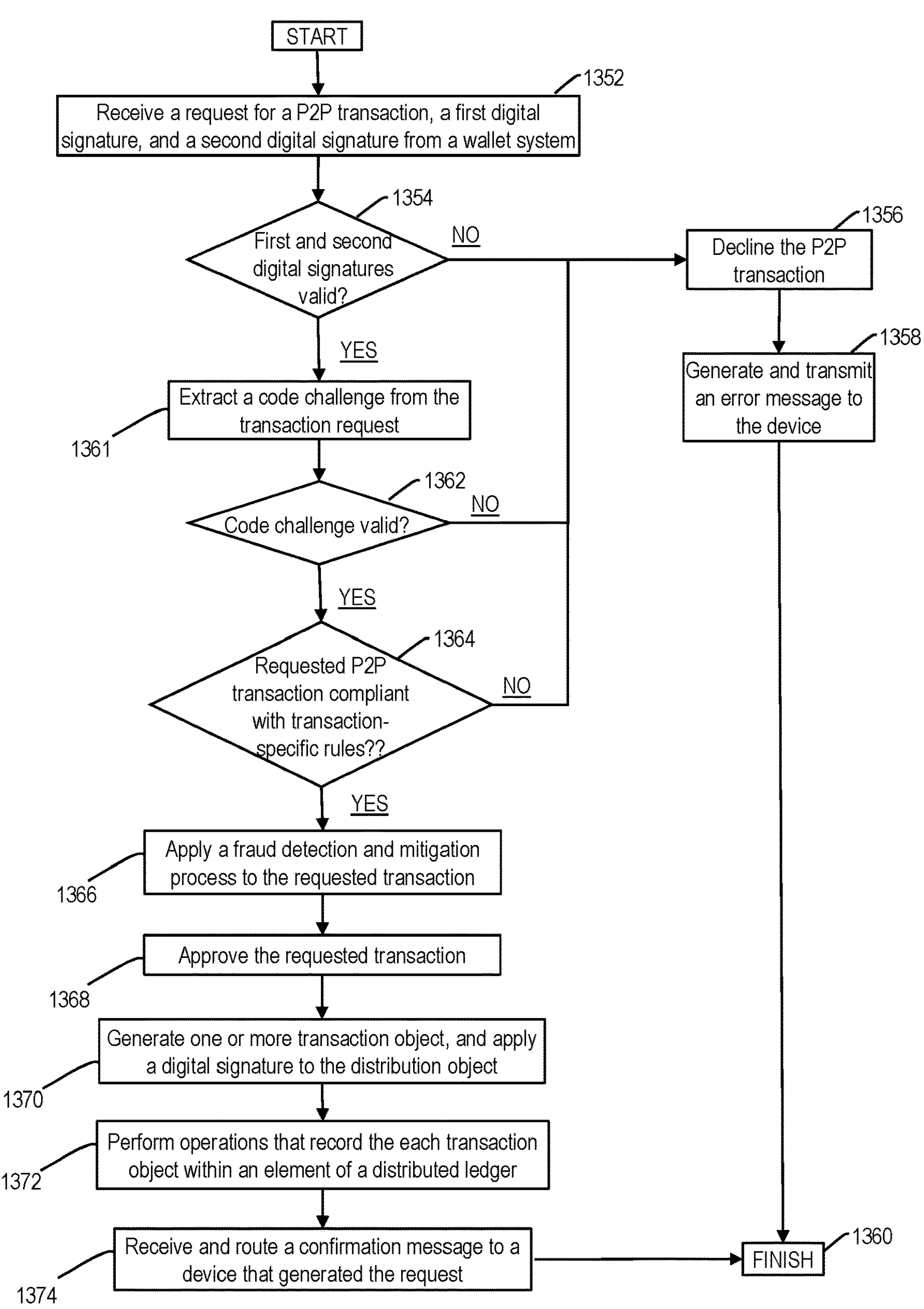

FIGS. 13A and 13B are flowcharts of exemplary processes for initiating and managing transfers of digital assets between computing systems using permissioned distributed ledgers, in accordance with the disclosed embodiments. In some examples, a computing system capable of provisioning and supporting wallet applications executed by computing devices within the computing environment, such as wallet system 130, may perform one or more of the exemplary steps of process 1300, as described below in reference to FIG. 13A. Further, a computing system associated with permissioned, distributed-ledger network operating within the environment, such as gateway system 160, may perform one or more of the exemplary steps of process 1350, as described below in reference to FIG. 13B.

Referring to FIG. 13A, wallet system 130 may receive, from a client device (e.g., client device 102 or client device 122 of FIG. 1), a transaction request for a peer-to-peer (P2P) exchange or transaction that transfers a specified quantity of a digital asset from user of the client device (e.g., user 101 or user 121 of FIG. 1) to a specified counterparty, and a first digital signature applied to the transaction request (e.g., in step 1302). By way of the example, the user of the client device may correspond to a member of a first loyalty program associated with a financial institution, and the digital asset may be allocated to the member of the first loyalty program through participation in a qualifying transaction, or through any of the exemplary asset-allocation processes described herein. In some examples, the counterparty may correspond to an additional member of the first loyalty program, or a member of a second loyalty program (e.g., an air miles reward program) unrelated to the first loyalty program.

As described herein, the transaction request may be generated by a wallet application executed by the client device (e.g., executed wallet application 104 or executed wallet application 124), and the transaction request may include, among other things, a public cryptographic key that uniquely identifies the executed wallet application, an additional public cryptographic key that uniquely identifies a wallet application executed by a device operated by the counterparty (e.g., a counterparty device), a digital token generated by wallet system 130 in response to a successful authentication of an identity of the user (e.g., a one-time-user (OTU) token), and a code challenge generated by gateway system 160. The transaction request may also include transaction parameter data that identifies the specified quantity of the digital asset subject to transfer through the P2P exchange or transaction, and in some instances, an exchange rate associated with a conversion of the specified quantity of the digital asset into a corresponding quantity of an additional digital asset allocated to members of the second loyalty program, e.g., using any of the exemplary processes described herein.

Further, as also described herein, the wallet application executed by the client device may apply the first digital signature to the distribution request, e.g., using a corresponding private cryptographic key of the executed wallet application. In some instances, the application of the first digital signature to the distribution request by the executed wallet application may be indicative of an approval of and consent to the requested distribution registration (e.g., the requested allocation or the requested redemption) by the user of the client device.

In some instances, wallet system 130 may perform any of the exemplary processes described herein to validate the applied first digital signature (e.g., in step 1304). If wallet system 130 were unable to verify the first digital signature, (e.g., step 1304; NO), wallet system 130 may decline the requested P2P exchange or transaction (e.g., in step 1306). Wallet system 130 may perform any of the exemplary processes described herein to generate and transmit an error message to the client device (e.g., in step 1308). Exemplary process 1300 is then complete in step 1310.

Alternatively, if wallet system 130 were to verify the first digital signature (e.g., step 1304; YES), wallet system 130 may parse the transaction request to extract the digital token (e.g., the OTU token) from the transaction request (e.g., in step 1311), and may perform any of the exemplary processes described herein to verify the extracted digital token is consistent with, and corresponds to, a locally maintained copy of the digital token provisioned to the client device (e.g., in step 1312). If, for example, wallet system 130 were to detect an inconsistency between the extracted digital token and the local copy of the digital token (e.g., step 1312; NO), exemplary process 1300 may pass back to step 1306, and wallet system 130 may decline the requested distribution of the digital asset, or of the predetermined quantity of the digital asset, e.g., the requested allocation or distribution described herein.

In other examples, if wallet system 130 were to establish a consistency, and a correspondence, between the extracted digital token and the locally maintained copy of the digital token (e.g., step 1312; YES), wallet system 130 may approve, and consent to, the requested P2P exchange or transaction (e.g., in step 1314). Further, wallet system 130 may perform any of the exemplary processes described herein to apply a second digital signature to the transaction request and to the first digital signature (e.g., in step 1316). As described herein, the application of the second digital signature to the transaction request and to the first digital signature may indicative of an approval of, and a consent to, the requested P2P exchange or transaction by wallet system 130.

Wallet system 130 may perform any of the exemplary processes described herein to establish that the counterparty to the P2P exchange or transaction represents a member of the first loyalty program and as such, that a wallet application executed by the client device represents a valid wallet application provisioned by wallet system 130 (e.g., in step 1318). If, for example, wallet system 130 were to establish that the counterparty represents a member of the first loyalty program, and that the counterparty device executed a validly provisioned wallet application (step 1318; YES), wallet system 130 may transmit the transaction request, the first digital signature, and the second digital signature across network 120 to a computing system that participates in the permissioned, distributed-ledger network associated with the first loyalty program, such as gateway system 160 (e.g., in step 1320). Exemplary process 1300 is then complete in step 1310.

Referring back to step 1318, if wallet system 130 were to establish that the counterparty does not represent a member of the first loyalty program (step 1318; NO), wallet system 130 may perform any of the exemplary processes described herein to determine that the counterparty represents a member of an additional or alternate loyalty program, such as the second loyalty program described herein (e.g., in step 1322), and may perform operations that transmit the transaction request, the first digital signature, and the second digital signature across network 120 to a computing system associated with the second loyalty program (e.g., in step 1324). For example, the second loyalty program may correspond to an air miles rewards program, and the computing system associated with the second loyalty program may correspond to wallet system 1230, which provisions and supports wallet applications associated with the second loyalty program and executed by computing devices within the computing environment.

In some instances, wallet system 1230 may perform any of the exemplary processes described herein to validate the first digital signature and the second digital signature, and to perform any of the exemplary processes described herein to establish a consistency between the exchange rate specified within the transaction request and a currently valid exchange rate established by mutual consensus between the first and second loyalty programs. Based on the determined validity of the first and second digital signatures, and based on the established consistency between the specified and currently valid exchange rates, wallet system 1230 may perform any of the exemplary processes described herein to apply a third digital signature to the transaction request. As described herein, the application of the third digital signature to the transaction request and to the first and second digital signatures may indicative of an approval of, and a consent to, the requested P2P exchange or transaction by wallet system 1230, and wallet system 1230 may transmit the transaction request and the first, second, and third digital signatures back across network 120 to wallet system 130.

Referring back to FIG. 13A, wallet system 130 may receive the transaction request and the applied first, second, and third digital signatures from wallet system 1230, and wallet system 130 may transmit the transaction request and the applied first, second, and third digital signatures to the computing system that participates in the permissioned, distributed-ledger network associated with the first loyalty program, such as gateway system 160 (e.g., in step 1326). Exemplary process 1300 is then complete in step 1310.

Referring to FIG. 13B, gateway system 160 may receive the transaction request, the first digital signature, and the second digital signature from wallet system 130 (e.g., in step 1352). In some instances, in step 1354, gateway system 160 may perform any of the exemplary processes described herein to validate the first digital signature and the second digital signature. If gateway system 160 were unable to validate the first digital signature or the second digital signature, (e.g., step 1354; NO), gateway system 160 may decline the requested peer-to-peer (P2P) exchange or transaction (e.g., in step 1356). Gateway system 160 may perform any of the exemplary processes described herein to generate an error message indicative of the declined P2P exchange or transaction, and may transmit the generated error message to the client device via wallet system 130 (e.g., in step 1358). Exemplary process 1350 is then complete in step 1360.

Alternatively, if gateway system 160 were to verify both the first and second digital signatures (e.g., step 1354; YES), gateway system 160 may parse the distribution request to extract the code challenge from the transaction request (e.g., in step 1361), and may perform any of the exemplary processes described herein to verify the extracted code challenge is consistent with, and corresponds to, a locally maintained copy of the code challenge provisioned to the client device (e.g., in step 1362). If, for example, gateway system 160 were to detect an inconsistency between the extracted code challenge and the local copy of the code challenge (e.g., step 1362; NO), exemplary process 1350 may pass back to step 1356, and gateway system 160 may decline the requested P2P exchange or transaction.

Alternatively, if gateway system 160 were to establish a consistency, and a correspondence, between the extracted code challenge and the locally maintained copy of the code challenge (e.g., step 1362; YES), gateway system 160 may perform any of the exemplary processes described herein to establish a compliance of the requested P2P exchange or transaction with one or more transaction-specific rules that impose corresponding conditions on the requested P2P exchange or transaction (e.g., in step 1364). If, for instance, gateway system 160 were to detect an inconsistency between at least one of the conditions imposed by the one or more transaction-specific rules and requested P2P exchange or transaction (step 1364; NO), exemplary process 1350 may pass back to step 1356, and gateway system 160 may decline the requested P2P exchange or transaction, as described herein. Alternatively, if gateway system 160 were to establish a consistency between the conditions imposed by the one or more transaction-specific rules and requested P2P exchange or transaction, gateway system 160 may also apply one or more fraud detection and mitigation processes to the now-verified transaction request (e.g., in step 1366). By way of example, the applied fraud detection and mitigation processes may include adding data identifying the transaction request to a queue of pending requests, which may delay a processing of the P2P exchange or transaction for predetermined or dynamically determined time period.

For example, and upon expiration of the predetermined or dynamically determined time period, gateway system 160 may establish a successful outcome of the fraud detection and mitigation processes, and approve, and consent to, the requested P2P exchange or transaction (e.g., in step 1368). Gateway system 160 may also perform any of the exemplary processes described herein to generate at least one of a payer transaction object or a payee transaction object associated with the now-approved P2P exchange or transaction, and to apply any additional digital signature to the at least one of the payer transaction object or the payee transaction object (e.g., in step 1370).

Further, gateway system 160 may also perform any of the exemplary processes described herein, in conjunction with one or more node systems operating within the computing environment, to record immutably at least one of the payer transaction object or the payee transaction object an element of a cryptographically secure distributed ledger (e.g., in step 1372). In some instances, and as described herein, gateway system 160 may receive a confirmation message indicative of the recordation of the at least one of the payer transaction object or the payee transaction object within the element of the distributed ledger, and may route the confirmation message back to the client device via wallet system 130 (e.g., in step 1374). Exemplary process 1350 is then complete in step 1360.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, wallet applications 104 and 124, campaign engine 202, application programming interfaces (APIs) 214, 234, 238, 260, 278, 310, 328, 348, 502, 623, 1127, 1235, 1260A, and 1282A, authentication engine 262, challenge engine 280, registration engine 312, verification module 314, consent module 318, verification engine 330, distributed registration engine 336, block generation modules 350 and 1283, allocation engine 530, verification module 532, consent module 538, distributed allocation engine 546, redemption engine 602, redemption module 618, distributed query engine 626, query management engine 634, balance inquiry module 636, redemption engine 710, verification module 712, consent module 718, distributed redemption engine 725, triggering module 902, key regeneration module 906, transaction module 1116, transaction engine 1132, verification module 1134, consent module 1138, distributed transaction engine 1146, transaction engine 1236, verification engine 1262, and distributed transaction engine 1264, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a communications interface;

a memory storing instructions; and at least one processor coupled to the communications interface and the memory, the at least one processor being configured to execute the instructions to:

receive, from a device via the communications interface, a request and a first digital signature, the first digital signature being applied to the request, the request being generated by an application program executed at the device and associated with the apparatus, the request comprising a public cryptographic key and a first digital token, the first digital token comprising a one-time-use token, and the one-time-use token being indicative of a prior authentication of at least one of a network address of the device or an application cryptogram of the executed application program during a single registration process;

based on a validation of the first digital signature and of the first digital token, and based on a determination that the first digital token corresponds to a second digital token associated with the device, approve the request and apply a second digital signature to the request and the first digital signature; and transmit, via the communications interface, the request, the first digital signature, and the second digital signature to a computing system, the computing system performing operations that record the public cryptographic key within an element of a distributed ledger based at least on a further validation of the first digital signature and the second digital signature.

2. The apparatus of claim 1, wherein the at least one processor is further configured to execute the instructions to:

obtain the second digital token associated with the device from the memory;

validate the first digital signature based on at least on the public cryptographic key; and determine that the first digital token corresponds to the second digital token.

3. The apparatus of claim 1, wherein:

the request comprises registration data generated by the application program executed at the device; and the at least one processor is further configured to execute the instructions to obtain the second digital token from the memory based on at least a portion of the registration data.

4. The apparatus of claim 3, wherein the registration data comprises at least one of the network address of the device or the application cryptogram of the executed application program.

5. The apparatus of claim 3, wherein the computing system performs additional operations that record, within the element of the distributed ledger, the public cryptographic key and at least one of (i) a portion of the registration data or (ii) a hash value representative of the portion of the registration data.

6. The apparatus of claim 1, wherein the at least one processor is further configured to execute the instructions to apply the second digital signature to the request and to the first digital signature using a private cryptographic key of the apparatus, the second digital signature being indicative of the approval of the request by the apparatus.

7. The apparatus of claim 1, wherein:

the first digital token is associated with a predetermined geographic region; and the at least one processor is further configured to execute the instructions to validate the first digital token based on a determination that the predetermined geographic region includes a geographic location associated with the request.

8. The apparatus of claim 1, wherein:

the first digital token is associated with a predetermined temporal interval; and the at least one processor is further configured to execute the instructions to validate the first digital token based on a determination that the apparatus receives the request during the predetermined temporal interval.

9. The apparatus of claim 1, wherein the at least one processor is further configured to execute the instructions to:

receive authentication data from the device via the communications interface, the authentication data comprising one or more first authentication credentials of a user associated with the device and the at least one of the network address of the device or the application cryptogram associated with the application program executed at the device;

load, from the memory, second authentication credentials associated with the at least one of the network address or the application cryptogram;

perform operations that authenticate the user based on a determined correspondence between the first and second authentication credentials; and generate the first digital token based on the authentication of the user and transmit the first digital token to the device via the communications interface.

10. The apparatus of claim 1, wherein the computing system performs operations that:

receive the request, the first digital signature, and the second digital signature from the apparatus; and based on the further validation of the first and second digital signatures, transmit the public cryptographic key to one or more peer computing systems, the one or more peer computing systems performing operations that record the public cryptographic key within additional elements of the distributed ledger.

11. The apparatus of claim 1, wherein the application program executed at the device performs operations that generate at least one of the public cryptographic key or the first digital token based on the prior authentication of the at least one of the network address or the application cryptogram.

12. The apparatus of claim 1, wherein the one-time-use digital token is characterized by at least one of predetermined composition, a predetermined length, or a predetermined format.

13. A computer-implemented method, comprising:

receiving, using at least one processor, a request and a first digital signature from a device, the first digital signature being applied to the request, the request being generated by an application program executed at the device and associated with the apparatus, the request comprising a public cryptographic key and a first digital token, the first digital token comprising a one-time-use token, and the one-time-use token being indicative of a prior authentication of at least one of a network address of the device or an application cryptogram of the executed application program during a single registration process;

based on a validation of the first digital signature and of the first digital token, and based on a determination that the first digital token corresponds to a second digital token associated with the device, performing operations, using the at least one processor, that approve the request and apply a second digital signature to the request and the first digital signature; and transmitting, using the at least one processor, the request, the first digital signature, and the second digital signature to a computing system, the computing system performing operations that record the public cryptographic key within an element of a distributed ledger based at least on a further validation of the first digital signature and the second digital signature.

14. An apparatus, comprising:

a communications interface;

a memory storing instructions; and at least one processor coupled to the communications interface and to the memory, the at least one processor being configured to execute the instructions to:

receive, from a computing system via the communications interface, a request, a first digital signature applied to the request, and a second digital signature applied to the request and to the first digital signature, the request comprising a first public cryptographic key associated with a device, a digital token, and a first code challenge, the request being generated by an application program executed at the device and associated with the apparatus, the digital token comprising a one-time-use token, the one-time-use token being indicative of a prior authentication of at least one of a network address of the device or an application cryptogram of the executed application program during a single registration process, and the second digital signature being indicative of a prior approval of the request by the computing system;

validate the first digital signature using the first public cryptographic key, and validate the second digital signature using a second public cryptographic key of the computing system; and based on the validation of the first and second digital signatures, based on a validation of the digital token, and based on a determination that the first code challenge corresponds to a second code challenge associated with the device, perform operations that record the first public cryptographic key within an element of a distributed ledger.

15. The apparatus of claim 14, wherein the at least one processor is further configured to execute the instructions to:

obtain the second code challenge associated with the device from the memory; and determine that the first code challenge corresponds to the second code challenge;

approve the request based on the validation of the first and second digital signatures, based on the validation of the digital token, and based on the determination that the first code challenge corresponds to the second code challenge; and based on the approval of the request, perform the operations that record the first public cryptographic key within the element of the distributed ledger.

16. The apparatus of claim 14, wherein:

the request comprises registration data generated by the application program executed at the device; and the at least one processor is further configured to execute the instructions to obtain the second code challenge from the memory based on at least a portion of the registration data.

17. The apparatus of claim 16, wherein the registration data comprises at least one of the network address of the device or the application cryptogram of the executed application program.

18. The apparatus of claim 16, wherein the at least one processor is further configured to execute the instructions to perform additional operations that record, within the element of the distributed ledger, the first public cryptographic key and at least one of (i) a portion of the registration data or (ii) a hash value representative of the portion of the registration data.

19. The apparatus of claim 14, wherein the at least one processor is further configured to execute the instructions to:

based on the validation of the first and second digital signatures, based on the validation of the digital token, and based on the determination that the first code challenge corresponds to the second code challenge, generate a registration object that includes at least the first public cryptographic key; and transmit, via the communications interface, the registration object to one or more peer computing systems, the one or more peer computing systems performing additional operations that record the registration object within the element of the distributed ledger.

20. The apparatus of claim 14, wherein:

the digital token is associated with a predetermined geographic region; and the at least one processor is further configured to execute the instructions to validate the digital token based on a determination that the predetermined geographic region includes a geographic location associated with the request.

21. The apparatus of claim 14, wherein:

the digital token is associated with a predetermined temporal interval; and the at least one processor is further configured to execute the instructions to validate the digital token based on a determination that the apparatus receives the request during the predetermined temporal interval.

22. The apparatus of claim 14, wherein the at least one processor is further configured to execute the instructions to:

receive, via the communications interface, a request for the first code challenge from the device, the request comprising at least one of the network address of the device or the application cryptogram of the application program executed at the device;

generate the first code challenge based on the received request, the first code challenge comprising a first hash value of the at least one of the network address of the device or the application cryptogram, or a second hash value of a plaintext cipher; and transmit the first code challenge to the device via the communications interface.

* * * * *